US012637829B1

(12) United States Patent　　(10) Patent No.: US 12,637,829 B1
Hurwitz　　(45) Date of Patent: May 26, 2026

(54) AUTONOMOUS CONTROL OF POWERED EARTH-MOVING VEHICLES TO INHIBIT VEHICLE SLIPPAGE

(71) Applicant: AIM Intelligent Machines, Inc., Monroe, WA (US)

(72) Inventor: Jonathan D. Hurwitz, Seattle, WA (US)

(73) Assignee: AIM Intelligent Machines, Inc., Redmond, WA (US)

( * ) Notice: Subject to any disclaimer, the term of this patent is extended or adjusted under 35 U.S.C. 154(b) by 125 days.

(21) Appl. No.: 18/783,396

(22) Filed: Jul. 24, 2024

Related U.S. Application Data

(60) Provisional application No. 63/532,031, filed on Aug. 10, 2023.

(51) Int. Cl.
E02F 3/84　　(2006.01)
E02F 3/76　　(2006.01)
(Continued)

(52) U.S. Cl.
CPC .............. E02F 3/844 (2013.01); E02F 9/205 (2013.01); E02F 9/26 (2013.01); G01S 19/14 (2013.01);
(Continued)

(58) Field of Classification Search
CPC ........... E02F 3/844; E02F 9/26; E02F 3/7604; G01S 19/14; G01S 19/43; G06T 7/521; G06T 2207/10028; G06T 2207/30252
See application file for complete search history.

(56) References Cited

U.S. PATENT DOCUMENTS 9,630,321 B2 　4/2017　Bradski et al.
11,118,453 B2 *　9/2021　Wei ......................... E02F 9/262
(Continued)

FOREIGN PATENT DOCUMENTS

CN　　111942200 A　　11/2020
CN　　115205395 A　　10/2022
(Continued)

OTHER PUBLICATIONS

Grove—12 Bit Magnetic Rotary Position Sensor (AS5600), retrieved on Aug. 22, 2022 from wiki.seeedstudio.com/Grove-12-bit-Magnetic-Rotary-Position-Sensor-AS5600/, 13 pages.
(Continued)

*Primary Examiner* — Michael C Zarroli
(74) *Attorney, Agent, or Firm* — VLP Law Group LLP; James A. D. White

(57)　　　　　　ABSTRACT

Systems and techniques are described for implementing autonomous control of powered earth-moving vehicles, including to automatically control movement of some or all of a powered earth-moving vehicle on a job site to conform with specified safety configuration data, such as to halt or otherwise inhibit unplanned slippage on a sloped and/or slick surface. For example, the safety configuration data may be used to move hydraulic arm(s) and/or attachment(s) of a vehicle while slipping is detected to cause some or all such tool attachments of the vehicle (e.g., front and/or rear tool attachments) to be automatically moved into the ground or other underlying surface to inhibit vehicle slippage when it is automatically detected, such as in a determined sequence of multiple such tool attachments.

20 Claims, 27 Drawing Sheets

(51) Int. Cl.

| | |
|---|---|
| *E02F 9/20* | (2006.01) |
| *E02F 9/26* | (2006.01) |
| *G01S 19/14* | (2010.01) |
| *G01S 19/43* | (2010.01) |
| *G06T 7/521* | (2017.01) |

(52) U.S. Cl.
CPC .............. *G01S 19/43* (2013.01); *G06T 7/521* (2017.01); *E02F 3/7604* (2013.01); *E02F 9/262* (2013.01); *G06T 2207/10028* (2013.01); *G06T 2207/30252* (2013.01)

(56) References Cited

U.S. PATENT DOCUMENTS

| | | | |
|---|---|---|---|
| 11,346,086 B1 | 5/2022 | Kikani et al. | |
| 11,375,041 B2 | 6/2022 | Theverapperuma et al. | |
| 11,560,690 B2 | 1/2023 | Halder et al. | |
| 11,567,197 B2 | 1/2023 | Halder | |
| 11,746,499 B1 | 9/2023 | Kotlaba | |
| 11,746,501 B1 | 9/2023 | Gajic et al. | |
| 11,898,324 B1 | 2/2024 | Hurwitz et al. | |
| 11,952,746 B1 | 4/2024 | Kotlaba et al. | |
| 12,037,773 B2 | 7/2024 | Kotlaba | |
| 2013/0006484 A1* | 1/2013 | Avitzur ................ | G05D 1/0274 701/50 |
| 2014/0163805 A1* | 6/2014 | Braunstein ............. | G05D 1/021 701/23 |
| 2016/0170089 A1 | 6/2016 | Collins | |
| 2017/0167111 A1* | 6/2017 | Katayanagi ............... | E02F 9/16 |
| 2018/0066415 A1* | 3/2018 | Friend ..................... | E02F 9/262 |
| 2018/0245308 A1 | 8/2018 | Ready-Campbell et al. | |
| 2020/0032483 A1 | 1/2020 | Ready-Campbell et al. | |
| 2020/0063395 A1 | 2/2020 | Ready-Campbell et al. | |
| 2020/0111169 A1 | 4/2020 | Halder et al. | |
| 2020/0150650 A1 | 5/2020 | Jarlengrip | |
| 2020/0150687 A1 | 5/2020 | Halder et al. | |
| 2020/0310442 A1 | 10/2020 | Halder et al. | |
| 2020/0394813 A1 | 12/2020 | Theverapperuma et al. | |
| 2021/0017738 A1 | 1/2021 | Sano | |
| 2021/0047806 A1* | 2/2021 | Ready-Campbell ......................... | E02F 9/2045 |
| 2021/0191409 A1 | 6/2021 | Ready-Campbell et al. | |
| 2021/0254308 A1 | 8/2021 | Thibblin et al. | |
| 2021/0317633 A1 | 10/2021 | Sherlock | |
| 2022/0024485 A1 | 1/2022 | Theverapperuma et al. | |
| 2022/0025612 A1 | 1/2022 | Zhang et al. | |
| 2022/0026921 A1 | 1/2022 | Halder | |
| 2022/0042286 A1 | 2/2022 | Tsuji et al. | |
| 2022/0057513 A1 | 2/2022 | Pihl | |
| 2022/0154431 A1 | 5/2022 | Kurosawa | |
| 2022/0282451 A1 | 9/2022 | Ready-Campbell et al. | |
| 2022/0340171 A1 | 10/2022 | Halder | |
| 2022/0412057 A1 | 12/2022 | Kikani et al. | |
| 2023/0031524 A1 | 2/2023 | Ready-Campbell et al. | |
| 2023/0134855 A1 | 5/2023 | Hodel et al. | |
| 2024/0093464 A1 | 3/2024 | Sadilek et al. | |

FOREIGN PATENT DOCUMENTS

| | | | |
|---|---|---|---|
| EP | 4083335 A2 | 8/2022 | |
| KR | 10-2022-0014477 | 12/2022 | |
| WO | 2018099755 A1 | 6/2018 | |
| WO | 2022107587 A1 | 5/2022 | |
| WO | 2022198331 A1 | 9/2022 | |

OTHER PUBLICATIONS

ZED-F9P-04B u-blox F9 high precision GNSS module, May 3, 2022, retrieved on Aug. 22, 2022 from www.u-blox.com/sites/default/files/ZED-F9P-04B_DataSheet_UBX-21044850.pdf, 25 pages.
Digi XBee SX 868 Datasheet, retrieved on Aug. 22, 2022 from www.digi.com/resources/library/data-sheets/ds_xbee-sx-868, 2 pages.

ST LM217/LM317 Datasheet, Dec. 2021, retrieved on Aug. 22, 2022 from www.st.com/resource/en/datasheet/lm317.pdf, 34 pages.
ST LD1117 Datasheet, Feb. 2020, retrieved on Aug. 22, 2022 from www.st.com/resource/en/datasheet/ld1117.pdf, 46 pages.
Texas Instruments TCAN33x 3.3-V CAN Transceivers With CAN FD, Dec. 2019, retrieved on Aug. 22, 2022 from www.ti.com/lit/gpn/TCAN334, 45 pages.
PJRC Teensy 4.1 Development Board, retrieved on Mar. 18, 2022 from www.pjrc.com/store/teensy41.html, 22 pages.
Fairchild Semiconductor ONSEMI N-Channel Logic Level Enhancement Mode Field Effect Transistor BSS138, Nov. 2021, retrieved on Aug. 22, 2022 from www.onsemi.com/pdf/datasheet/bss138-d.pdf, 7 pages.
NXP Semiconductors i.MX RT1060 Crossover MCU with Arm® Cortex®-M7 Core, retrieved on Aug. 22, 2022 from https://www.nxp.com/products/processors-and-microcontrollers/arm-microcontrollers/i-mx-rt-crossover-mcus/i-mx-rt1060-crossover-mcu-with-arm-cortex-m7-core:i.MX-RT1060, 9 pages.
Livox LVX Specifications v1.1.0.0, 2019, retrieved on Aug. 22, 2022 from www.livoxtech.com/3296f540ecf5458a8829e01cf429798e/downloads/Livox Viewer/LVX Specifications EN_20190924.pdf, 12 pages.
Inductive Proximity Sensor LJ12A3-4-Z/BX, retrieved on Aug. 22, 2022 from datasheetspdf.com/pdf-file/1096182/ETT/LJ12A3-4-Z/1, 1 page.
Brianna Wessling, "Teleo announces $12M in Series A funding", Jun. 13, 2022, retrieved on Jun. 20, 2022 from www.therobotreport.com/teleo-announces-12m-in-series-a-funding/, 10 pages.
Frank Tobe, "Blue River Technology sells to Deere for $305 million", Sep. 7, 2017, retrieved on Jun. 20, 2022 from www.therobotreport.com/startup-blue-river-technology-sells-deere-305-million/, 12 pages.
Steve Crowe, "John Deere Acquires Light's Camera-Based Perception Platform", May 19, 2022, retrieved on Jun. 20, 2022 from www.therobotreport.com/john-deere-acquires-light-camera-based-perception-platform/, 12 pages.
TRL Off-Highway Automated Vehicles Code of Practice, 2021, retrieved on Aug. 22, 2022 from trl.co.uk/uploads/trl/documents/PPR994-Off-Highway-AV-CoP_v3.pdf, 40 pages.
Steve Crowe, "John Deere Acquiring Bear Flag Robotics for $250M", Aug. 5, 2021, retrieved on Jun. 20, 2022 from www.therobotreport.com/john-deere-acquiring-bear-flag-robotics-250m/, 11 pages.
Steve Crowe, "Oxbotica Pilots Safety Framework for Off-Road Autonomous Driving", Jun. 7, 2021, retrieved on Jun. 20, 2022 from www.therobotreport.com/oxbotica-pilots-safety-framework-off-road-autonomous-driving/, 11 pages.
Brianna Wessling, "MIT Researchers Help Robots Navigate Uncertain Environments", May 24, 2022, retrieved on Jun. 20, 2022 from www.therobotreport.com/mit-researchers-help-robots-navigate-uncertain-environments/, 10 pages.
Carnegie Mellon University National Robotics Engineering Center—Off-Road Autonomy, retrieved on Aug. 22, 2022 from https://www.nrec.ri.cmu.edu/solutions/defense/other-projects/off-road-autonomy.html, 5 pages.
Greg Nichols, "Off Road: Autonomous Driving's New Frontier Requires a New Kind of Sensor", Apr. 14, 2021, retrieved on Jun. 20, 2022 from www.zdnet.com/article/off-road-autonomous-drivings-new-frontier-requires-a-new-kind-of-sensor/, 15 pages.
Tagolas Magma X2 Datasheet, retrieved on Aug. 22, 2022 from www.taoglas.com/datasheets/AA.175.301111.pdf, 20 pages.
Livox Mid-40/Mid-100 LiDAR Specs, retrieved on Aug. 22, 2022 from https://www.livoxtech.com/mid-40-and-mid-100/specs, 2 pages.
Elaine Ball, "Top Benefits of Using LiDAR for Construction Projects", Oct. 1, 2020, retrieved from https://csengineermag.com/top-benefits-of-using-lidar-for-construction-projects/ on Nov. 4, 2022, 4 pages.
"Press Release: Baraja Announces First Volume Commercial LiDAR Deal With Hitachi Construction Machinery", Oct. 12, 2021, retrieved from https://www.baraja.com/en/blog/press-release-baraja-announces-first-volume-commercial-lidar-deal-with-hitachi-construction on Nov. 4, 2022, 6 pages.

(56) References Cited

OTHER PUBLICATIONS

Peter Brown, "LiDAR Improves Efficiency and Safety in Industrial Heavy Equipment", Oct. 22, 2021, retrieved from https://electronics360. globalspec.com/article/17336/lidar-improves-efficiency-and-safety-in-industrial-heavy-equipment on Nov. 4, 2022, 2 pages.

"Construction Remains Ahead in Autonomous Vehicles", Oct. 4, 2019, retrieved from https://www.constructionequipment.com/earthmoving/rigid-frame-trucks-off-highway/article/10756443/construction-remains-ahead-in-autonomous-vehicles on Nov. 4, 2022, 4 pages.

"LiDAR for Heavy Machinery", retrieved from https://innoviz.tech/applications/industrial on Nov. 4, 2022, 2 pages.

"Hitachi Construction Machinery Invests in Nextgen LiDAR . . . ", Mar. 29, 2021, retrieved from https://lidarnews.com/press-releases/hitachi-construction-machinery-invests-in-nextgen-lidar/ on Nov. 4, 2022, 2 pages.

Nakagawa et al., "Real-Time Mapping of Construction Workers Using Multilayered LiDAR", The 40th Asian Conference on Remote Sensing 2019, Oct. 14-18, 2019, 8 pages.

Sabbir Rangwala, "LiDAR Vision—Helping Bring Autonomous Trucks to Your Neighborhood", Dec. 17, 2020, retrieved from https://www.forbes.com/sites/sabbirrangwala/2020/12/17/lidar-visionhelping-bring-autonomous-trucks-to-your-neighborhood/ on Nov. 4, 2022, 9 pages.

"Collision Warning on the Rear of an Excavator With 3D LiDAR Sensors", retrieved from https://www.sick.com/ca/en/industries/mobile-automation/construction-and-mining-machines/excavator/collision-warning-on-the-rear-of-an-excavator-with-3d-lidar-sensors/c/p549945 on Nov. 4, 2022, 1 page.

"Autonomous Construction Vehicles", retrieved from https://www.technologycards.net/english/the-technologies/autonomous-construction-vehicles on Nov. 4, 2022, 2 pages.

* cited by examiner

*FIG. 2-O*
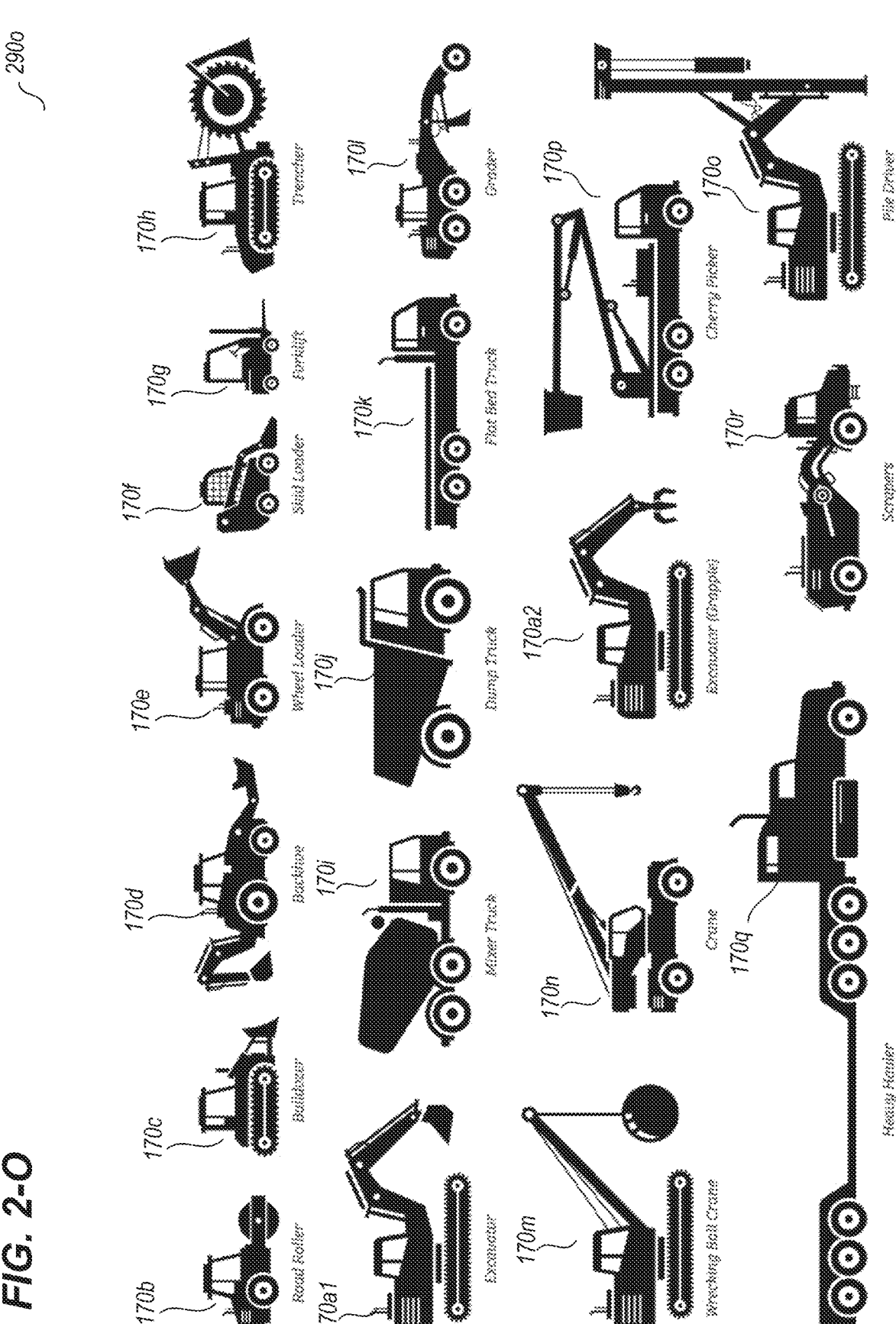

290q

227q

224q 180-1

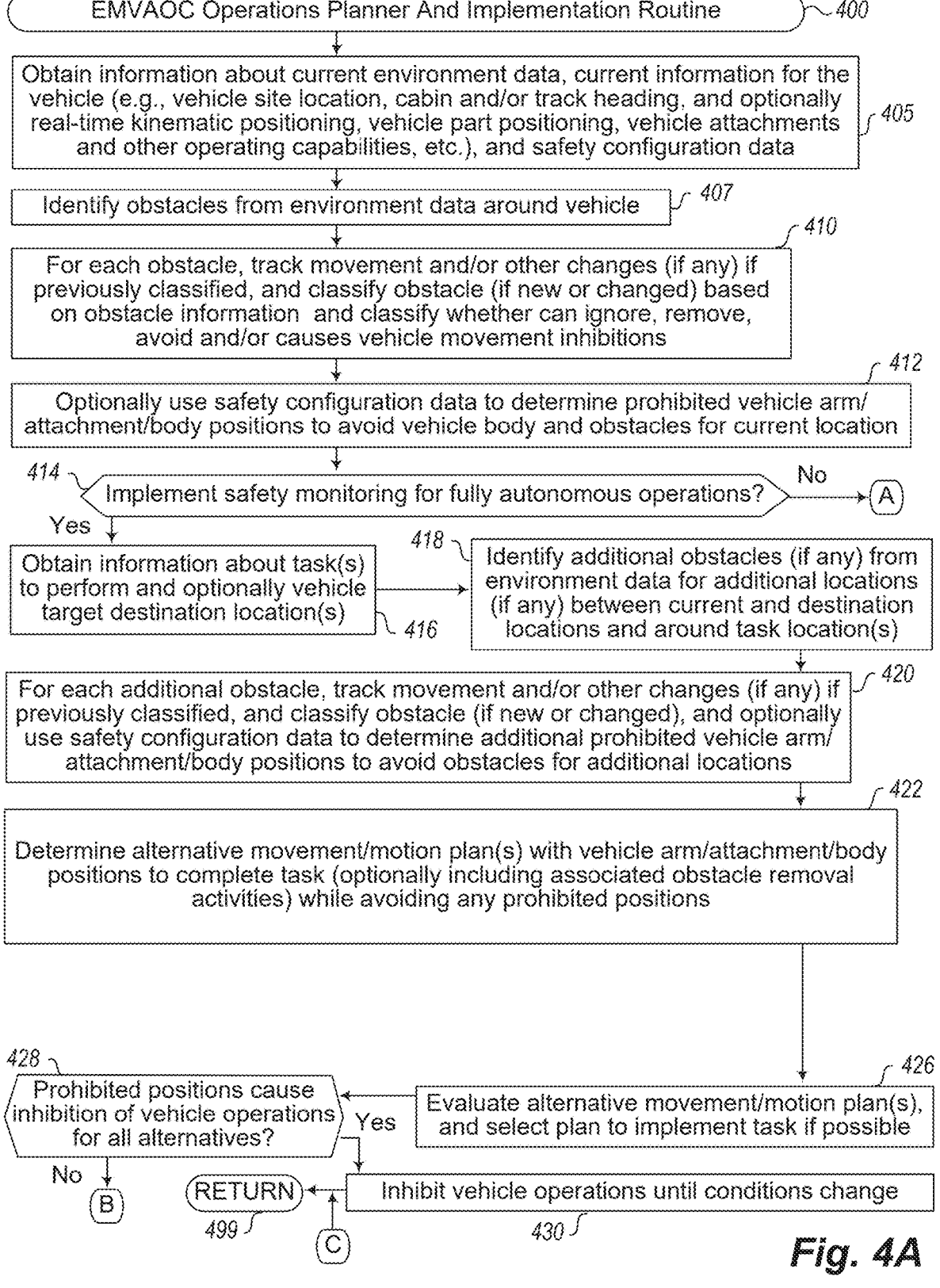

EMVAOC Operations Planner And Implementation Routine — 400

Obtain information about current environment data, current information for the vehicle (e.g., vehicle site location, cabin and/or track heading, and optionally real-time kinematic positioning, vehicle part positioning, vehicle attachments and other operating capabilities, etc.), and safety configuration data — 405

Identify obstacles from environment data around vehicle — 407

For each obstacle, track movement and/or other changes (if any) if previously classified, and classify obstacle (if new or changed) based on obstacle information and classify whether can ignore, remove, avoid and/or causes vehicle movement inhibitions — 410

Optionally use safety configuration data to determine prohibited vehicle arm/attachment/body positions to avoid vehicle body and obstacles for current location — 412

414 — Implement safety monitoring for fully autonomous operations? — No — (A)

Yes

Obtain information about task(s) to perform and optionally vehicle target destination location(s) — 416

418 — Identify additional obstacles (if any) from environment data for additional locations (if any) between current and destination locations and around task location(s)

For each additional obstacle, track movement and/or other changes (if any) if previously classified, and classify obstacle (if new or changed), and optionally use safety configuration data to determine additional prohibited vehicle arm/attachment/body positions to avoid obstacles for additional locations — 420

Determine alternative movement/motion plan(s) with vehicle arm/attachment/body positions to complete task (optionally including associated obstacle removal activities) while avoiding any prohibited positions — 422

428 — Prohibited positions cause inhibition of vehicle operations for all alternatives? — Yes Evaluate alternative movement/motion plan(s), and select plan to implement task if possible — 426

No (B)

RETURN — 499

(C)

Inhibit vehicle operations until conditions change — 430

*Fig. 4A*

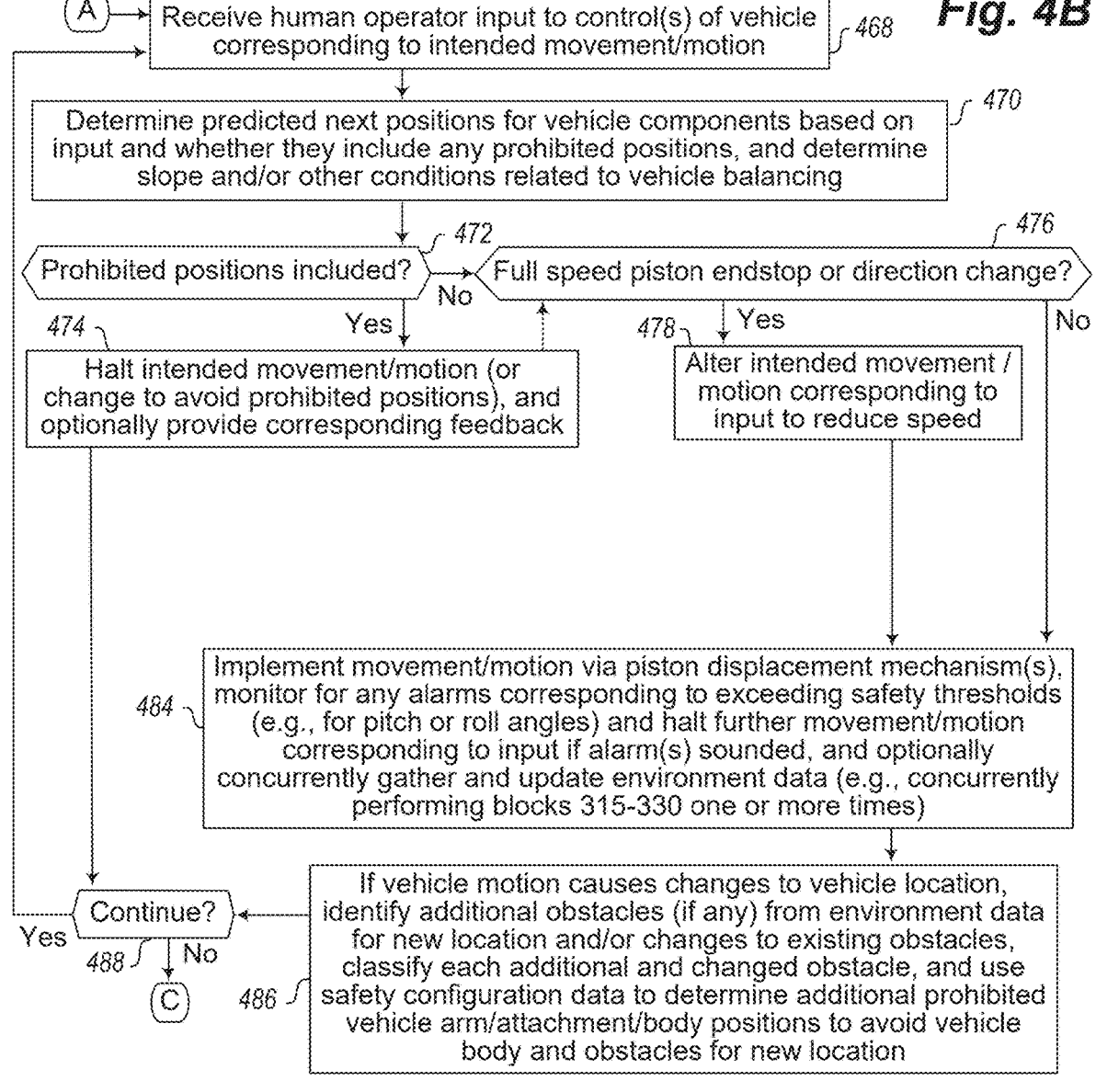

Fig. 4B (A) → Receive human operator input to control(s) of vehicle corresponding to intended movement/motion ⟍ 468

Determine predicted next positions for vehicle components based on input and whether they include any prohibited positions, and determine slope and/or other conditions related to vehicle balancing ⟍ 470

⟨Prohibited positions included?⟩ 472 → ⟨Full speed piston endstop or direction change?⟩ 476

474 ⟍   Yes ↓   No   478 ⟍ Yes   No

Halt intended movement/motion (or change to avoid prohibited positions), and optionally provide corresponding feedback Alter intended movement / motion corresponding to input to reduce speed 484 ⟍ Implement movement/motion via piston displacement mechanism(s), monitor for any alarms corresponding to exceeding safety thresholds (e.g., for pitch or roll angles) and halt further movement/motion corresponding to input if alarm(s) sounded, and optionally concurrently gather and update environment data (e.g., concurrently performing blocks 315-330 one or more times)

⟨Continue?⟩ ← If vehicle motion causes changes to vehicle location, identify additional obstacles (if any) from environment data for new location and/or changes to existing obstacles, classify each additional and changed obstacle, and use safety configuration data to determine additional prohibited vehicle arm/attachment/body positions to avoid vehicle body and obstacles for new location Yes   488 ⟍ ↓ No (C)   486 ⟍

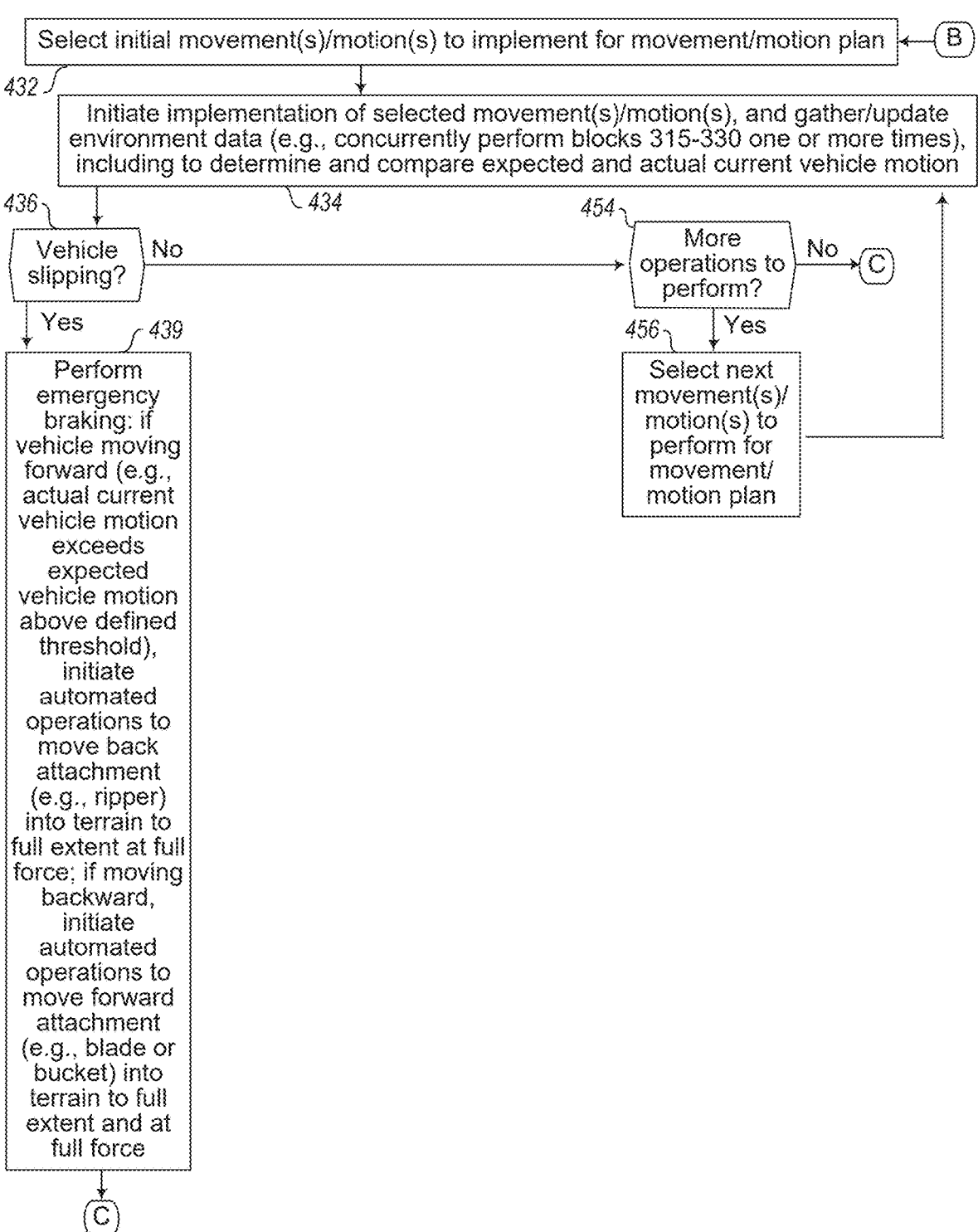

Select initial movement(s)/motion(s) to implement for movement/motion plan ◄── Ⓑ

432

Initiate implementation of selected movement(s)/motion(s), and gather/update environment data (e.g., concurrently perform blocks 315-330 one or more times), including to determine and compare expected and actual current vehicle motion

436

434

Vehicle slipping? ── No ──────────────►

454

More operations to perform? ── No ──► Ⓒ

Yes

439

456

Yes

Perform emergency braking: if vehicle moving forward (e.g., actual current vehicle motion exceeds expected vehicle motion above defined threshold), initiate automated operations to move back attachment (e.g., ripper) into terrain to full extent at full force; if moving backward, initiate automated operations to move forward attachment (e.g., blade or bucket) into terrain to full extent and at full force Select next movement(s)/motion(s) to perform for movement/motion plan

AUTONOMOUS CONTROL OF POWERED EARTH-MOVING VEHICLES TO INHIBIT VEHICLE SLIPPAGE

CROSS REFERENCE TO RELATED APPLICATIONS

This application claims the benefit of U.S. Provisional Patent Application No. 63/532,031, filed Aug. 10, 2023 and entitled "Autonomous Control Of Powered Earth-Moving Construction Or Mining Vehicles To Inhibit Vehicle Slippage," which is hereby incorporated by reference in its entirety.

TECHNICAL FIELD

The following disclosure relates generally to systems and techniques for autonomous control of powered earth-moving vehicles, such as to determine and implement autonomous operations of one or more powered earth-moving mining and/or construction vehicles on a site that include controlling movement of one or more tool attachments of the vehicle(s) to halt or otherwise inhibit unplanned slippage on a sloped and/or slick surface.

BACKGROUND

Earth-moving construction vehicles (e.g., loaders, excavators, bulldozers, deep sea machinery, extra-terrestrial machinery, etc.) may be used on a job site to move soil and other materials (e.g., gravel, rocks, asphalt, etc.) and to perform other operations, and are each typically operated by a human operator (e.g., a human user present inside a cabin of the construction vehicle, a human user at a location separate from the construction vehicle but performing interactive remote control of the construction vehicle, etc.). Similarly, earth-moving mining vehicles may be used to extract or otherwise move soil and other materials (e.g., gravel, rocks, asphalt, etc.) and to perform other operations, and are each typically operated by a human operator (e.g., a human user present inside a cabin of the mining vehicle, a human user at a location separate from the mining vehicle but performing interactive remote control of the mining vehicle, etc.).

Limited fully autonomous operations (e.g., performed under automated programmatic control without human user interaction or intervention) of some construction and mining vehicles have occasionally been used, but existing techniques suffer from a number of problems, including the use of limited types of sensed data, an inability to perform fully autonomous operations when faced with on-site obstacles, an inability to coordinate autonomous operations between multiple on-site construction and/or mining vehicles, requirements for bulky and expensive hardware systems to support the limited autonomous operations, etc.

BRIEF DESCRIPTION OF THE DRAWINGS

FIGS. 4A-4C are an example flow diagram of an illustrated embodiment of an EMVAOC Operations Planner And Implementation module routine.

DETAILED DESCRIPTION

Figure 1A:
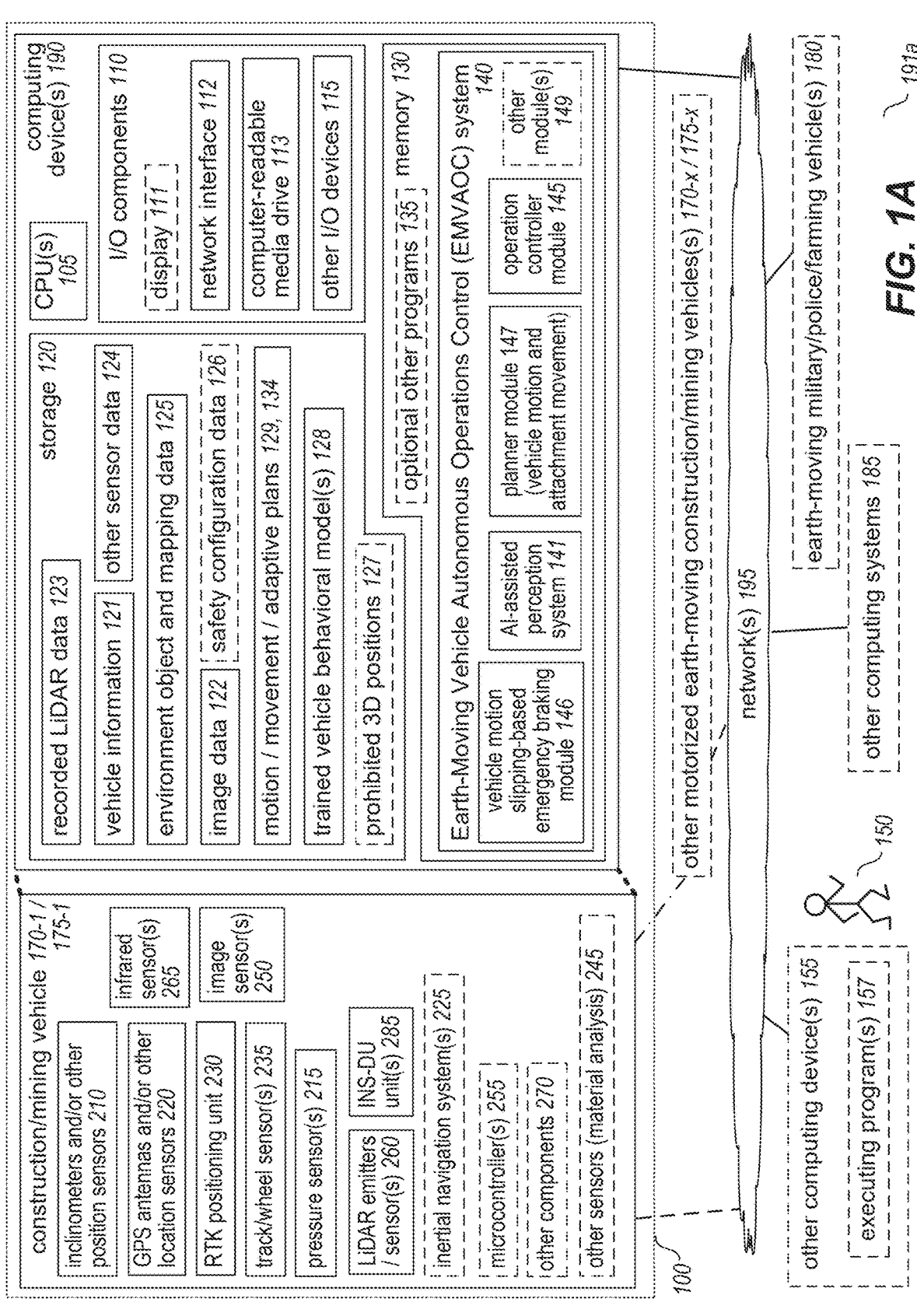
FIG. 1A is a network diagram illustrating an example embodiment of using described systems and techniques to determine and implement autonomous operations of one or more powered earth-moving vehicles on a site using data gathered by on-vehicle sensors and to conform with specified safety configuration data, including to perform automated operations to halt or otherwise inhibit unplanned slippage on a sloped and/or slick surface.

Systems and techniques are described for implementing autonomous control of operations of powered earth-moving vehicles (e.g., construction and/or mining vehicles) on a site, including to automatically control movement of hydraulic arm(s) and/or of tool attachment(s) and/or of other vehicle parts (e.g., wheels or tracks, a rotatable chassis, etc.) of one or more powered earth-moving vehicles on a job site to halt or otherwise inhibit unplanned slippage of a vehicle on a sloped and/or slick surface, such as by implementing movement of one or more tool attachments of the vehicle in a specified manner. Such operations may in at least some embodiments be implemented as part of automated safety-related autonomous operations of the vehicle in accordance with specified safety configuration data, such as to prevent a powered earth-moving vehicle and/or its moveable attachments and other parts (e.g., a rotatable chassis with a cabin; a tool attachment, such as a digging bucket, claw, hammer, blade, etc.; one or more hydraulic arms; etc.) from entering positions in three-dimensional ("3D") space that inhibit safe operations (e.g., positions that cause a lack of balancing above a defined threshold; positions that are already occupied by on-site obstacles and/or other portions of the powered earth-moving vehicle, such as the chassis, tracks or wheels; etc.), and/or to cause other specified safety-related criteria to be satisfied.

In some embodiments and situations, the autonomous control of operations of a powered earth-moving vehicle is performed as part of fully autonomous operations of the powered earth-moving vehicle without any human input during those fully autonomous operations (e.g., to receive human input only to provide information about task goals and/or other configuration settings before the fully autonomous operations commence), including planning motion of the powered earth-moving vehicle between on-site locations and/or movement of component parts of the vehicle (e.g., hydraulic arms, tool attachments, a rotatable chassis, etc.) to accomplish one or more indicated tasks without violating any specified safety configuration data and while satisfying any other specified criteria, and implementing the planned motion/movement via automated manipulation of controls of the vehicle. In some embodiments and situations, the autonomous control of the operations of a powered earth-moving vehicle is performed as part of semi-autonomous operations of the powered earth-moving vehicle, including monitoring manipulation of some or all controls of the vehicle by one or more human operators (whether located in or on the vehicle, or instead remote from the vehicle) during the vehicle operations, and preventing motion/movements of the powered earth-moving vehicle and/or its component parts that would violate specified safety configuration data (e.g., to, even if not manually specified, automatically perform slippage-related operations, etc.). Controlled operations of the powered earth-moving vehicle may in some embodiments and situations be performed while the vehicle remains at a fixed location (e.g., for a tracked excavator vehicle, to include component part movements such as chassis rotation and/or hydraulic arm movements and/or tool attachment movements, but not to include movement of the tracks), and may in some embodiments and situations be performed as the vehicle is in motion from an initial location to a destination location. Additional details related to implementing autonomous control of powered earth-moving vehicles in particular manners are described below, and some or all of the described techniques are performed in at least some embodiments by automated operations of an Earth-Moving Vehicle Autonomous Operations Control ("EMVAOC") system to control one or more powered earth-moving vehicles (e.g., an EMVAOC system operating on at least one powered earth-moving vehicle being controlled).

As noted above, the automated operations of the EMVAOC system may include automatically controlling movement of hydraulic arm(s) and/or of tool attachment(s) and/or of other vehicle parts of one or more powered earth-moving vehicles on a job site to halt or otherwise inhibit unplanned slippage of a vehicle on a sloped and/or slick surface, such as by implementing movement of one or more tool attachments of the vehicle in a specified manner. As one non-exclusive example, the vehicle may be a bulldozer that is configured to have a blade attachment at the front of the vehicle, and a ripper attachment with one or more teeth at the rear of the vehicle, with one or both attachments automatically moved into the ground or other underlying surface to inhibit vehicle slippage when it is automatically detected. More generally, a powered earth-moving vehicle may have one or more tool attachments at a front of the vehicle and one or more tool attachments at a rear of the vehicle, such as a correspondingly outfitted bulldozer, wheel loader, skid steer loader, track loader, grader, farm tractor, breaching vehicle, clearing vehicle, etc., and optionally one or more tool attachments near the middle of the vehicle (e.g., a grader vehicle), whether in addition to or instead of the front and/or rear tool attachments—some or all such tool attachments may be automatically moved into the ground or other underlying surface to inhibit vehicle slippage when it is automatically detected, such as in a determined sequence of multiple such tool attachments. In at least some embodiments, data from various sensors on the powered earth-moving vehicle may be analyzed to detect vehicle slippage, such as including unplanned motion of the vehicle relative to the underlying surface on which it rests that is inconsistent with the movements (if any) of the tracks and/or wheels of the vehicle (e.g., sliding down a sloped surface while the vehicle tracks and/or wheels are not moving, sliding across a level but slick surface at a speed different from that of the vehicle tracks and/or wheels, etc.), optionally over a defined period of time (e.g., N seconds)—additional details are included below related to the use of GPS, INS-DU (inertial navigation system—dual antenna) and/or other on-vehicle sensors to detect the unplanned vehicle motion. In at least some embodiments and situations, when unplanned motion of the vehicle is detected that corresponds at least in part to rearward slippage (e.g., with the front of the vehicle higher than the rear of the vehicle on a sloped inclined surface), at least one front tool attachment (e.g., a blade or bucket) is lowered into the ground or other underlying surface (e.g., all front tool attachments are lowered to the greatest extent possible into the ground or other surface), and in at least some embodiments and situations, when unplanned motion of the vehicle is detected that corresponds at least in part to forward slippage (e.g., with the rear of the vehicle higher than the front of the vehicle on a sloped inclined surface), at least one rear tool attachment (e.g., a ripper tool with one or more teeth) is lowered into the ground or other underlying surface (e.g., all rear tool attachments are lowered to the greatest extent possible into the ground or other surface). In other embodiments and situations, both of the front and rear tool attachments are lowered to the ground or other surface (e.g., if the vehicle is slipping sideways, if the speed of the vehicle slippage reaches a defined threshold, etc.), whether simultaneously or in a defined sequence, and/or one or more tool attachments in the middle of the vehicle are lowered to the ground or other surface, whether instead of or in addition to front and/or rear tool attachments. Additional details are included below related to use of vehicle tool attachments to inhibit vehicle slippage that is detected using one or more on-vehicle sensors.

The described techniques provide various benefits in various embodiments, including to improve efficiency and speed and accuracy and safety in operations involving movement of a powered earth-moving vehicle, including to use one or more tool attachments of the vehicle to halt or otherwise inhibit unplanned slippage of the vehicle on a sloped and/or slick surface based at least in part on initiating and/or maintaining contact of the tool attachment(s) with the ground or other underlying surface. In addition, in some embodiments the described techniques may be used to provide an improved GUI in which one or more users (e.g., on-site and/or remote users) may obtain and view information about operations of one or more powered earth-moving vehicles on a site, and in which an operator user may more accurately control operations of one or more such powered earth-moving vehicles. Various other benefits are also provided by the described techniques, some of which are further described elsewhere herein.

As part of performing the described techniques, the EMVAOC system may in some embodiments obtain and integrate data from sensors of multiple types positioned on a powered earth-moving vehicle at a site, and use the data to determine and control motion of the powered earth-moving vehicle on the site, such as by determining current location and positioning of the powered earth-moving vehicle and its moveable component parts on the site, determining a target destination location and/or route (or 'path') of the powered earth-moving vehicle on the site, identifying and classifying objects and other obstacles (e.g., man-made structures, rocks and other naturally occurring impediments, other equipment, people or animals, non-level terrain, etc.) along one or more possible paths (e.g., multiple alternative paths between current and destination locations), implementing actions to address any such obstacles (e.g., move, avoid, pass over, etc.), and performing movement-related operations (e.g., balancing-related, slippage-related, related to gradual turn control, related to controlled vehicle stoppage, etc.) as needed during vehicle motion (e.g., on non-level surfaces). In addition, in at least some embodiments, the described systems and techniques are further used to implement coordinated actions of multiple powered earth-moving vehicles of one or more types (e.g., one or more excavator vehicles, bulldozer vehicles, front loader vehicles, grader vehicles, loader vehicles, crane vehicles, backhoe vehicles, compactor vehicles, conveyor vehicles, dump trucks or other truck vehicles, etc.).

The described techniques may further include using the data from one or more types of sensors on a powered earth-moving vehicle to map at least some of an environment around the vehicle, including to determine slopes and other non-level surfaces and more generally surface heights and shapes (e.g., to create a grid of cells covering the surface(s) to be mapped, such as with each cell being sized 20 cm by 20 cm or another defined size, and to determine surface height, shape, slope, etc. for each such cell), as well as to detect other obstacles in an area around the vehicle (e.g., in at least an area reachable by a tool attachment and/or other parts of the vehicle), and to optionally further classify the obstacles with respect to multiple defined obstacle types (e.g., having different specified safety configurations). Such data may include, for example, LiDAR data from one or more LiDAR sensors of one or more LiDAR components positioned on the vehicle, and/or image data from one or more camera devices with image sensors positioned on the vehicle, and/or infrared data from one or more infrared sensors positioned on the vehicle, and/or material type data from one or more material type sensors positioned on the vehicle, etc., and with some or all of the sensors optionally mounted on moveable portions of the vehicle (e.g., a hydraulic arm, a tool attachment, etc.) to enable movement of those sensors (e.g., separate from motion of the vehicle) to different positions to obtain additional data readings. The data related to such obstacles may be used to determine positions in 3D space around the vehicle that are prohibited in accordance with the specified safety configuration data or that otherwise trigger safety-related actions, including slopes or other non-level surfaces that exceed defined thresholds, although at least some obstacles may not be included in the prohibited 3D positions (e.g., obstacles that are to be moved as part of one or more tasks, such as rocks or other material that are within the movement capacity of the vehicle's tool attachment; non-level portions of the terrain that are not flat but do not exceed safety parameters for the vehicle to drive over; other obstacles that the vehicle or its parts may move over or through, such as sparse vegetation or water; etc.)—in at least some embodiments, each cell of a grid covering an area around some or all of a vehicle will have one or more 3D data points (e.g., of a generated 3D point cloud) that are used to determine the data for that cell.

The powered earth-moving vehicle may further use additional sensors on some or all moveable parts of the vehicle to determine positions of those parts, including relative to other parts of the vehicle. As one non-exclusive example, a first hydraulic arm attached to a chassis of the vehicle (e.g., a hydraulic 'boom' arm of an excavator vehicle) may include at least one first inclinometer sensor that measures an angle of that first hydraulic arm relative to the chassis, a second hydraulic arm (if any) attached to the first hydraulic arm (e.g., a hydraulic 'stick' arm of an excavator vehicle attached to a hydraulic boom arm) may include at least one additional second inclinometer sensor that measures an angle of that second hydraulic arm relative to the first hydraulic arm, a tool attachment connected to one of the hydraulic arms (e.g., a bucket tool of an excavator vehicle connected to the hydraulic stick arm) may include at least one additional inclinometer sensor that measures an angle of that tool attachment relative to that hydraulic arm to which it is connected, etc., with a combination of the angles for such hydraulic arm(s) and tool attachment then used to determine positions in 3D space of those components relative to a connection point to the vehicle chassis—similar operations may be used for other types of powered earth-moving vehicles, including those having only a single set of one or more hydraulic arms connecting a chassis to a tool attachment, such as to not have one or more second inclinometer sensors as discussed above with respect to an example excavator vehicle). In addition, a cabin or other portion of the chassis may include one or more sensors to provide relative or absolute location and/or direction information (e.g., one or more GPS receivers, such as multiple GPS receivers at known locations on the chassis to in combination provide directional information for the chassis; one or more INS-DU, or inertial navigation system—dual antenna, sensors that combine GPS data with compass data and other IMU, or inertial measurement unit, acceleration and angular velocity data; etc.), and tracks or wheels of the vehicle may include one or more directional sensors to determine a direction of the tracks/wheels (whether an absolute direction and/or a direction relative to the chassis if the chassis and/or tracks/wheels are rotatable), with the relative directions of the tracks/wheels able to be used to determine positions in 3D space of those components relative to the vehicle chassis—if the sensors on the vehicle are able to determine an absolute position of the vehicle chassis, the positions of the vehicle component parts may further be determined in absolute coordinates, such as by using GPS coordinates from one or more GPS antennas mounted on the chassis, optionally after being corrected using real-time kinematic (RTK)-based GPS correction data transmitted via signals from a base station (e.g., at a location remote from the site at which the vehicle is located), and/or by using LIDAR and/or visual data to determine a position of the vehicle within a job site with known locations. The positions of the vehicle component parts may be represented in various manners in various embodiments (e.g., in XYZ coordinates, whether absolute or relative to a position of the vehicle chassis; in angle-based coordinates, such as to represent the position of an excavator vehicle's tool attachment using the first angle for the hydraulic boom arm and the second angle for the hydraulic stick arm and the third angle for the tool attachment; etc.)—the positions of the obstacles around the vehicle and/or the prohibited 3D positions may similarly be represented in the same format as used for the vehicle parts (e.g., in angle-based coordinates relative to the same point on the vehicle's chassis as for moveable parts of the vehicle whose positions use such angle-based coordinates), or instead different position formats may be used for vehicle parts and prohibited 3D positions/obstacle locations, with a conversion determined between formats during use of the vehicle part position information and the information about the prohibited 3D positions/obstacle locations.

As noted above, the automated operations of the EMVAOC system may include automatically planning vehicle motion between two or more locations (e.g., between starting and ending locations on a site) and/or vehicle attachment movements while the powered earth-moving vehicle is stationary and/or in motion. In some embodiments, the EMVAOC system may include one or more planner modules, and at least one such planner module may perform such planning operations for one or more vehicle parts, such as to determine a 3D movement/motion plan that includes a sequence of 3D positions for a vehicle's tool attachment to perform one or more tasks while avoiding prohibited 3D positions and otherwise preventing violations of safety configuration data or satisfying other specified criteria, optionally while the vehicle moves on a path between multiple locations (e.g., in accordance with other goals or planning operations being performed by the EMVAOC system, such as based on an overall analysis of a site and/or as part of accomplishing a group of multiple activities at the site). In particular, the EMVAOC system may implement autonomous control of motion of the vehicle and movements of its component parts to prevent intersection with prohibited 3D positions corresponding to the obstacles and optionally additionally corresponding to positions of parts of the vehicle that can be reached by other moveable component parts of the vehicle (e.g., for an excavator vehicle's tracks and/or chassis that can be reached by the vehicle's tool attachment), whether during planning and implementing fully autonomous operations for the vehicle, and/or for motion/movements initiated in part or in whole by a human operator of the vehicle. These techniques may be further extended for motion of the vehicle between different locations on a job site, such as when moving to a destination location at which one or more tasks will be performed, while moving between locations as part of implementing one or more tasks (e.g., carrying or otherwise moving material between two locations), etc.—as part of doing so, the locations of obstacles along the vehicle motion path(s) may be similarly determined and used to identify prohibited 3D positions along the path(s) that are reachable by the vehicle parts, and movement of the vehicle component parts may be similarly monitored and controlled to avoid those prohibited 3D positions not only at the initial and destination locations but also along the path(s), as well as to implement other vehicle component part positioning in accordance with specified safety configuration data (e.g., to maintain balance of the vehicle, to prevent positions of vehicle parts that cause damage to the vehicle, etc.) or to otherwise satisfy specified criteria. Additional details are included below related to automatically controlling motion of a powered earth-moving vehicle on a job site and movement of vehicle parts to conform with specified safety rules or other specified safety configuration data.

For illustrative purposes, some embodiments are described below in which specific types of data are acquired and used for specific types of automated operations performed for specific types of powered earth-moving vehicles, and in which specific types of autonomous operation activities are performed in particular manners. However, it will be understood that such described systems and techniques may be used with other types of data and powered earth-moving vehicles and associated autonomous operation activities in other manners in other embodiments, and that the invention is thus not limited to the exemplary details provided. In addition, the terms "acquire" or "capture" or "record" as used herein with reference to sensor data may refer to any recording, storage, or logging of media, sensor data, and/or other information related to a powered earth-moving vehicle or job site or other location or subsets thereof (unless context clearly indicates otherwise), such as by a recording device or by another device that receives information from the recording device. In addition, various details are provided in the drawings and text for exemplary purposes, but are not intended to limit the scope of the invention. For example, sizes and relative positions of elements in the drawings are not necessarily drawn to scale, with some details omitted and/or provided with greater prominence (e.g., via size and positioning) to enhance legibility and/or clarity. Furthermore, identical reference numbers may be used in the drawings to identify similar elements or acts.

Figure 2A:
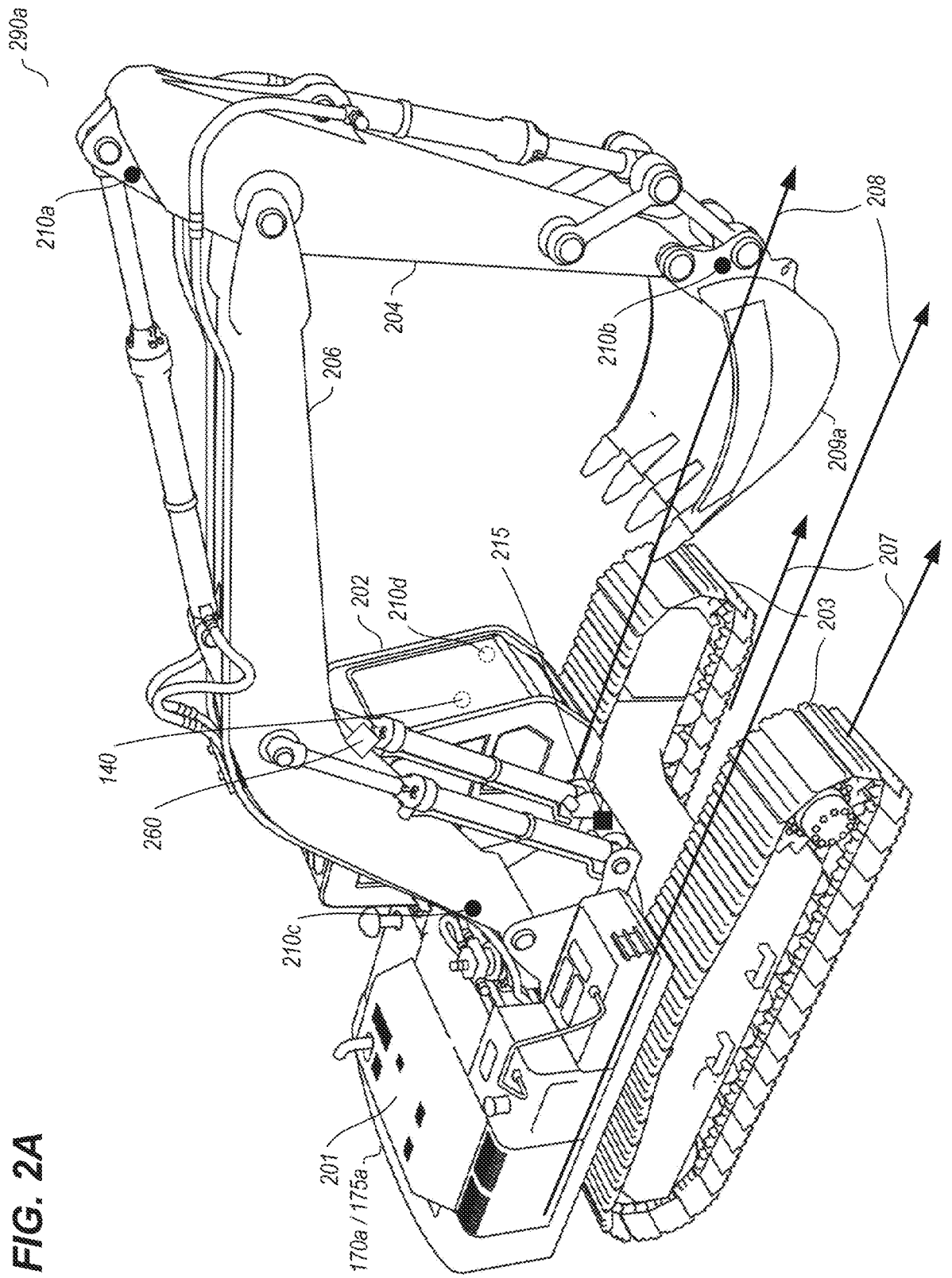
FIGS. 2A-2P illustrate examples of powered earth-moving construction and/or mining vehicles having an on-vehicle autonomous operations control system and multiple types of on-vehicle data sensors positioned to support autonomous operations on a site.

FIG. 1A is a diagram illustrating information 191*a* including an example embodiment of an EMVAOC ("Earth-Moving Vehicle Autonomous Operations Control") system 140 that may be used to implement at least some of the described systems and techniques for implementing autonomous control of powered earth-moving vehicles, such as to automatically control motion of one or more powered earth-moving vehicles between locations on a job site and movement of component parts of the vehicle(s) to conform with specified safety rules or other specified safety configuration data and/or to otherwise satisfy specified criteria, including to perform automated operations to use vehicle tool attachments to halt or otherwise inhibit unplanned slippage on a sloped and/or slick surface. The EMVAOC system 140 may be implemented using one or more hardware processors 105, such as part of one or more network-accessible configured computing devices 190—such a computing device may in some embodiments and situations be part of a self-contained control unit located on a powered earth-moving vehicle (e.g., without a separate cooling unit, and operable without receiving external instructions), such as when the EMVAOC system 140 is part of otherwise integrated 100 with a particular powered earth-moving construction vehicle 170-1 and/or powered earth-moving mining vehicle 175-1 (e.g., located on that powered earth-moving vehicle) and/or other powered earth-moving vehicle(s) 180 (e.g., located on that powered earth-moving vehicle), such as one or more military vehicles and/or police vehicles and/or farming vehicles. In other embodiments and situations, the EMVAOC system 140 may support multiple powered earth-moving vehicles 170 and/or 175 and/or 180 (e.g., operating in a distributed manner on the multiple vehicles, such as via one or more computing devices 190 on each of the multiple vehicles that are interacting in a peer-to-peer manner), and/or may operate remotely from one or more such powered earth-moving vehicles 170 and/or 175 and/or 180 (e.g., at a location on site and in communication with one or more such powered earth-moving vehicles over one or more networks 195). In some embodiments, one or more other computing devices or systems may further interact with the EMVAOC system 140 (e.g., to obtain and/or provide information), such as one or more other computing devices 155 each having one or more associated users and optionally executing one or more software programs 157, and/or one or more other computing systems 185 (e.g., to store and provide data, to provide supplemental computing capabilities, etc.). The one or more computing devices 190 may include any computing device or system that may receive data and/or requests, and take corresponding actions (e.g., store the data, respond to the request, etc.) as discussed herein. The earth-moving vehicle(s) 170 and/or 175 and/or 180 may correspond to various types of vehicles and have various forms, such as are illustrated in FIGS. 2A-2Q.

In this example, the powered earth-moving vehicle 170-1 or 175-1 includes a variety of sensors to obtain and determine information about the powered earth-moving vehicle and its surrounding environment (e.g., a job site on which the powered earth-moving vehicle is located), including one or more GPS antennas and/or other location sensors 220, one or more inclinometers and/or other position sensors 210, one or more image sensors 250 (e.g., visible light sensors that are part of one or more cameras or other image capture devices), one or more LiDAR components 260 (e.g., with LiDAR emitters and sensors), one or more infrared sensors 265, one or more pressure sensors 215, optionally an RTK-enabled GPS positioning unit 230 that receives GPS signals from the GPS antenna(s) and RTK-based correction data from a remote base station (not shown) and optionally other data from one or more other sensors and/or devices, optionally one or more INS-DU (inertial navigation system—dual antenna) units 285 (e.g., each using 3-axis precision magnetometers, accelerometers and gyroscopes along with GPS data, such as RTK-corrected GPS data, for high-precision position determination) or other inertial navigation systems 225, optionally one or more track or wheel alignment sensors 235, optionally one or more other sensors 245 (e.g., material analysis sensors, sensors associated with radar and/or ground-penetrating radar and/or sonar, etc.), etc. The powered earth-moving vehicle 170-1 or 175-1 may further optionally include one or more microcontrollers or other hardware CPUs 255 and/or other hardware components 270 (e.g., corresponding to some or all of the components 110, 120 and 130), such as part of a self-contained control unit that operates on the vehicle without a cooling unit to implement some or all of the EMVAOC system 140 (e.g., to execute some or all of the AI-assisted perception system 141, planner module 147, vehicle motion slipping-based emergency braking module 146, operation controller module 145, etc.).

The EMVAOC system 140 obtains some or all of the data from the sensors on the powered earth-moving vehicle 170-1 or 175-1, stores the data in corresponding databases or other data storage formats on storage 120 (e.g., vehicle information 121, image data 122, LiDAR data 123, other sensor data 124, environment object (e.g., obstacle) and other mapping (e.g., terrain) data 125, etc.), and uses the data to perform automated operations involving controlling autonomous operations of the powered earth-moving vehicle 170-1 or 175-1 in accordance with specified safety configuration data 126 and/or other specified criteria (not shown), including related to performing automated operations to use vehicle tool attachments to halt or otherwise inhibit unplanned slippage on a sloped and/or slick surface. In this example embodiment, the EMVAOC system 140 has modules that include an AI-assisted perception system 141 (e.g., to analyze LiDAR and/or visual data of the environment to identify objects and/or determine mapping data 125 for an environment around the vehicle 170-1 and/or 175-1, such as a 3D point cloud, a terrain contour map or other visual map, etc.), a vehicle motion and part movement planner module 147 (e.g., to determine how to accomplish a goal that includes movement of one or more component parts of a vehicle, such as to perform operations related to slippage, optionally while avoiding prohibited 3D positions and/or performing one or more tasks, as well as optionally moving the powered earth-moving vehicle from its current location to a determined target destination location and determining how to handle any possible obstacles between the current and destination locations), a system operation manager module 145 (e.g., to control overall operation of the EMVAOC system and/or the vehicle 170-1 and/or 175-1), a vehicle motion slipping-based emergency braking module 146 (e.g., to automatically control movement of hydraulic arm(s) and/or of tool attachment(s) and/or of other vehicle parts in a specified manner to halt or otherwise inhibit unplanned slippage of a vehicle on a sloped and/or slick surface), etc. Such modules may generate and use additional data as part of their operations, including for the planner module to use one or more trained vehicle behavioral models 128 as part of implementing planned vehicle motion and vehicle component part movements and generating one or more corresponding vehicle motion plans and/or vehicle part movement plans 129 (e.g., to perform one or more tasks), and later determining and implementing one or more adaptive vehicle motion/movement plans 134 for use in addressing changing conditions while performing other operations (e.g., to adapt an original motion/movement plan 129 in use when the changing conditions occur), such as adaptive plans related to emergency braking procedures when slippage that satisfies defined criteria is detected—slippage criteria may include, for example, unplanned motion of the vehicle relative to the underlying surface on which it rests that is inconsistent with the movements (if any) of the tracks and/or wheels of the vehicle, such as resulting from having a slope greater than a defined threshold slope amount, being on an incline or decline with a height greater than one or more defined threshold height amounts, being on an incline or decline with a length greater or lesser than one or more defined threshold length amounts, being on a surface with a material of a defined type, being on a surface having a coefficient of friction below a defined threshold friction amount, having a weight of the vehicle and/or its load being above a defined weight threshold amount, etc. In addition, such modules may generate and use additional data as part of training the behavioral model(s) (e.g., using actual operational data from one or more powered earth-moving vehicles 170/175/180 and or simulated data from one or more simulator modules, not shown), etc. The modules of the EMVAOC system 140 may further optionally include one or more other modules 149 to perform additional automated operations and provide additional capabilities (e.g., an obstacle determiner module to analyze information about potential obstacles in an environment of powered earth-moving vehicle 170-1 or 175-1 and determine corresponding information, such as a classification of the type of the obstacle, for use in generating prohibited 3D position data 127 corresponding to the obstacles and optionally parts of the vehicle; one or more modules to analyze and describe a job site or other surrounding environment, such as quantities and/or types and/or locations and/or activities of vehicles and/or people; one or more GUI modules, including to optionally support one or more VR (virtual reality) headsets/glasses and/or one or more AR (augmented reality) headsets/glasses and/or mixed reality headsets/glasses optionally having corresponding input controllers; etc.). In at least some embodiments, some of the EMVAOC system 140 may execute on a powered earth-moving vehicle, while other parts of the EMVAOC system 140 (e.g., the planner module 147) may execute remotely from the powered earth-moving vehicle and exchange information with the portions of the EMVAOC system 140 executing on the powered earth-moving vehicle. Additional details related to the operation of the EMVAOC system 140 are included elsewhere herein.

In this example embodiment, the one or more computing devices 190 include a copy of the EMVAOC system 140 stored in memory 130 and being executed by one or more hardware CPUs 105—software instructions of the EMVAOC system 140 may further be stored on storage 120 (e.g., for loading into memory 130 at a time of execution), but are not separately illustrated in this example. The computing device(s) 190 and EMVAOC system 140 may be implemented using a plurality of hardware components that form electronic circuits suitable for and configured to, when in combined operation, perform at least some of the techniques described herein. In the illustrated embodiment, each computing device 190 includes the one or more hardware CPUs (e.g., microprocessors), storage 120, memory 130, and various input/output ("I/O") components 110, with the illustrated I/O components including a network connection interface 112, a computer-readable media drive 113, optionally a display 111, and other I/O devices 115 (e.g., keyboards, mice or other pointing devices, microphones, speakers, one or more VR headsets and/or glasses with corresponding input controllers, one or more AR headsets and/or glasses with corresponding input controllers, one or more mixed reality headsets and/or glasses with corresponding input controllers, etc.), although in other embodiments at least some such I/O components may not be provided (e.g., if the CPU(s) include one or more microcontrollers). The memory may further include one or more optional other executing software programs 135 (e.g., an engine to provide output to one or more VR and/or AR and/or mixed reality devices and optionally receive corresponding input). The other computing devices 155 and computing systems 185 may include hardware components similar to those of a computing device 190, but with those details being omitted for the sake of brevity.

One or more other powered earth-moving construction vehicles 170-x and/or powered earth-moving mining vehicles 175-x and/or earth-moving military vehicles 180 and/or earth-moving police vehicles 180 and/or earth-moving farming vehicles 180 may similarly be present (e.g., on the same job site as powered earth-moving vehicle 170-1 or 175-1) and include some or all such components 210-285 and/or 105-149 (although not illustrated here for the sake of brevity) and have corresponding autonomous operations controlled by the EMVAOC system 140 (e.g., with the EMVAOC system operating on a single powered earth-moving vehicle and communicating with the other powered earth-moving vehicles via wireless communications, with the EMVAOC system executing in a distributed manner on some or all of the powered earth-moving vehicles, etc.) or by another embodiment of the EMVAOC system (e.g., with each powered earth-moving vehicle having a separate copy of the EMVAOC system executing on that powered earth-moving vehicle and optionally operating in coordination with each other, etc.). The network 195 may be of one or more types (e.g., the Internet, one or more cellular telephone networks, etc.) and in some cases may be implemented or replaced by direct wireless communications between two or more devices (e.g., via Bluetooth; LoRa, or Long Range Radio; etc.). In addition, while the example of FIG. 1A includes various types of data gathered for a powered earth-moving vehicle and its surrounding environment, other embodiments may similarly gather and use other types of data, whether instead of or in addition to the illustrated types of data, including non-exclusive examples of image data in one or more non-visible light spectrums (e.g., infrared, ultraviolet, radiation, etc.), other energy data (e.g., sound, radiation, etc.), location data of types other than from satellite-based navigation systems, depth or distance data to an object, color data, etc. In addition, in some embodiments and situations, different devices and/or sensors may be used to acquire the same or overlapping types of data (e.g., simultaneously), and the EMVAOC system may combine or otherwise use such different types of data, including to determine differential information for a type of data.

Figure 1B:
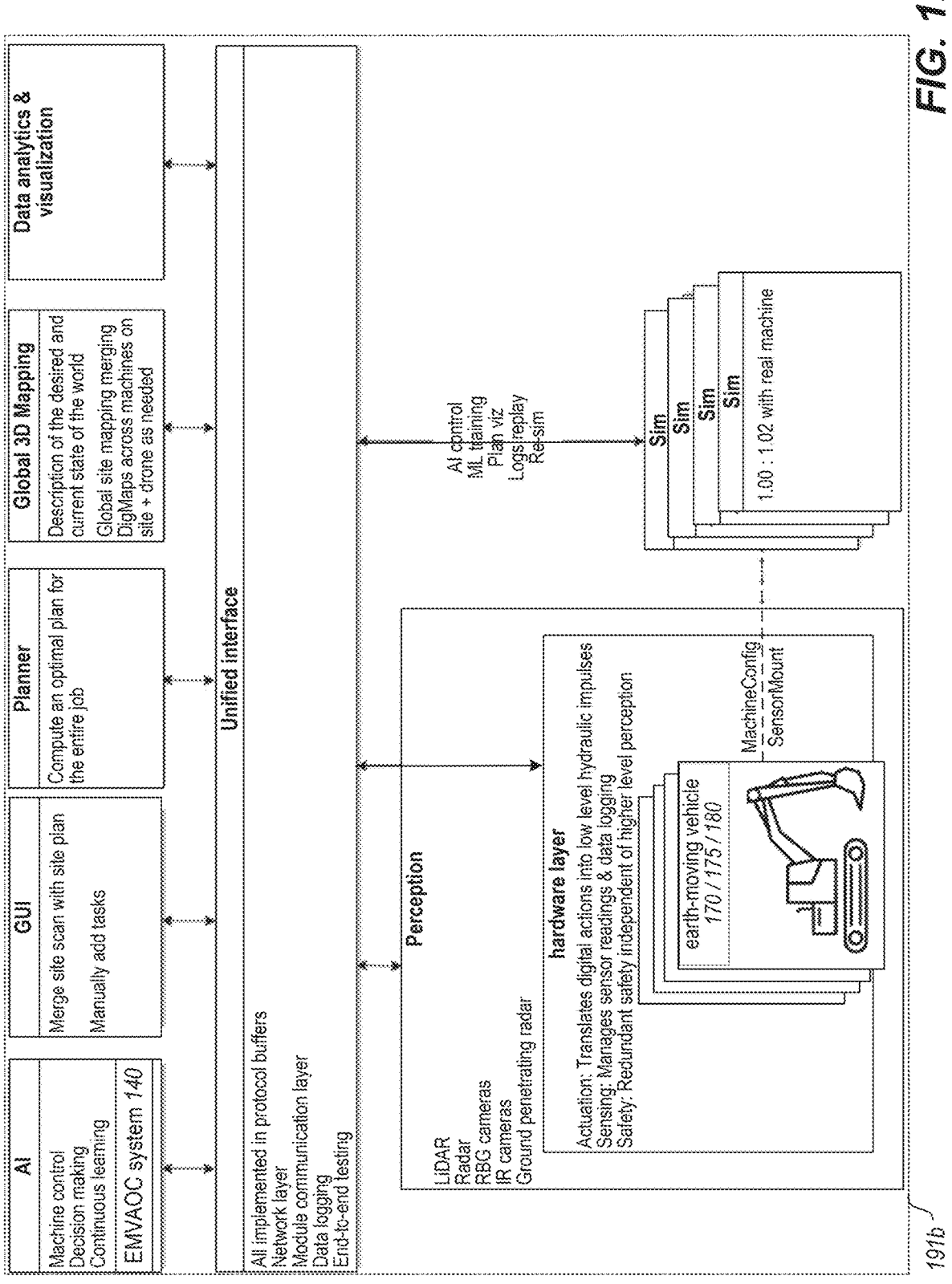
FIG. 1B is a diagram illustrating example components and interactions used to implement autonomous operations of one or more powered earth-moving vehicles on a site.

FIG. 1B illustrates example modules and interactions used to implement autonomous operations of one or more powered earth-moving vehicles on a site, such as to provide an overview of a software and/or hardware architecture used for performing at least some of the described techniques in at least some embodiments. In particular, FIG. 1B illustrates information 191b that includes a hardware layer associated with one or more types of powered earth-moving vehicles 170 and/or powered earth-moving mining vehicles 175 and/or powered earth-moving vehicles 180 (e.g., corresponding to components 210-285 of FIG. 1A), such as to receive instructions about controlling autonomous operation of the earth-moving vehicle(s) 170/175/180, and to perform actions that include actuation (e.g., translating digital actions into low-level hydraulic impulses, including in some embodiments to use one or more piston displacement mechanisms located on a powered earth-moving vehicle 170/175/180 and positioned to manipulate one or more controls of the powered earth-moving vehicle when actuated, such as one or more joystick controls, pedal controls, button controls, switch controls, etc.), sensing (e.g., to manage sensor readings and data logging), safety (e.g., to perform redundant safety independent of higher-level perception operations), etc. In the illustrated example, the hardware layer interacts with or as part of a perception module, such as to use one or more sensor types to obtain data about the earth-moving vehicle(s) and/or their environment (e.g., LiDAR data, radar data, visual data from one or more RGB camera devices, infrared data from one or more IR sensors, ground-penetrating radar data, sound data, etc.). The perception module and/or hardware layer may further interact with a unified interface that connects various modules, such as to operate a network layer and to be implemented in protocol buffers as part of providing a module communication layer, as well as to perform data logging, end-to-end testing, etc. In the illustrated example, the unified interface further interacts with an AI (artificial intelligence) module (e.g., that includes the EMVAOC system 140), a GUI module, a Planner module, a Global 3D Mapping module, one or more Sim simulation modules (e.g., operational data simulator modules that are part of the EMVAOC system 140), and one or more other modules to perform data analytics and visualization. In this example, the AI module provides functionality corresponding to machine control, decision-making, continuous learning, etc. The GUI module perform activities that include providing information of various types to users (e.g., from the EMVAOC system) and manually receiving information (e.g., to be provided to the EMVAOC system, to add tasks to be performed, to merge a site scan with a site plan, etc.). The Planner module performs operations that may include computing an optimal plan for an entire job (e.g., with various tasks to be performed in sequence and/or serially), and the Global 3D Mapping module performs activities that may include providing a description of a current state and/or desired state of an environment around the earth-moving vehicle(s), performing global site mapping merging (e.g., using DigMaps across earth-moving vehicles on the site and optionally drones, such as terrain height and shape), etc. The one or more Sim modules perform simulations to provide data from simulated operation of the one or more earth-moving vehicles, such as for use in AI control, machine learning neural network training (e.g., for one or more behavioral models), replaying logs, planning visualizations, etc. It will be appreciated that the EMVAOC system may be implemented in other architectures and environments in other embodiments, and that the details of FIG. 1B are provided for illustrative purposes. In addition, while not illustrated in FIG. 1B, in some embodiments one or more specialized versions of the EMVAOC system may be used for particular types of powered earth-moving vehicles, with non-exclusive examples including the following: an Excavator Motion/ Movement Control (EMC) system to control motion/move- ment of one or more excavator vehicles; an Excavator X Motion/Movement Control (EMC-X) system to similarly control a particular construction and/or mining excavator X vehicle; a Dump Truck Motion/Movement Control (DTMC) system to control motion/movement of one or more types of construction and/or mining dump truck vehicles; a Dump Truck X Motion/Movement Control (DTMC-X) system to similarly control a particular construction and/or mining dump truck X vehicle; a Wheel Loader Motion/Movement Control (WLMC) system to control motion/movement of one or more types of construction and/or mining wheel loader vehicles; a Wheel Loader X Motion/Movement Con- trol (WLMC-X) system to similarly control a particular construction and/or mining wheel loader X vehicle; one or more other motion/movement control systems specific to particular types of construction and/or mining vehicles other than excavators and dump trucks and wheel loaders; a Construction Vehicle Motion/Movement Control (CVMC) system to control some or all types of powered earth-moving construction vehicles; a Mining Vehicle Motion/Movement Control (MVMC) system to control some or all types of powered earth-moving mining vehicles; etc.

It will be appreciated that computing devices, computing systems and other equipment (e.g., powered earth-moving vehicle(s) included within FIGS. 1A-1B are merely illustra- tive and are not intended to limit the scope of the present invention. The systems and/or devices may instead each include multiple interacting computing systems or devices, and may be connected to other devices that are not specifi- cally illustrated, including via Bluetooth communication or other direct communication, a mesh network, through one or more networks such as the Internet, via the Web, or via one or more private networks (e.g., mobile communication net- works, etc.). More generally, a device or other system may comprise any combination of hardware that may interact and perform the described types of functionality, optionally when programmed or otherwise configured with particular software instructions and/or data structures, including with- out limitation desktop or other computers (e.g., tablets, slates, etc.), database servers, network storage devices and other network devices, smart phones and other cell phones, consumer electronics, wearable devices, digital music player devices, handheld gaming devices, PDAs, wireless phones, Internet appliances, camera devices and accessories, and various other consumer products that include appropriate communication capabilities. In addition, the functionality provided by the illustrated EMVAOC system 140 may in some embodiments be distributed in various modules, some of the described functionality of the EMVAOC system 140 may not be provided, and/or other additional functionality may be provided.

It will also be appreciated that, while various items are illustrated as being stored in memory or on storage while being used, these items or portions of them may be trans- ferred between memory and other storage devices for pur- poses of memory management and data integrity. Alterna- tively, in other embodiments some or all of the software modules and/or systems may execute in memory on another device and communicate with the illustrated computing systems via inter-computer communication. Thus, in some embodiments, some or all of the described techniques may be performed by hardware means that include one or more processors and/or memory and/or storage when configured by one or more software programs (e.g., by the EMVAOC system 140 executing on computing device(s) 190) and/or data structures (e.g., in databases 121-129 and 134), such as by execution of software instructions of the one or more software programs and/or by storage of such software instructions and/or data structures, and such as to perform algorithms as described in the flow charts and other disclo- sure herein. Furthermore, in some embodiments, some or all of the systems and/or modules may be implemented or provided in other manners, such as by consisting of one or more means that are implemented partially or fully in firmware and/or hardware (e.g., rather than as a means implemented in whole or in part by software instructions that configure a particular CPU or other processor), includ- ing, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex pro- grammable logic devices (CPLDs), etc. Some or all of the modules, systems and data structures may also be stored (e.g., as software instructions or structured data) on a non-transitory computer-readable storage mediums, such as a hard disk or flash drive or other non-volatile storage device, volatile or non-volatile memory (e.g., RAM or flash RAM), a network storage device, or a portable media article (e.g., a DVD disk, a CD disk, an optical disk, a flash memory device, etc.) to be read by an appropriate drive or via an appropriate connection. The systems, modules and data structures may also in some embodiments be transmitted via generated data signals (e.g., as part of a carrier wave or other analog or digital propagated signal) on a variety of com- puter-readable transmission mediums, including wireless- based and wired/cable-based mediums, and may take a variety of forms (e.g., as part of a single or multiplexed analog signal, or as multiple discrete digital packets or frames). Such computer program products may also take other forms in other embodiments. Accordingly, embodi- ments of the present disclosure may be practiced with other computer system configurations.

As noted above, in at least some embodiments, data may be obtained and used by the EMVAOC system from sensors of multiple types that are positioned on or near one or more powered earth-moving vehicles, such as one or more of the following: GPS data or other location data; inclinometer data or other position data for particular movable parts of an earth-moving vehicle (e.g., a digging arm/tool attachment of an earth-moving vehicle); real-time kinematic (RTK) posi- tioning information based on GPS data and/or other posi- tioning data that is corrected using RTK-based GPS correc- tion data transmitted via signals from a base station (e.g., at a location remote from the site at which the vehicle is located); track and cabin heading data; visual data of cap- tured image(s) using visible light; depth data from depth- sensing and proximity devices such as LiDAR (e.g., depth and position data for points visible from the LiDAR sensors, such as three-dimensional, or "3D", points corresponding to surfaces of terrain and objects) and/or other than LiDAR (e.g., ground-penetrating radar, above-ground radar, other laser rangefinding techniques, synthetic aperture radar or other types of radar, sonar, structured light, etc.); infrared data from infrared sensors; material type data for loads and/or a surrounding environment from material analysis sensors; load weight data from pressure sensors; etc. As one non-exclusive example, the described systems and tech- niques may in some embodiments include obtaining and integrating data from sensors of multiple types positioned on a powered earth-moving vehicle at a site, and using the data to determine and control operations of the vehicle to accomplish one or more defined tasks at the site (e.g., dig a hole of a specified size and/or shape and/or at a specified location, move one or more rocks from a specified area, extract a specified amount of one or more materials, remove hazardous or toxic material from above ground and/or underground, perform trenching, perform demining, perform breaching, etc.), including determining current location and positioning of the vehicle on the site, determining and implementing movement around the site, determining and implementing operations involving use of the vehicle's tool attachment(s) and/or arms (e.g., hydraulic arms), etc. Such powered earth-moving construction vehicles (e.g., one or more tracked or wheeled excavators, bulldozers, tracked or wheeled skid loaders or other loaders such as front loaders and backhoe loaders, graders, cranes, compactors, conveyors, dump trucks or other trucks, deep sea construction machinery, extra-terrestrial construction machinery, etc.) and powered earth-moving mining vehicles (e.g., one or more tracked or wheeled excavators, bulldozers, tracked or wheeled skid loaders and other loaders such as front loaders and backhoe loaders, scrapers, graders, cranes, trenchers, dump trucks or other trucks, deep sea mining machinery, extra-terrestrial mining machinery, etc.) are referred to generally as 'earth-moving vehicles' herein, and while some illustrative examples are discussed below with respect to controlling one or more particular types of vehicles (e.g., excavator vehicles, wheel loaders or other loader vehicles, dump truck or other truck vehicles, etc.), it will be appreciated that the same or similar techniques may be used to control one or more other types of powered earth-moving vehicles (e.g., vehicles used by military and/or police for operations such as breaching, demining, etc., including demining plows, breaching vehicles, etc.). With respect to sensor types, one or more types of GPS antennas and associated components may be used to determine and provide GPS data in at least some embodiments, with one non-exclusive example being a Taoglas MagmaX2 AA.175 GPS antenna. In addition, one or more types of LiDAR devices may be used in at least some embodiments to determine and provide depth data about an environment around an earth-moving vehicle (e.g., to determine a 3D, or three-dimensional, model of some or all of a job site on which the vehicle is situated), with non-exclusive examples including LiDAR sensors of one or more types from Livox Tech. (e.g., Mid-70, Avia, Horizon, Tele-15, Mid-40, Mid-100, HAP, etc.) and with corresponding data optionally stored using Livox's LVX point cloud file format v1.1, LiDAR sensors of one or more types from Ouster Inc. (e.g., OS0 and/or OS1 and/or OS2 sensors), etc.—in some embodiments, other types of depth-sensing and/or 3D modeling techniques may be used, whether in addition to or instead of LiDAR, such as using other laser rangefinding techniques, synthetic aperture radar or other types of radar, sonar, image-based analyses (e.g., SLAM, SfM, etc.), structured light, etc. Furthermore, one or more proximity sensor devices may be used to determine and provide short-distance proximity data in at least some embodiments, with one non-exclusive example being an LJ12A3-4-Z/BX inductive proximity sensor from ETT Co., Ltd. Moreover, real-time kinematic positioning information may be determined from a combination of GPS data and other positioning data, with one non-exclusive example including use of a u-blox ZED-F9P multi-band GNSS (global navigation satellite system) RTK positioning component that receives and uses GPS, GLONASS, Galileo and BeiDou data, such as in combination with an inertial navigation system (with one non-exclusive example including use of MINS300 by BW Sensing) and/or a radio that receives RTK correction data (e.g., a Digi XBee SX 868 RF module, Digi XBee SX 900 RF module, etc.). Other hardware components that may be positioned on or near an earth-moving vehicle and used to provide data and/or functionality used by the EMVAOC system include the following: one or more inclinometers (e.g., single axis and/or double axis) or other accelerometers (with one non-exclusive example including use of an inclination sensor by DIS sensors, such as the QG76 series); a CAN bus message transceiver (e.g., a TCAN 334 transceiver with CAN flexible data rate); one or more low-power microcontrollers (e.g., an i.MX RT1060 Arm-based Crossover MCU microprocessor from NXP Semiconductors; an ARM Cortex-M7 at 600 MHz, whether operating on its own or present on a PJRC Teensy 4.1 Development Board; a Grove 12-bit Magnetic Rotary Position Sensor AS5600, etc.) or other hardware processors, such as to execute and use executable software instructions and associated data of the EMVAOC system; one or more voltage converters and/or regulators (e.g., an ST LT1576 or LD1117 or LM217 or LM317 adjustable voltage regulator, etc.); a voltage level shifter (e.g., using a field effect transistor, such as a Fairchild Semiconductor BSS138 N-Channel Logic Level Enhancement Mode Field Effect Transistor); etc. In addition, in at least some embodiments and situations, one or more types of data from one or more sensors positioned on an earth-moving vehicle may be combined with one or more types of data (whether the same types of data and/or other types of data) acquired from one or more positions remote from the earth-moving vehicle (e.g., from an overhead location, such as from a drone aircraft, an airplane, a satellite, etc.; elsewhere on a site on which the earth-moving vehicle is located, such as at a fixed location and/or on another earth-moving vehicle of the same or different type; etc.), with the combination of data used in one or more types of autonomous operations as discussed herein. Additional details are included below regarding positioning of data sensors and use of corresponding data, including with respect to the examples of FIGS. 2A-2Q.

As is also noted above, automated operations of an EMVAOC system may include determining current location and other positioning of a powered earth-moving vehicle on a site in at least some embodiments. As one non-exclusive example, such position determination may include using one or more track sensors to monitor whether or not a vehicle's tracks are aligned in the same direction as the vehicle's cabin and/or chassis, and using GPS data (e.g., from 3 GPS antennas located on the vehicle's cabin and/or chassis, such as in a manner similar to that described with respect to FIGS. 2A-2Q) optionally in conjunction with an inertial navigation system to determine the rotation of the cabin and/or chassis (e.g., relative to true north). When using data from multiple GPS antennas, the data may be integrated in various manners, such as by using a microcontroller located on the powered earth-moving vehicle, and with additional RTK (real-time kinetic) positioning data optionally used to reinforce and provide further precision with respect to the GPS-based location (e.g., to achieve 1-inch precision or better). In addition, in some embodiments and situations, LiDAR data is used to assist in position determination operations, such as by surveying the surrounding environment around the powered earth-moving vehicle (e.g., some or all of a job site on which the powered earth-moving vehicle is located, such as terrain of the job site and objects on the job site) and confirming a current location of the powered earth-moving vehicle in two-dimensional ("2D") and/or three-dimensional ("3D") space, whether an absolute location (e.g., using GPS locations) and/or a relative location (e.g., using one or more points on the vehicle or other defined point(s) as a center point relative to which other points are mapped), and in some cases relative to a 2D and/or 3D map of the job site generated from the LIDAR data and/or from analysis of visual data of images (e.g., a 3D point cloud having a plurality of data points each with an associated position in 3D space and representing a point on a surface, such as the ground or other terrain, an obstacle or other object above the ground, etc.; other types of 3D representations, such as meshes, planar surfaces or other types of surfaces, parametric models, depth-maps, RGB-D, voxels, etc.; 2D point clouds and/or other 2D representations; etc.). Additional details are included below regarding such automated operations to determine current location and other positioning of a powered earth-moving vehicle on a site.

In addition, automated operations of an EMVAOC system may further include determining a target destination location and/or path of a powered earth-moving vehicle on a job site or other geographical area. For example, one or more planner modules of the EMVAOC system determine a current target destination location and/or path of a powered earth-moving vehicle (e.g., in accordance with other goals or planning operations being performed by the EMVAOC system, such as based on an overall analysis of a site and/or as part of accomplishing a group of multiple activities at the site). In addition, the motion of the powered earth-moving vehicle from a current location to a target destination location or otherwise along a determined path may be initiated in various manners, such as by an operator module of the EMVAOC system that acts in coordination with the one or more planner modules (e.g., based on a planner module providing instructions to the operator module about current work to be performed, such as work for a current day that involves the powered earth-moving vehicle leaving a current work area and moving to a new area to work), or directly by a planner module (e.g., to move to a new location along a path to perform terrain leveling and/or to prepare for digging). In other embodiments, determination of a target destination location and/or path and initiation of powered earth-moving vehicle motion may be performed in other manners, such as in part or in whole based on input received from one or more human users or other sources. Additional details are included below regarding such automated operations to determine a target destination location and/or path of a powered earth-moving vehicle on a site.

Automated operations of an EMVAOC system may further in at least some embodiments include identifying and classifying obstacles (if any) along one or more paths between current and destination locations, and implementing actions to address any such obstacles. For example, LiDAR data (or other depth-sensing data) and/or visual data may be analyzed to identify objects that are possible obstacles and as part of classifying a type of each obstacle, and other types of data (e.g., infrared, material type, sound, etc.) may be further used as part of classifying an obstacle type (e.g., to determine whether an obstacle is a human or animal, such as based at least in part by having a temperature above at least one first temperature threshold, whether an absolute temperature threshold or a temperature threshold relative to a temperature of a surrounding environment; whether an obstacle is a running vehicle, such as based at least in part by having a temperature above at least one second temperature threshold, whether an absolute temperature threshold or a temperature threshold relative to a temperature of a surrounding environment, and/or based on sounds being emitted; to estimate weight and/or other properties based at least in part on one or more types of material of the obstacle; etc.), and in some embodiments and situations by using one or more trained machine learning models (e.g., using a point cloud analysis routine for object classification) or via other types of analysis (e.g., image analysis techniques). As one non-exclusive example, each obstacle may be classified on a scale from 1 (easy to remove) to 10 (not passable), including to consider factors such as whether an obstacle is a human or other animal, is another vehicle that can be moved (e.g., using coordinated autonomous operation of the other vehicle), is infrastructure (e.g., cables, plumbing, etc.), based on obstacle size (e.g., using one or more size thresholds) and/or obstacle material (e.g., is water, oil, soil, rock, etc.) and/or other obstacle attribute, etc., as discussed further below. In particular, one non-exclusive example of classifying objects includes an example classification system as follows: class 1, a small object that a powered earth-moving vehicle can move over without taking any avoidance action; class 2, a small object that is removeable (e.g., within the moving capabilities of a particular type of powered earth-moving vehicle and/or of any of the possible powered earth-moving vehicles, optionally within a defined amount of time and/or other defined limits such as weight and/or size and/or material type, such as to have a size that fits within a bucket attachment of the vehicle or is graspable by a grappling attachment of the vehicle, and/or to be of a weight and/or material type and/or density and/or moisture content within the operational limits of the vehicle) moving a large pile of dirt (requiring numerous scoops/pushes) and/or creating a path (e.g., digging a path through a hill, filling a ravine, etc.) and/or for which the vehicle can move over without taking any avoidance action; class 3, a small object that is removeable but for which the vehicle cannot safely move over within defined limits without taking any avoidance action; class 4, a small-to-medium object that is removeable but may not be possible to do so within defined time limits and/or other limits and for which avoidance actions are available; class 5, a medium object that is not removeable within defined time limits and/or other limits and for which avoidance actions are available; class 6, a large object that is not removeable within defined time limits and/or other limits and for which avoidance actions are available; class 7, an object that is sufficiently large and/or structurally in place to not be removeable within defined time limits and/or other limits and for which avoidance actions are not available within defined time limits and/or other limits; classes 8-10 being small animals, humans, and large animals, respectively, which cause movement of the vehicle to be inhibited (e.g., to shut the vehicle down) to prevent damage (e.g., even if within the capabilities of the vehicles to remove and/or avoid the obstacle); etc. A similar system of classifying non-object obstacles (e.g., non-level terrain surfaces) may be used, such as to correspond to possible activities of a powered earth-moving vehicle in moving and/or avoiding the obstacle (e.g., leveling a pile or other projection of material, filling a cavity, reducing the slope e.g., incline or decline, etc.) including in some embodiments and situations to consider factors such as steepness of non-level surfaces, traction, types of surfaces to avoid (e.g., any water, any ice, water and/or ice for a cavity having a depth above a defined depth threshold, empty ditches or ravines or other cavities above a defined cavity size threshold; etc.).

Such classifying of obstacles may further be used as part of determining a path between a current location and a target destination location, such as to select or otherwise determine one or more of multiple alternative paths to use if one or more obstacles are of a sufficiently high classified type (e.g., not capable of being moved by the earth-moving vehicle, such as at all or within a defined amount of time and/or other defined limits, and/or being of class 7 of 10 or higher) are present along what would otherwise be at least one possible path (e.g., a direct path between the current location and the target destination location). For example, depending on information about an obstacle (e.g., a type, distance, shape, depth, material type, etc.), the automated operations of the EMVAOC system may determine to, as part of the autonomous operations of the powered earth-moving vehicle, perform at least one of (1) removing the obstacle from a path and moving along that path to the target destination location, or (2) moving in an optimized path around the obstacle to the target destination location, or (3) inhibiting motion of the powered earth-moving vehicle, and in some cases, to instead initiate autonomous operations of a separate second powered earth-moving vehicle to move to the target destination location as a replacement vehicle and/or to initiate a request for human intervention. Additional details are included below regarding such automated operations to classify obstacles and to use such information as part of path determination and corresponding powered earth-moving vehicle actions.

In addition, while the autonomous operations of a powered earth-moving vehicle controlled by the EMVAOC system may in some embodiments be fully autonomous and performed without any input or intervention of any human users (e.g., fully implemented by an embodiment of the EMVAOC system executing on that powered earth-moving vehicle without receiving human input and without receiving external signals other than possibly one or more of GPS signals and RTK correction signals), in other embodiments the autonomous operations of a powered earth-moving vehicle controlled by the EMVAOC system may include providing information to one or more human users about the operations of the EMVAOC system and optionally receiving information from one or more such human users (whether on-site or remote from the site) that are used as part of the automated operations of the EMVAOC system (e.g., a target destination location, a high-level work plan, etc.), such as via one or more GUIs ("graphical user interfaces") displayed on one or more computing device that provide user-selectable controls and other options to allow a user to interactively request or specify types of information to display and/or to interactively provide information for use by the EMVAOC system.

FIGS. 2A-2Q illustrate examples of earth-moving vehicles and types of on-vehicle data sensors positioned to support autonomous operations on a site.

In particular, with respect to FIG. 2A, information 290a about an example powered earth-moving construction vehicle 170a and/or mining vehicle 175a is illustrated, which in this example is a tracked excavator vehicle, using an upper-side-frontal view from the side of the digging boom arm (or 'boom') 206 and stick arm (or 'stick') 204 and opposite the side of the cabin 202, with the earth-moving vehicle 170a/175a further having a main body chassis 201 (e.g., enclosing an counterweight 221 and engine, and including the cabin 202), tracks 203 and bucket (or 'scoop' or 'claw') tool attachment 209a—in other embodiments, other types of digging arm tool attachments may be used such as, for example, a hydraulic thumb, coupler, breaker, compactor, digging bucket, grading bucket, hammer, demolition grapple, tiltrotator, etc. Four example inclinometers 210 are further illustrated at positions that beneficially provide inclinometer data to compute the position of the bucket and other parts of the digging arms relative to the position of the cabin of the earth-moving vehicle. In this example, three inclinometers 210a-210c are mounted at respective positions on the digging arms of the earth-moving vehicle (position 210c near the intersection of the digging boom arm and the body of the earth-moving vehicle, position 210b near the intersection of the digging stick arm and the bucket attachment, and position 210a near the intersection of the digging boom and stick arms), such as to use single-axis inclinometers in this example, and with a fourth inclinometer 210d mounted within the cabin of the earth-moving vehicle and illustrated at an approximate position using a dashed line, such as to use a dual-axis inclinometer that measures pitch and roll angles-data from the inclinometers may be used, for example, to track the position of the earth-moving vehicle arms/attachment, including when a track heading direction 207 is determined to be different (not shown in this example) from a cabin/body heading direction 208. This example illustrates a position of one or more pressure sensors 215, which in this example are positioned along one or more pressure pipes (not shown) connected to the bottom of one or more pistons (or 'cylinders') configured to raise and lower the digging boom arm 206. This example further illustrates a position of a LIDAR component 260, which in this example is positioned on the underside of the digging boom arm 206 near its bend in the middle, and as such is movable along with the movements of the digging boon arm 206, as well as in some embodiments being independently movable (e.g., to rotate, tilt, swivel, etc.)—in other embodiments, the LiDAR component 260 may be located in other positions on the vehicle 170a/175a and/or may be one of multiple LiDAR components positioned at different locations on the vehicle. The vehicle may further have one or more INS-DU units, which are not shown in this example. It will be appreciated that other quantities, positionings and types of illustrated sensors/components may be used in other embodiments.

Figure 2B:
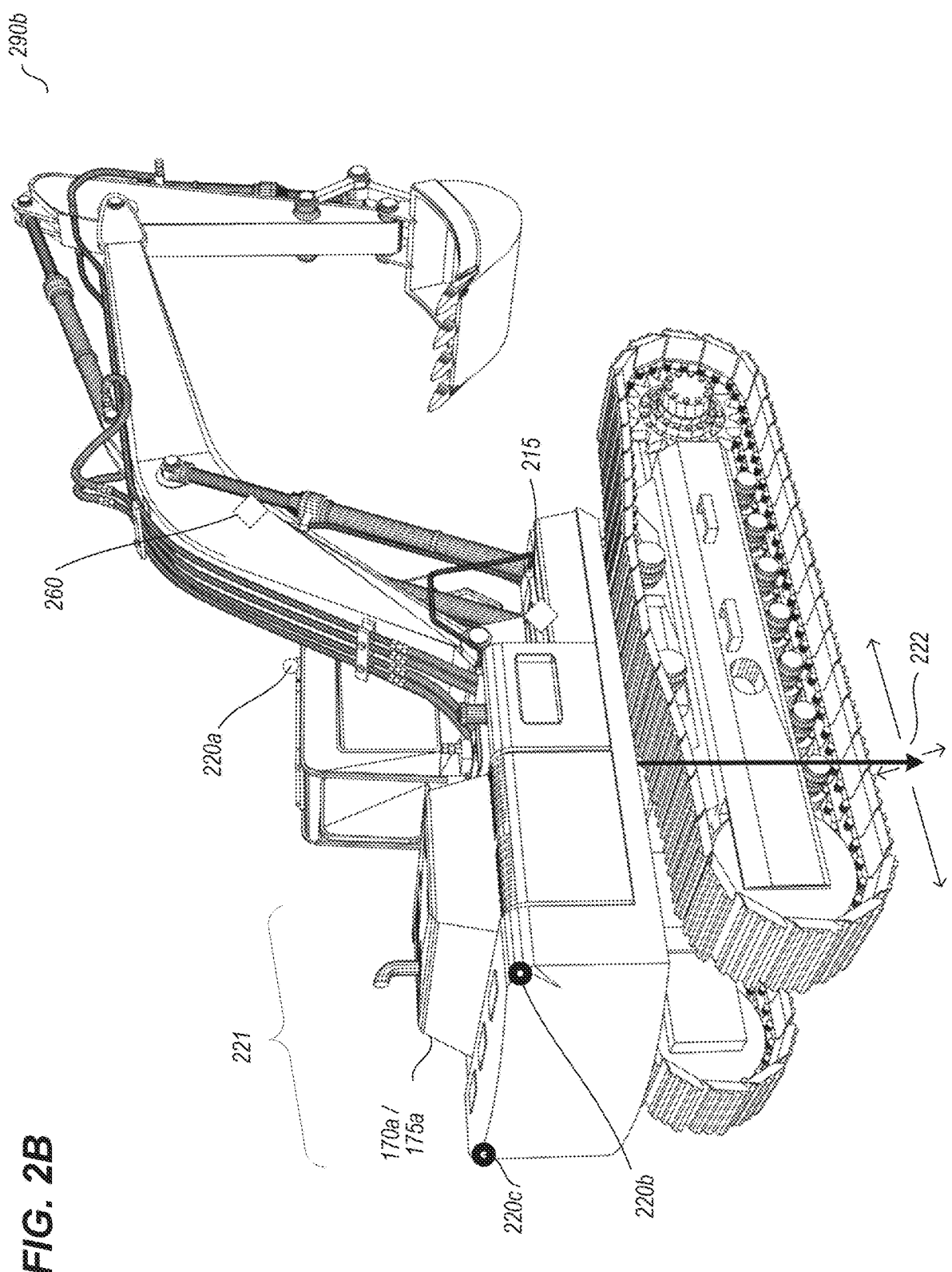
FIG. 2Q illustrates an example of a powered earth-moving military and/or police vehicle having an on-vehicle autonomous operations control system and multiple types of on-vehicle data sensors positioned to support autonomous operations.
FIGS. 2R-2U illustrate examples of autonomous operations and associated data used for controlling movement of some or all of a powered earth-moving vehicle in accordance with specified safety configuration data, including to perform automated operations to halt or otherwise inhibit unplanned slippage on a sloped and/or slick surface.
Figure 2C:
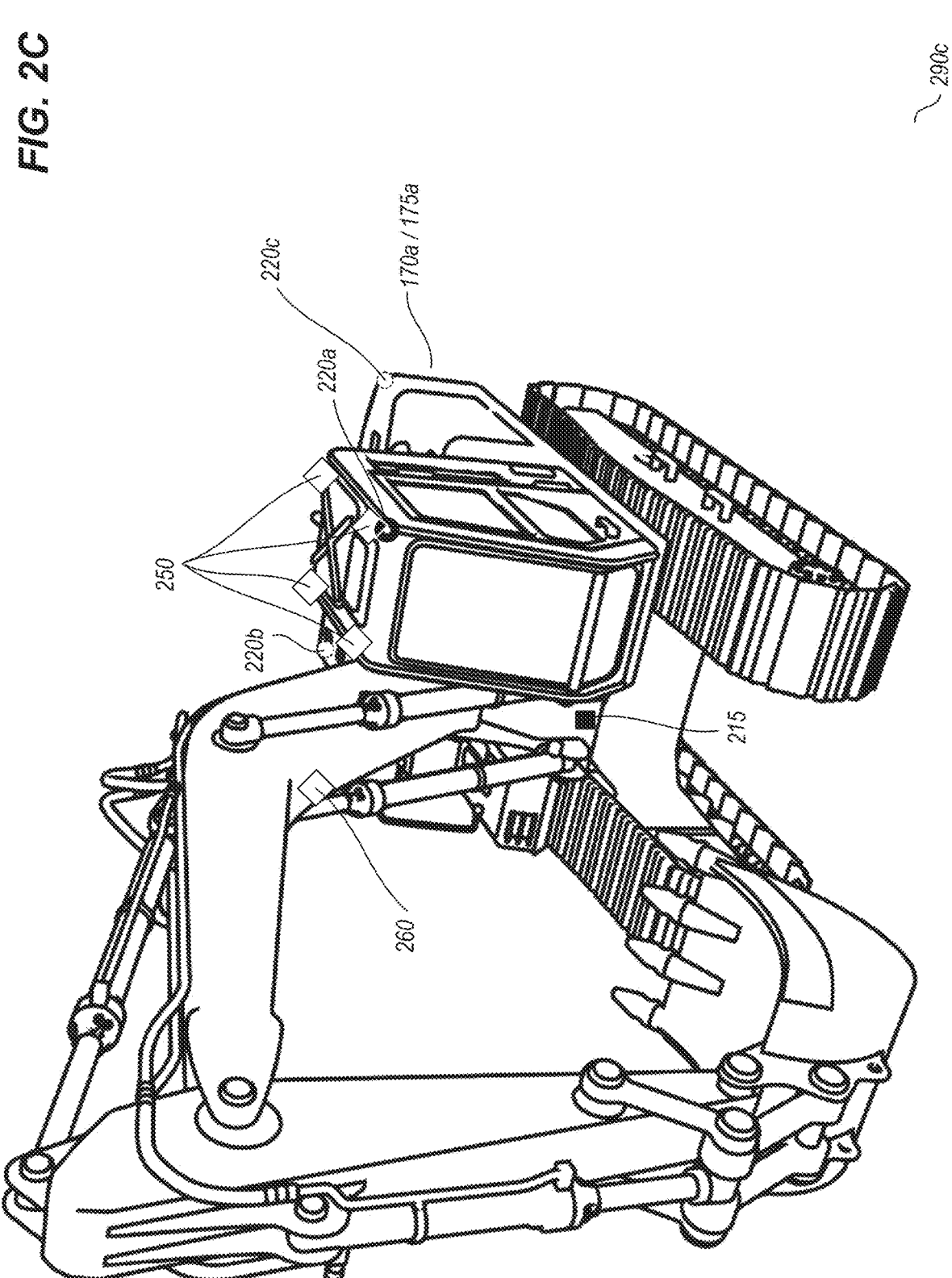

FIGS. 2B and 2C continue the example of FIG. 2A, and illustrate information 290b and 290c, respectively, about three example GPS antennas 220 at positions that beneficially provide GPS data to assist in determining the positioning and direction of the cabin/body of the earth-moving vehicle 170a/175a, including to use data from the three GPS antennas to provide greater precision than is available from a single GPS antenna. In this example, the three GPS antennas 220a-220c are positioned on the earth-moving vehicle body chassis and proximate to three corners of the chassis (e.g., as far apart from each other as possible), such that differential information between GPS antennas 220a and 220c may provide cabin heading direction information, and differential information between GPS antennas 220b and 220c may provide lateral direction information at approximately 90° from that cabin heading direction information. In particular, in FIG. 2B, the example earth-moving vehicle is shown using a side-rear view from the side of the arms, with GPS antennas 220b and 220c illustrated on the back of the body chassis at or below the top of that portion of the body chassis, and with an approximate position of GPS antenna 220a on the cabin top near the front illustrated with dashed lines (e.g., as illustrated further in FIG. 2C). FIG. 2B further illustrates the counterweight 221 at the back of the chassis, and illustrates a center of gravity 222 of the vehicle that moves forward and backward as the arms and attachment are moved while the cabin/chassis is aligned with the tracks, and may move in other directions as the cabin/chassis rotates and/or as the arms and attachment are moved while the cabin/chassis is not aligned with the tracks (not shown). In FIG. 2C, the example earth-moving vehicle is shown using an upper-side-frontal view from the side of the cabin, with GPS antenna 220*a* shown on the cabin top near the front on the same side as GPS antenna 220*c*, and with the positions of GPS antennas 220*b* and 220*c* illustrated through the body chassis with dashed lines (e.g., just below the top of the back of the body chassis, as illustrated in FIG. 2B). While not illustrated in FIGS. 2B-2C, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the earth-moving vehicle is located) to improve accuracy of the GPS signals from the GPS antennas, so as to be part of one or more RTK-enabled GPS positioning units. The LiDAR component 260 and pressure sensor 215 are also illustrated, using dashed lines in FIG. 2B to indicate the location on the underside of the digging boom arm (for the LiDAR component) and bottom of the piston(s) (for the one or more pressure sensors) due to the boom arm blocking a direct view of the component 260, and being directly visible in FIG. 2C. FIG. 2C also illustrates possible locations of one or more RGB cameras 250 with image sensors (not shown separately) that gather additional visual data about an environment of the vehicle 170*a*/175*a* from visible light—in this example, four cameras are used on top of the cabin (e.g., to in the aggregate provide visual coverage of some or all of 360° horizontally), with two on each side, and optionally with the two front camera facing partially or fully forwards and the two back cameras facing partially or fully backwards, although in other embodiments other camera configurations and/or types may be used (e.g., one or more cameras with panoramic view angles, such as to each cover some or all of 360° horizontally). In at least some embodiments and situations, some or all such cameras may be independently movable (e.g., to rotate, tilt, swivel, etc.) at their positions, and may further in at least some such embodiments be positioned on one or more moveable parts of the vehicle (e.g., a hydraulic arm, attachment, etc.). In addition, in some embodiments and situations, the camera positioning may include having one or two forward-facing cameras (e.g., cameras that each produces perspective rectilinear images and/or video with a standard field of view and that in aggregate cover all or substantially all of the front area around the vehicle, such as all but a small area blocked by a front attachment of the vehicle), and one or two backward-facing camera (e.g., cameras that each produces panoramic images and/or video with a wide-angle field of view of 120° or 150° or 180° or more that covers the back and optionally some or all of the sides of vehicle). It will be appreciated that other quantities, positionings and types of GPS antennas (and/or antennas for other types of satellite-based navigation systems) and/or other sensors/components may be used in other embodiments.

Figure 2D:
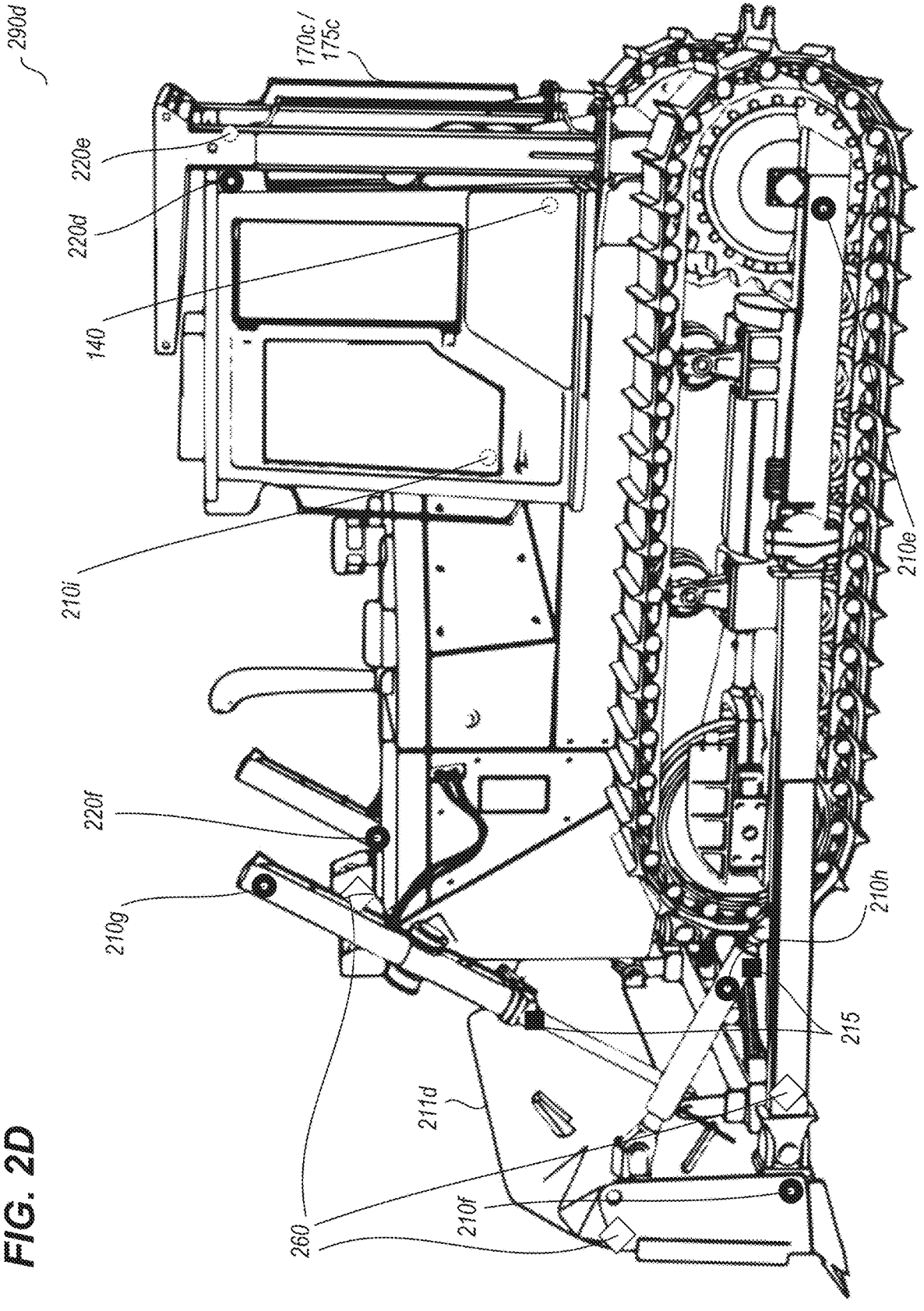
Figure 2E:
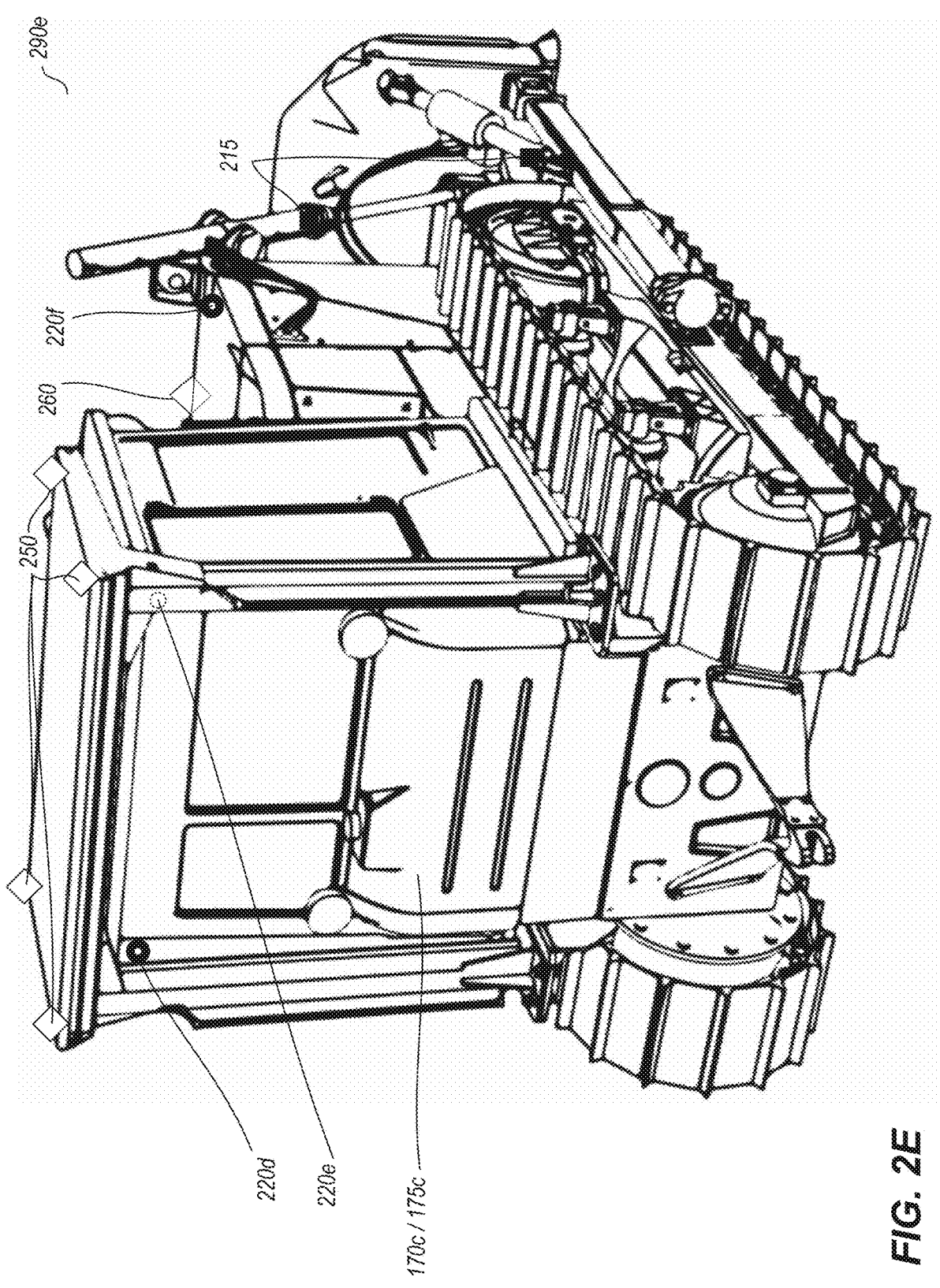
Figure 2F:
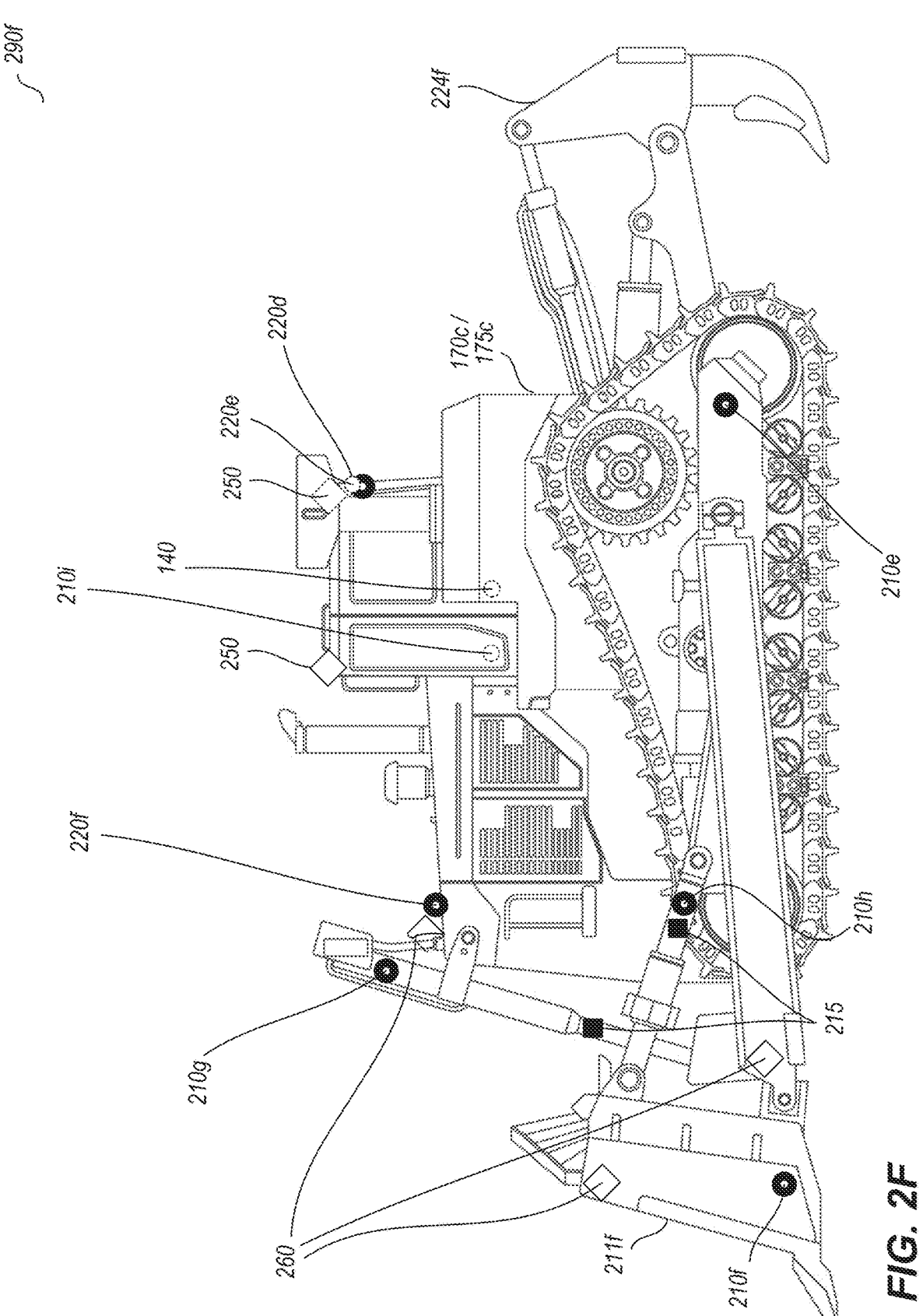
Figure 2G:
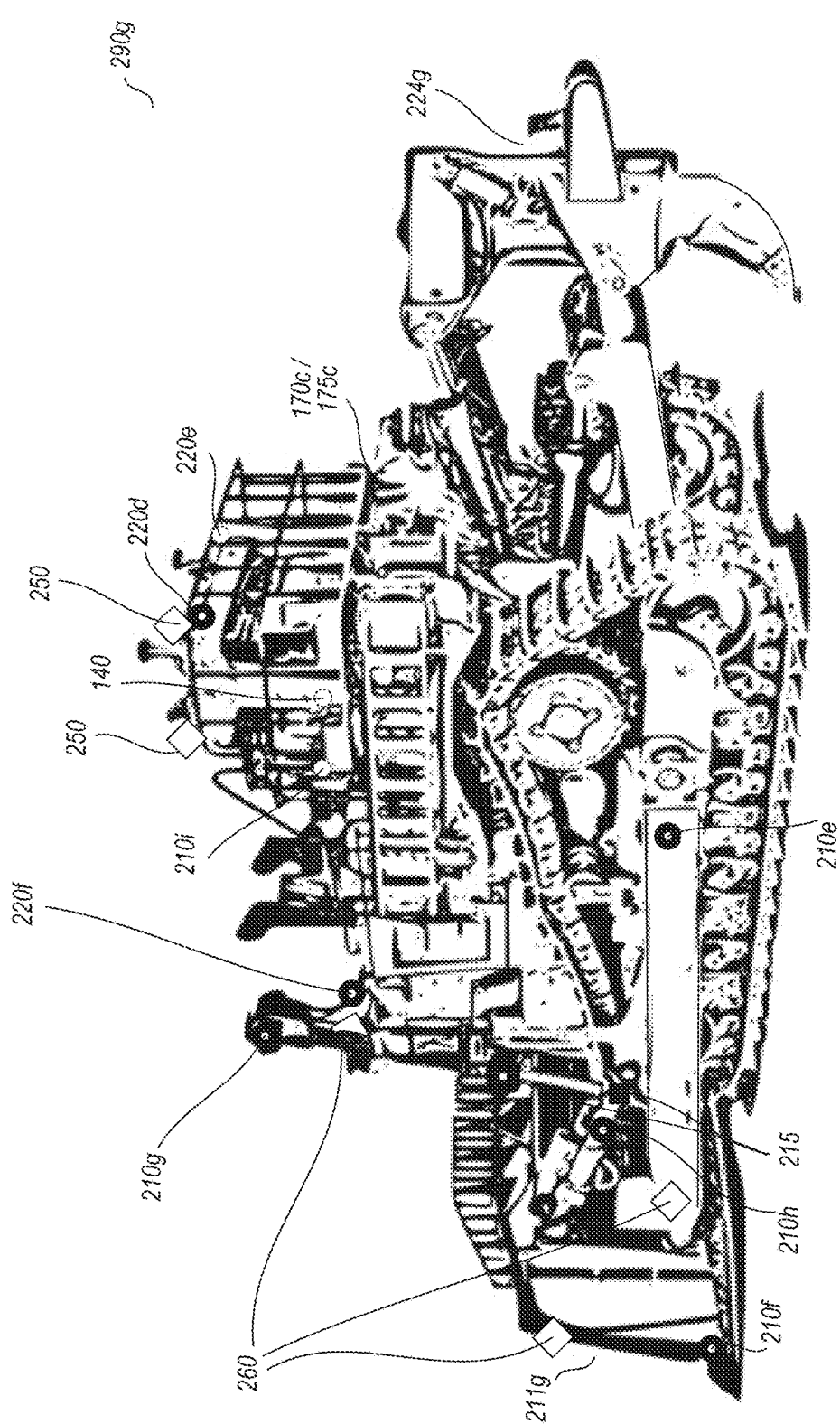
Figure 2H:
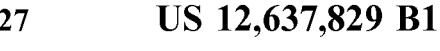
Figure 21:
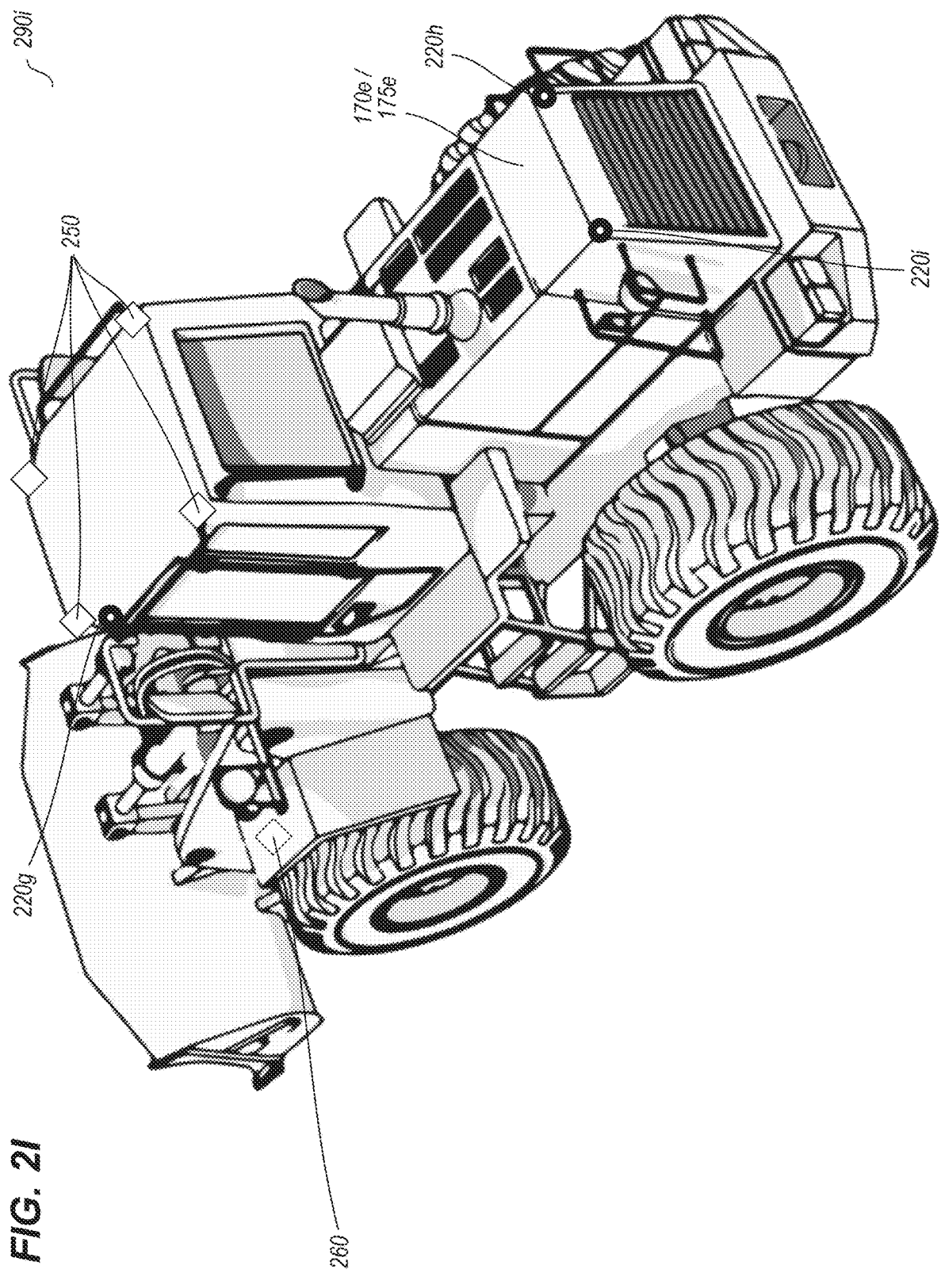
Figure 2J:
Figure 2K:
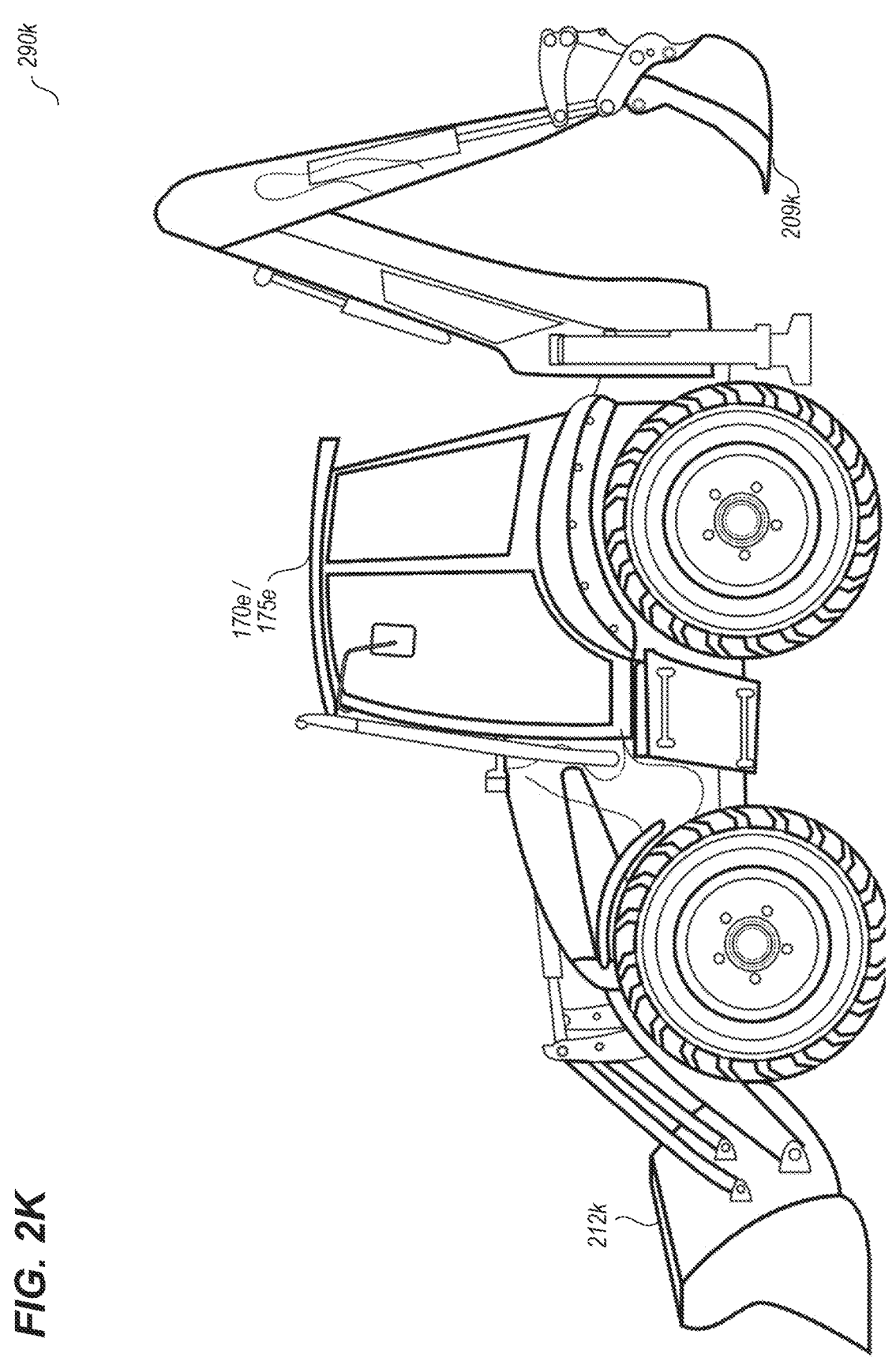
Figure 2L:
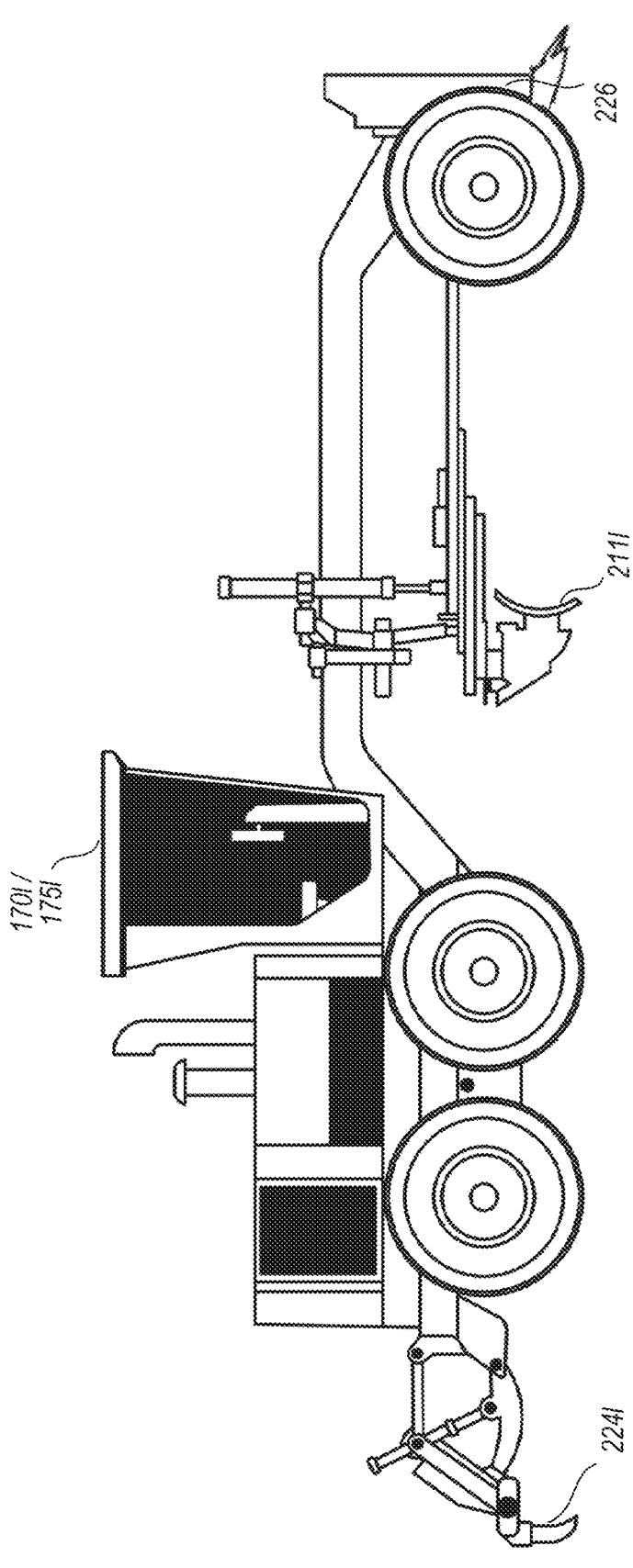
Figure 2M:
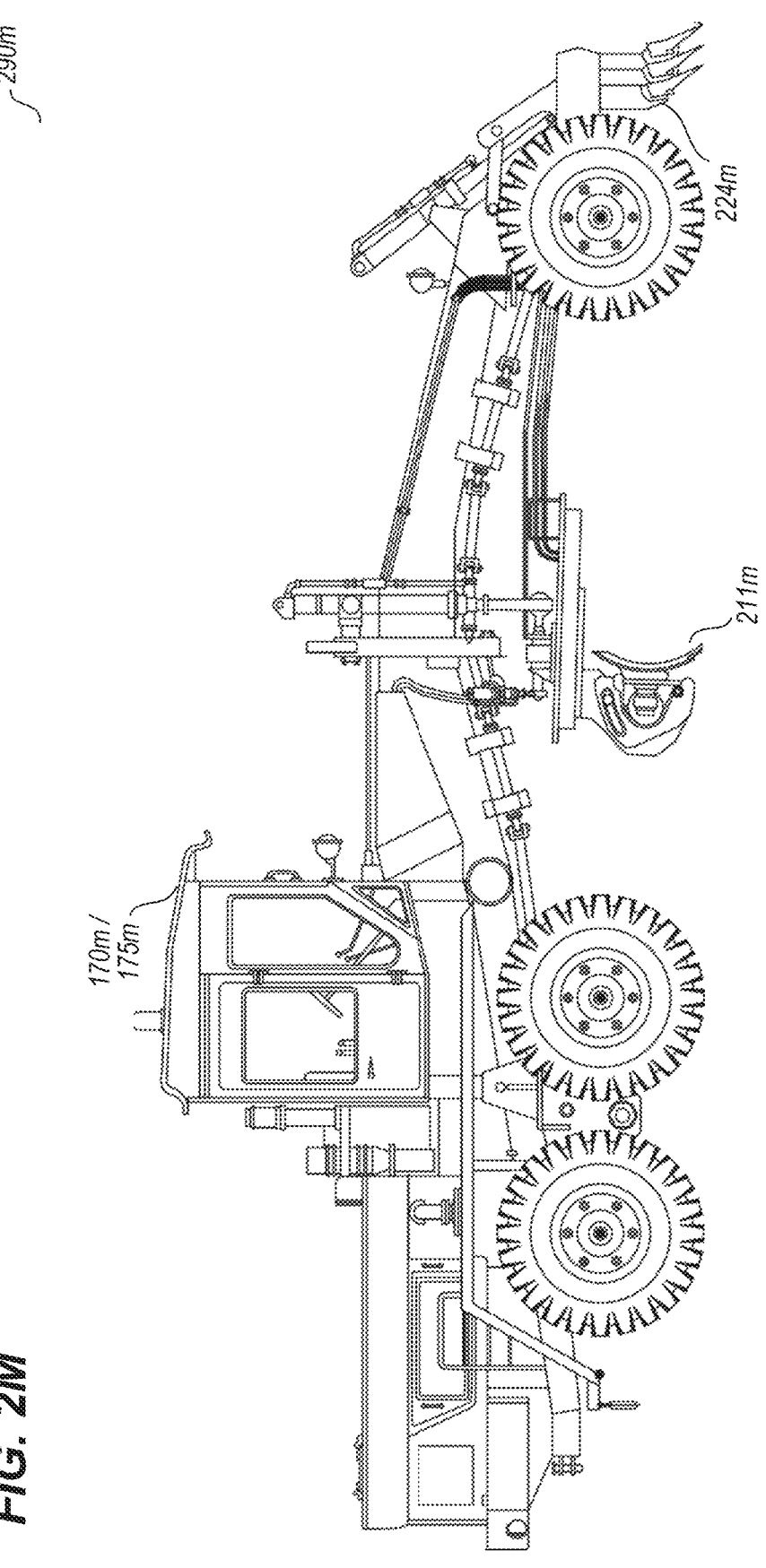
Figure 2N:
Figure 2P:
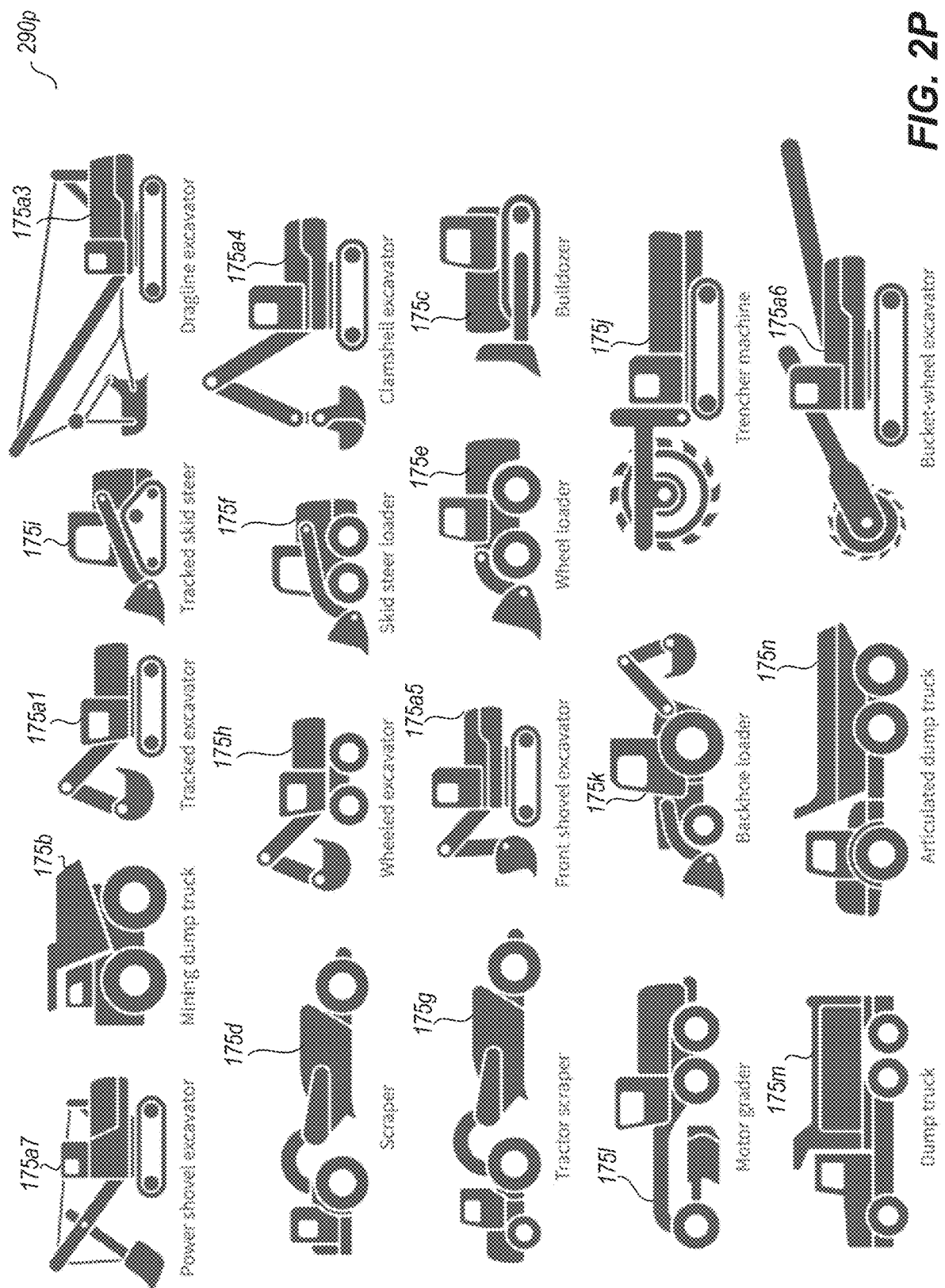
Figure 2Q:

FIGS. 2D-2Q continue the examples of FIGS. 2A-2C, with FIGS. 2D and 2E illustrating further example details 290*d* and 290*e* respectively about another earth-moving construction vehicle 170*c* and/or mining vehicle 175*c*, which in this example is a bulldozer vehicle having a blade attachment 211*d* (although other tool attachments may be used in other embodiments), such as to illustrate example positions for GPS receivers 220 and/or inclinometers 210 and/or one or more LiDAR components 260 and/or one or more cameras 250 and/or one or more pressure sensors 215.

In particular, FIG. 2D illustrates example information 290*d* that includes various example inclinometers 210*e*-210*i*, example GPS antennas/receivers 220*d*-220*f*, and possible locations for one or more LiDAR components 260 and one or more pressure sensors 215. The example inclinometers 210*e*-210*i* are illustrated at positions that beneficially provide inclinometer data to compute the location of the blade or other front attachment (and optionally other parts of the bulldozer, such as the hydraulic arms) relative to the cabin of the bulldozer vehicle (e.g., at position 210*e* near the intersection of the track spring lifting arm and the body of the vehicle, position 210*f* near the intersection of the track spring lifting arm and the blade or other attachment, position 210*g* at one end of a hydraulic arm, position 210*h* at one end of the tilt cylinder, etc.), such as to use single-axis inclinometers in this example, and with another inclinometer 210*i* mounted within the cabin of the vehicle and illustrated at an approximate position using a dashed line, such as to use a dual-axis inclinometer that measures pitch and roll-data from the inclinometers may be used, for example, to track the position of the track spring lifting arm and attachment relative to the cabin/body of the vehicle. The example GPS antennas/receivers 220 are illustrated at positions that beneficially provide GPS data to assist in determining the positioning and direction of the cabin/body, including to use data from the three GPS antennas to provide greater precision than is available from a single GPS antenna. In this example, the three GPS antennas 220*d*-220*f* are positioned on the body chassis and proximate to three corners of the chassis (e.g., as far apart from each other as possible), such that differential information between GPS antennas 220*f* and 220*e* may provide cabin heading direction information, and differential information between GPS antennas 220*d* and 220*e* may provide lateral direction information at approximately 90° from that cabin heading direction information. The example one or more LiDAR components 260 are illustrated at one or more possible positions that beneficially provide LiDAR data about some or all of an environment around the vehicle 170*c*/175*c*, such as to be positioned on one or more sides of the blade/scoop attachment (e.g., to have a view to the side(s) of the vehicle) and/or a top or bottom (not shown) of the blade/scoop attachment (e.g., to have a view forwards), and/or on sides of one or more of the hydraulic arms (e.g., to have a view to the side(s) of the vehicle), and/or on a front of the chassis (e.g., near the top to have a view forwards over the blade/scoop attachment), etc. The example one or more pressure sensors 215 are illustrated at one or more possible positions to connect to pressure pipes (not shown) at the bottom of one or more pistons controlling movement of the attachment. FIG. 2E also illustrates possible locations of one or more RGB cameras 250 that gather additional visual data about an environment of the vehicle 170*c*/175*c*—in this example, four cameras are used on top of the cabin (e.g., to in the aggregate provide visual coverage of some or all of 360° horizontally), with two on each side, and optionally with the two front camera facing partially or fully forwards and the two back cameras facing partially or fully backwards, although in other embodiments other camera configurations and/or types may be used (e.g., one or more cameras with panoramic view angles, such as to each cover some or all of 360° horizontally). In particular, in FIG. 2D, the example earth-moving vehicle is shown using a side view, with GPS antennas 220*d* and 220*e* illustrated on the back of the body chassis at or below the top of that portion of the body chassis (using dashed lines to illustrate position 220*e*), and with an approximate position of GPS antenna 220*f* on the chassis top near the front—the positions 220d-220f are further illustrated in information 290e of FIG. 2E, in which the example earth-moving vehicle is shown using an upper-side-back view, with GPS antenna 220f shown on the body top near the front on the same side as GPS antenna 220e. While not illustrated in FIGS. 2D-2E, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the vehicle is located) to improve accuracy of the GPS signals from the GPS antennas, so as to be part of one or more RTK-enabled GPS positioning units. The vehicle may further have one or more INS-DU units, which are not shown in this example. It will be appreciated that other quantities, positionings and types of GPS antennas (and/or antennas for other types of satellite-based navigation systems) and/or inclinometers and/or other sensors/components may be used in other embodiments.

FIGS. 2F and 2G continue the examples of FIGS. 2D-2E, and illustrate information 290f and 290g respectively to show an example of an alternative configuration of a bulldozer vehicle 170c/175c in which the vehicle is equipped with both a front tool attachment and a rear tool attachment. In the example embodiment of FIG. 2F, the front tool attachment is a blade 211f, and the rear tool attachment is a ripper 224f with one or more teeth. In the example embodiment of FIG. 2G, the front tool attachment is similarly a blade 211g, and the rear tool attachment is similarly a ripper 224g with a single tooth. Various sensors and components may be positioned on the vehicle in a manner similar to that of FIGS. 2D-2E, including illustrated elements 140, 210e-210i, 215, 220d-220f, 250 and 260.

FIGS. 2H and 2I illustrate further example details about another earth-moving construction vehicle 170e and/or mining vehicle 175e, which in this example is a wheel loader vehicle having a bucket attachment 212h (although other tool attachments may be used in other embodiments), such as to illustrate example positions for GPS receivers 220 and/or inclinometers 210 and/or one or more LiDAR components 260 and/or one or more cameras 250 and/or one or more pressure sensors 215. In particular, FIG. 2H illustrates example information 290h that includes various example inclinometers 210j-210m, and example GPS antennas/receivers 220g-220i. The example inclinometers 210j-210m are further illustrated at positions that beneficially provide inclinometer data to compute the location of the bucket or other front attachment (and optionally other parts of the wheel loader, such as the hydraulic arms) relative to the cabin of the loader vehicle (e.g., at position 210j near the intersection of the boom lifting arm and the body of the vehicle, position 210k near the intersection of the boom lifting arm and the bucket or other attachment, position 210l at one end of a hydraulic arm, etc.), such as to use single-axis inclinometers in this example, and with another inclinometer 210m mounted within the cabin of the vehicle and illustrated at an approximate position using a dashed line, such as to use a dual-axis inclinometer that measures pitch and roll-data from the inclinometers may be used, for example, to track the position of the boom lifting arm and attachment relative to the cabin/body of the vehicle. The example GPS antennas/receivers 220 are further illustrated at positions that beneficially provide GPS data to assist in determining the positioning and direction of the cabin/body, including to use data from the three GPS antennas to provide greater precision than is available from a single GPS antenna. In this example, the three GPS antennas 220g-220i are positioned on the body chassis and proximate to three corners of the chassis (e.g., as far apart from each other as possible), such that differential information between GPS antennas 220g and 220i may provide cabin heading direction information, and differential information between GPS antennas 220h and 220i may provide lateral direction information at approximately 90° from that cabin heading direction information. The example one or more LiDAR components 260 are illustrated at one or more possible positions that beneficially provide LiDAR data about some or all of an environment around the vehicle 170e/175e, such as to be positioned in this example on the underside of one or more of the hydraulic arms in a manner similar to that of excavator vehicle 170a/175a (e.g., to have a view to the side(s) and/or front of the vehicle 170e/175e), and using dashed lines in FIGS. 2H and 2I due to their location being blocked by other parts of the vehicle 170e/175e. The example one or more pressure sensors 215 are illustrated at one or more possible positions to connect to pressure pipes (not shown) at the bottom of one or more of pistons controlling movement of the attachment. FIG. 2I also illustrates possible locations of one or more RGB cameras 250 that gather additional visual data about an environment of the vehicles 170e/175e—in this example, four cameras are used on top of the cabin (e.g., to in the aggregate provide visual coverage of some or all of 360° horizontally), with two on each side, and optionally with the two front camera facing partially or fully forwards and the two back cameras facing partially or fully backwards, although in other embodiments other camera configurations and/or types may be used (e.g., one or more cameras with panoramic view angles, such as to each cover some or all of 360° horizontally). In particular, in FIG. 2H, the example earth-moving vehicle is shown using a side-frontal view, with GPS antennas 220h and 220i illustrated on the back of the body chassis at or below the top of that portion of the body chassis (using dashed lines to illustrate their positions), and with an approximate position of GPS antenna 220g on the chassis top near the front—the positions 220g-220i are further illustrated in information 290i of FIG. 2I, which is shown using an upper-side-back view, with GPS antenna 220g shown on the body top near the front on the same side as GPS antenna 220i. While not illustrated in FIGS. 2H and 2I, some or all of the GPS antennas may be enabled to receive and use RTK data to further improve the accuracy of the GPS signals that are produced, such as by each being part of or otherwise associated with a GPS receiver including an RTK radio that receives and uses RTK-based GPS correction data transmitted from a base station (e.g., at a location remote from the site at which the vehicle is located) to improve accuracy of the GPS signals from the GPS antennas, so as to be part of one or more RTK-enabled GPS positioning units. The vehicle may further have one or more INS-DU units, which are not shown in this example. It will be appreciated that other quantities, positionings and types of GPS antennas (and/or antennas for other types of satellite-based navigation systems) and/or inclinometers and/or other sensors/components may be used in other embodiments.

FIGS. 2J and 2K continue the examples of FIGS. 2H-2I, and illustrate information 290j and 290k respectively to show an example of an alternative configuration of a wheel loader vehicle 170e/175e in which the vehicle is equipped with both a front tool attachment and a rear tool attachment. In the example embodiment of FIG. 2J, the front tool attachment is a bucket 212j, and the rear tool attachment is a ripper 224*j* with multiple teeth. In the example embodiment of FIG. 2K, the front tool attachment is similarly a bucket 212*k*, and the rear tool attachment is a bucket or scoop 209*k*. Various sensors and components may be positioned on the vehicle in a manner similar to that of FIGS. 2H-2I, including illustrated elements 140, 210*j*-2101, and 215.

FIGS. 2L-2N illustrate information 290*l* and 290*m* and 290*n* respectively to show further example details about another earth-moving construction vehicle 170*l* and/or mining vehicle 175*l*, which in this example is a grader vehicle having a front blade attachment 226 and middle blade attachment 211*l* and rear ripper attachment 224*l* (although other tool attachments may be used in other embodiments). The vehicle may have various mounted sensors and components in a manner similar to the vehicles of FIGS. 2A-2K (e.g., GPS receivers 220, inclinometers 210, one or more LiDAR components 260, cameras 250, one or more pressure sensors 215, one or more INS-DU units, one or more control systems 140, etc.), but their locations are not illustrated in the example of FIG. 2L. FIGS. 2M and 2N continue the examples of FIG. 2L, and illustrate examples of alternative configurations of a motorized grader vehicle 170*l*/175*l* in which the vehicle is equipped with only two tool attachments. In the example embodiment of FIG. 2M, the middle tool attachment is a blade 211*m*, and the front tool attachment is a ripper or scarifier attachment 224*m*. In the example embodiment of FIG. 2K, the middle tool attachment is a blade 211*n*1, and the rear tool attachment is a blade or bucket attachment 211*n*2. Various sensors and components may be positioned on the vehicles in FIGS. 2M and 2N. While not illustrated in FIGS. 2A-2N, it will be appreciated that other additional sensors (e.g., infrared sensors, material type sensors, etc.) may be mounted on the respective powered earth moving vehicles 170 and/or 175 at various positions, such as at the same or similar positions as the LiDAR sensors and/or the image sensors of the cameras, or instead in other positions.

FIGS. 2-O and 2P illustrate respective information 290*o* and 290*p* about a variety of non-exclusive example types of powered earth-moving construction vehicles 170 and powered earth-moving construction vehicles 175 that may be controlled by embodiments of the EMVAOC system. FIG. 2O (referred to herein as "2-O" to prevent confusion with the number 20) includes two example earth-moving tracked construction excavator vehicles 170*a* shown with different attachments (excavator vehicle 170*a*1 with a bucket attachment, and excavator vehicle 170*a*2 with a grapple attachment) that may be controlled by the EMVAOC system. Other example types of earth-moving construction vehicles 170 that are illustrated in FIG. 2-O include a bulldozer 170*c*; a backhoe loader 170*d*; a wheel loader 170*e*; a skid steer loader 170*f*; a dump truck 170*j*; a forklift 170*g*; a trencher 170*h*; a mixer truck 170*i*; a flatbed truck 170*k*; a motorized grader 170*l*; a wrecking ball crane 170*m*; a truck crane 170*n*; a cherry picker 170*p*; a heavy hauler 170*q*; a scraper 170*r*; a pile driver 170*o*; a road roller 170*b*; etc. It will be appreciated that other types of earth-moving construction vehicles may similarly be controlled by the EMVAOC system in other embodiments. In a similar manner, FIG. 2P illustrates several example earth-moving tracked mining excavator vehicles 175*a* shown with different attachments (excavator vehicle 175*a*1 with a bucket attachment, excavator vehicle 175*a*3 with a dragline attachment, excavator vehicle 175*a*4 with a clamshell extractor attachment, excavator vehicle 175*a*5 with a front shovel attachment, excavator vehicle 175*a*6 with a bucket wheel extractor attachment, excavator vehicle 175*a*7 with a power shovel attachment, etc.) that may be controlled by the EMVAOC system. Other example types of earth-moving mining vehicles 175 that are illustrated in FIG. 2P include a dump truck 175*m*; an articulated dump truck 175*n*; a mining dump truck 175*b*; a bulldozer 175*c*; a scraper 175*d*; a tractor scraper 175*g*; a wheel loader 175*e*; a wheeled skid steer loader 175*f*; a tracked skid steer loader 175*i*; a wheeled excavator 175*h*; a backhoe loader 175*k*; a motor grader 175*j*; a trencher 1751; etc. It will be appreciated that other types of earth-moving mining vehicles may similarly be controlled by the EMVAOC system in other embodiments. In addition, while various types of sensors are not illustrated in FIGS. 2-O-2P, it will be appreciated that such sensors (e.g., LiDAR sensors, image sensors of cameras, infrared sensors, material type sensors, etc.) may be mounted on the respective powered earth moving vehicles 170 and/or 175 at various positions, such as at the same or analogous positions as the sensors discussed with respect to FIGS. 2A-2N, or instead in other positions.

FIG. 2Q continues the examples of FIGS. 2A-2P, and illustrates information 290*q* respectively to show another earth-moving vehicle 180-1, which in this example is a military clearing vehicle having front tool attachments including a ripper or mine plow 224*q* and extended skis 227*q* (although other tool attachments may be used in other embodiments). The vehicle may have various mounted sensors and components in a manner similar to the vehicles of FIGS. 2A-2P (e.g., GPS receivers 220, inclinometers 210, one or more LiDAR components 260, cameras 250, one or more pressure sensors 215, one or more INS-DU units, one or more control systems 140, etc.), but their locations are not illustrated in the example of FIG. 2Q. While not illustrated in FIG. 2Q, it will be appreciated that other additional sensors (e.g., infrared sensors, material type sensors, etc.) may be mounted on the respective vehicle 180-1 (or other powered earth moving military and/or police and/or farming vehicles 180) at various positions, such as at the same or similar positions as the LiDAR sensors and/or the image sensors of the cameras, or instead in other positions.

Figure 2R:
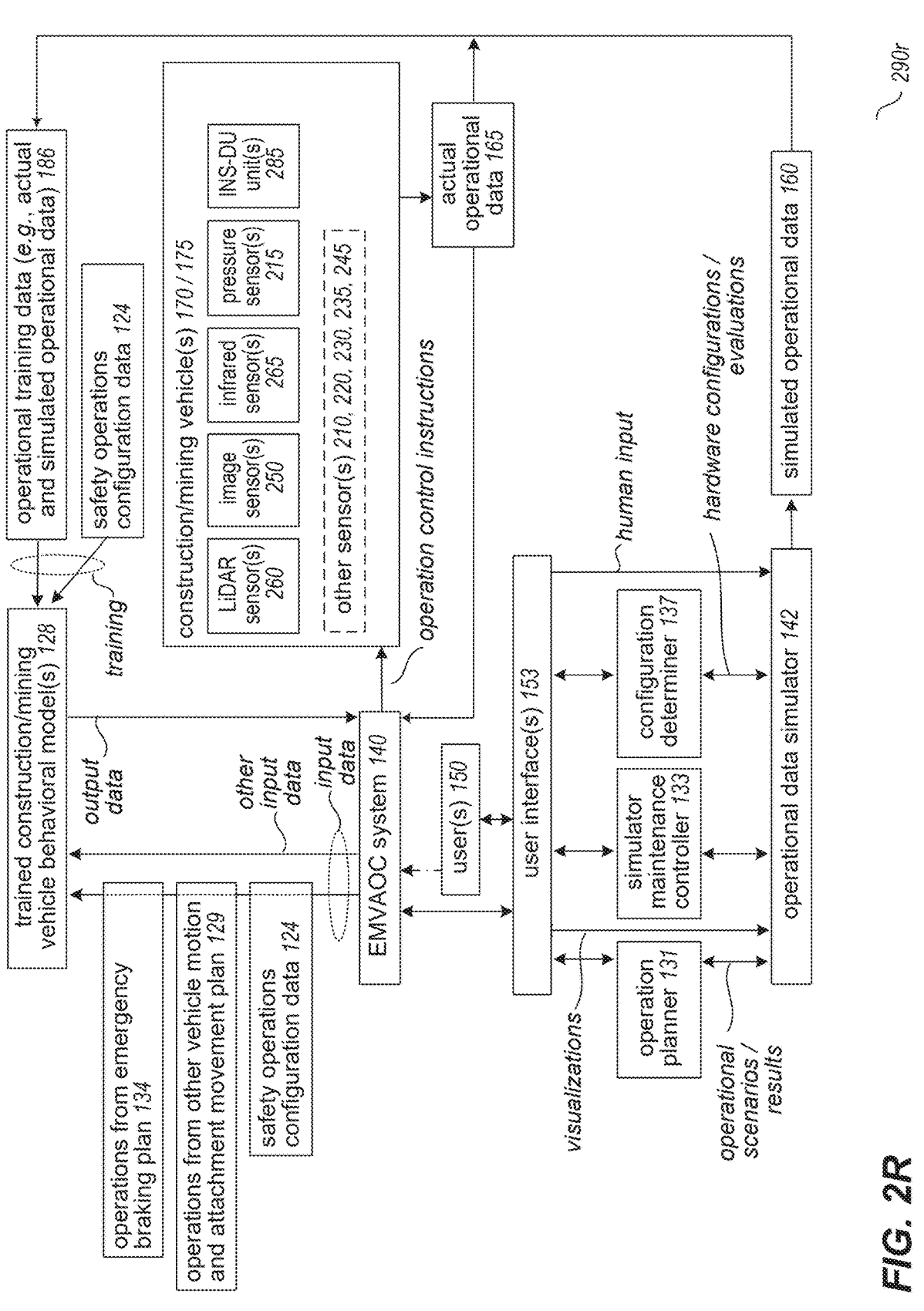
Figure 2S:
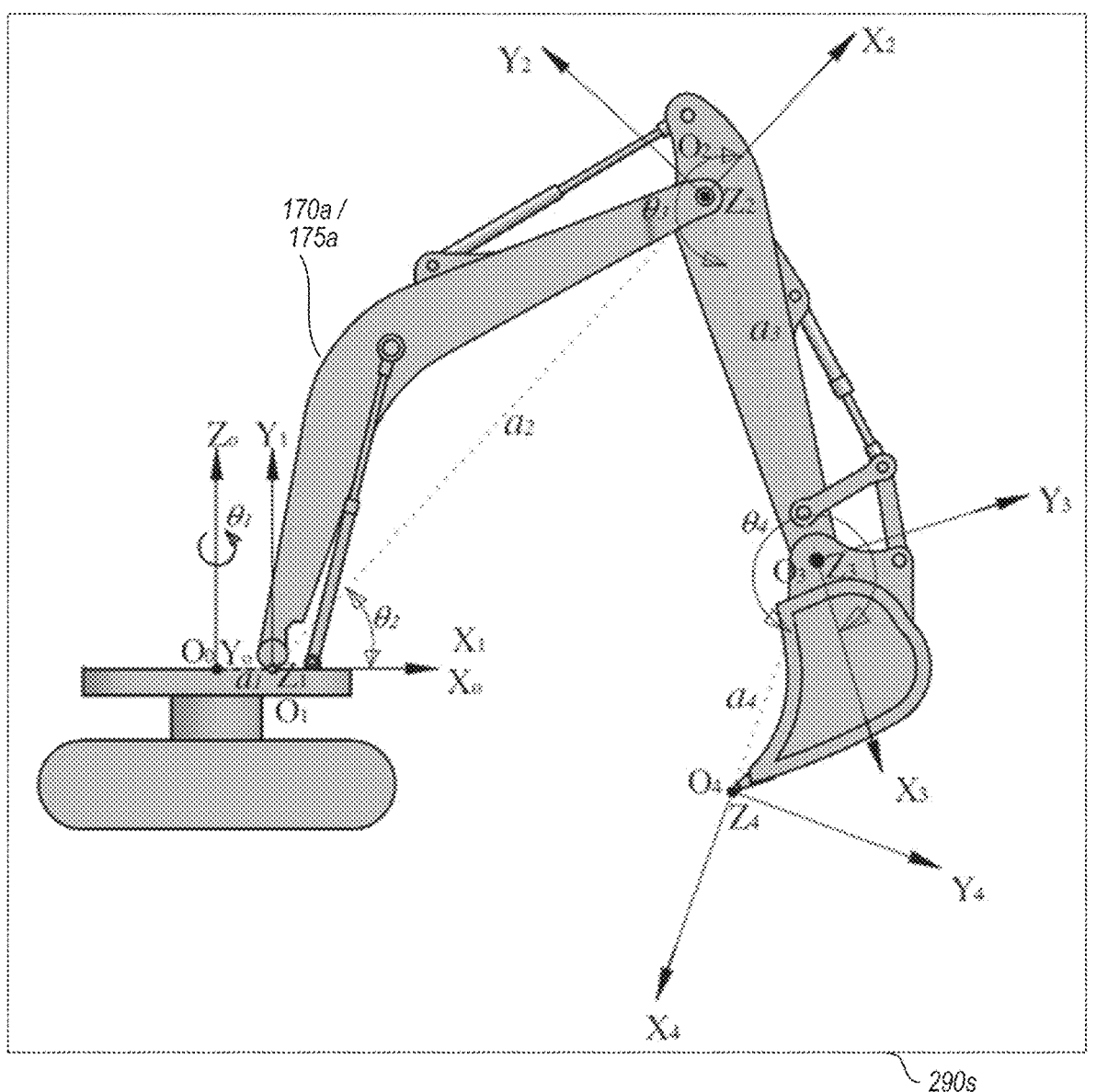

FIGS. 2R-2S illustrate examples of modules and interactions and information used to implement autonomous operations of one or more powered earth-moving vehicles based at least in part on gathered environment data. In particular, FIG. 2R illustrates information 290*r* about a powered earth-moving vehicle behavioral model 128 that is used by the EMVAOC system 140 to implement determined autonomous operations of one or more earth-moving vehicles 170/175/180, such as to supply input data to the behavioral model 128 corresponding to a current state and environment of the earth-moving vehicle(s) and about vehicle motion and/or attachment movement operations to be performed for one or more tasks (e.g., from a planner module or other source) and safety operations configuration data 124 to use (e.g., related to operations involving balancing, slippage, prohibited 3D positions, etc.), and to receive corresponding output data used to provide operation control instructions to the earth-moving vehicle(s)—in this example, the input data further includes information 134 about a plan to halt or otherwise inhibit unplanned slippage on a sloped and/or slick surface. In this example, the earth-moving vehicle(s) 170/175/180 each has one or more LiDAR sensors 260 that generate data about a surrounding environment of the earth-moving vehicle(s) 170/175/180 (e.g., in the form of one or more 3D point clouds, not shown), one or more image sensors 250 that generate visual data about a surrounding environment of the earth-moving vehicle(s) 170/175/180

(e.g., video, still images, etc.), one or more infrared sensors 265 that generate infrared data about a surrounding environment of the earth-moving vehicle(s) 170/175/180 (e.g., for objects and other obstacles, etc.), one or more pressure sensors 215 that provide data about when the attachment(s) are touching the ground or other surface (based on pressure to the piston(s) or other cylinder(s) that lift the attachment, such as to detect with the attachment is on the surface based on the pressure going to zero or otherwise below a defined threshold, such as 20 or 30 PSI), one or more INS-DU units to assist in determining vehicle position, and may optionally further have one or more other sensors 210, 220, 230, 235 or 245, and the actual operational environment data and other actual operational data 165 obtained by the on-vehicle sensors is provided to the EMVAOC system 140. The EMVAOC system 140 may analyze the environment data and other data 165 from the vehicle(s) 170/175/180 to generate additional data (e.g., to classify types of obstacles of detected objects, to generate a terrain contour map or other visual map of some or all of the surrounding environment, to determine prohibited 3D positions, etc.) and to determine operation control instructions to implement on the vehicle(s) 170/175/180, including for motion between locations on a job site and for attachment movements as part of vehicle operations—for example, the EMVAOC system 140 may produce DIGMAP information or other 2D representations to represent the terrain of some or all of the job site, such as for use by a planner module 131; etc. As one non-exclusive example, the operation control instructions provided from the EMVAOC system 140 may simulate inputs to the control panel on a powered earth-moving vehicle that would be used by a human operator, if one were present, and the behavioral model(s) 128 may translate the operation control instructions to implementation activities for the vehicle(s) 170/175/180 (e.g., hydraulic and/or electrical impulses that are provided to the vehicle(s) 170/175/180)—for example, a command may represent joystick deflection (e.g., for one or both of two joysticks, each with 2 axes), activation of a tool control button on one of the joysticks for controlling the tool attachment (e.g., claw, bucket, hammer, etc.), pedal position (e.g., for one or both of two pedals, analogous to car pedals but with a zero position in the middle and with the pedal able to move forward or backward), etc., such as using a number between −1 and 1, and such as by using one or more piston displacement mechanisms positioned to manipulate one or more controls of the powered earth-moving vehicle when actuated. In one embodiment, the behavioral model achieves at least 17% efficiency improvement and 20× duty cycle improvement over human operators and proportional fuel efficiency can also be achieved. FIG. 2R further illustrates additional modules that may interact with the EMVAOC system 140 and/or each other to provide additional functionality. In particular, one or more users 150 may use one or more user interface(s) 153 (e.g., a GUI displayed on a computing device or provided via a VR and/or AR and/or mixed reality system) to perform one or more interactions, such as one or more of the following: to interact with a planner module 131 that computes an optimal plan for an entire job or to otherwise specify operational scenarios and receive simulated results, such as for use in determining optimal or otherwise preferred implementation plans to use for one or more tasks and/or multi-task jobs or to otherwise enable user what-if experimentation activities; to interact with a configuration determiner module 137 that uses the simulator module(s) 142 to determine optimal or otherwise preferred hardware component configurations to use; to interact with a simulator maintenance controller 133 to implement various types of maintenance activities; to directly supply human input for use by the simulator module(s) 142 (e.g., configuration parameters, settings, etc.); to request and receive visualizations of simulated operations and/or simulated operational data; etc. The planner module 131 may, for example, be independently developed through the design of artificial intelligence, and a plurality of plans from the planner module 131 may be input to the same trained model without having to train new models. In some embodiments, the simulator module(s) 142 may further generate rendered visualizations (e.g., visualizations such as those illustrated with respect to FIG. 2T, such as by using 'unreal engine' from Epic Games). Actual operational data 165 from operation of the powered earth-moving vehicle(s) and/or simulated operational data 160 from one or more operational data simulators 142 may further be used as training data 186 that is used to train the behavioral model(s) 128, such as initial training before the model(s) are used and/or updated training while the model(s) are being used (e.g., to improve their performance over time). Additional details related to non-exclusive example embodiment(s) of one or more modules and/or systems that may be included as part of the EMVAOC system 140 are included in U.S. Non-Provisional patent application Ser. No. 17/970,427, filed Oct. 20, 2022 and entitled "Autonomous Control Of On-Site Movement Of Powered Earth-Moving Construction Or Mining Vehicles"; in U.S. Provisional Patent Application No. 63/401,928, filed Aug. 29, 2022 and entitled "Autonomous Control Of Operations Of Powered Earth-Moving Vehicles Using Data From On-Vehicle Perception Systems"; in U.S. Provisional Patent Application No. 63/452,928, filed Mar. 17, 2023 and entitled "Autonomous Control Of Operations Of Powered Earth-Moving Construction Or Mining Vehicles To Implement Safety Rules"; in U.S. Non-Provisional patent application Ser. No. 18/107,892, filed Feb. 9, 2023 and entitled "Autonomous Control Of Operations Of Earth-Moving Vehicles Using Trained Machine Learning Models"; and in U.S. Non-Provisional patent application Ser. No. 18/120,264, filed Mar. 10, 2023 and entitled "Autonomous Control Of Operations Of Earth-Moving Vehicles Using Data From Simulated Vehicle Operation"; each of which is hereby incorporated by reference in its entirety.

FIG. 2S illustrates information 290s regarding physical movement dynamics information for an example powered earth-moving vehicle 170a/175a, which in this example is an excavator vehicle, such as may be used in the training and/or implementation of behavioral models 128, and/or by the operational data simulator module 142 in simulating operations of such an earth-moving vehicle, and/or as part of determining prohibited 3D positions for movement of the vehicle's hydraulic arms and tool attachment corresponding to other parts of the vehicle (e.g., the chassis, the tracks, etc.) and/or as part of determining positions of vehicle arm(s) and/or attachment(s) to use as part of operations related to balancing, slippage, etc. In this example, the information 290s illustrates angles and directions that arm(s)/attachment may move, such as for a bucket/scoop attachment in this example. In at least some such embodiments, the operational data simulator module may use various movement-related equations as part of its operations, such as to include the following:

Position
    Derivative: r(t)
    Integral:

$$r(t) = r_0 + \int_0^t v\,dt'$$

Velocity
    Derivative:

$$v(t) = \frac{dr}{dt}$$

Integral:

$$v(t) = v_0 + \int_0^t a\,dt'$$

Acceleration
    Derivative:

$$a(t) = \frac{dv}{dt} = \frac{d*d*r}{d*t*t}$$

Integral: a(t)

$$W = \int_a^b F(x)d^x$$

Then Composes to the Full Law of Motion:

$$x(t) = x_0 + \int_n^t v(T)dT =$$

$$x_0 + \int_n^t v_0 e^{-\frac{k}{m}T}dT = x_0 - m*v_0/k*\left(e^{-\frac{k}{m}T} - 1\right) = x_0 + m*v_0/k*\left(1 - e^{-\frac{k}{m}T}\right)$$

Forward Kinematics: This process transforms measured joint angles from a given origin to calculate positions of the end effectors (stick end and bucket bottom). It is a chain of transformations from the initial joint (cabin) up to the final effector (bucket).

Inverse kinematics: This process infers a possible set of joint angles to put the end effector (stick end or bucket end) to a specified position in the cylindrical space. It is handled by a custom Decision Tree-based machine learning model. To create training/test data for the model, a grid search of all possible angles for joints (between minimum and maximum limit of the joints) is used, and forward kinematics are computed to create ground truth labels. 20% of the data may be used for testing of the model, and 80% may be used for the training. During the inference, a destination position in cylindrical coordinates is provided to the model, and the model outputs the closest joint angles that will hold the effector in the desired destination position. As a safety mechanism, forward kinematics may be run one more time with the model outputs to verify the results in a real-time manner.

Joint Physics: Simulation of hydraulic physics may be calculated with state-based approximations, such as for the following example states:

1—Idle—no input is applied after SlowDown state is transitioned out completely (model assumes no movement in the joints);

2—WindUp—in seconds, time between start input and start of movement, with delay caused by the pilot hydraulics getting pressurized before opening valves on the main hydraulics;

3—SpeedUp—interpolation until speed reaches MaxAngularSpeed, to ease in to the target angular velocity, using a formula as follows:

Alpha=Clamp(timedelta,0.0,SpeedUpCoefficient)/
    SpeedUpCoefficient InterpolationEaseOut(0.0,
    Desired Angular Velocity,Alpha,2.0);

4—Sustain—when input is stopped, until speed reaches 0, keeping steady at the target angular velocity;

5—SlowDown—ease out of the target angular velocity and ease in to zero, using a formula as follows:

Alpha=Clamp(timedelta,DesiredVelocityAtStart,
    SlowDownCoefficient)/SlowDownCoefficient
    InterpolationEaseOut(0.0,Desired Angular
    Velocity,Alpha,2.0).

Different Windup/SpeedUp/Sustain/SlowDown times may be used based on particular machines and conditions, such as for domain randomization. It will be appreciated that the operational data simulator module may use other equations in other embodiments, whether for earth-moving vehicles with the same or different attachments and/or for other types of earth-moving vehicles. In at least some embodiments, the operational data simulator module may, for example, simulate the effect of wet sand on the terrain. More generally, use of the operational data simulator module may perform experimentation with different alternatives (e.g., different sensors or other hardware components, component placement locations, hardware configurations, etc.) without actually placing them on physical earth-moving vehicles and/or for different environmental conditions without actually placing earth-moving vehicles in those environmental conditions, such as to evaluate the effects of the different alternatives and use that information to implement corresponding setups (e.g., to perform automated operations to determine what hardware components to install and/or where to install it, such as to determine optimal or near-optimal hardware components and/or placements; to enable user-driven operations that allow a user to plan out, define, and visualize execution of a job; etc.). Furthermore, such data from simulated operation may be used in at least some embodiments as part of training one or more behavioral machine learning models for one or more earth-moving vehicles (e.g., for one or more types of earth-moving vehicles), such as to enable generation of corresponding trained models and methodologies (e.g., at scale, and while minimizing use of physical resources) that are used for controlling autonomous operations of such earth-moving vehicles.

Figure 2T:
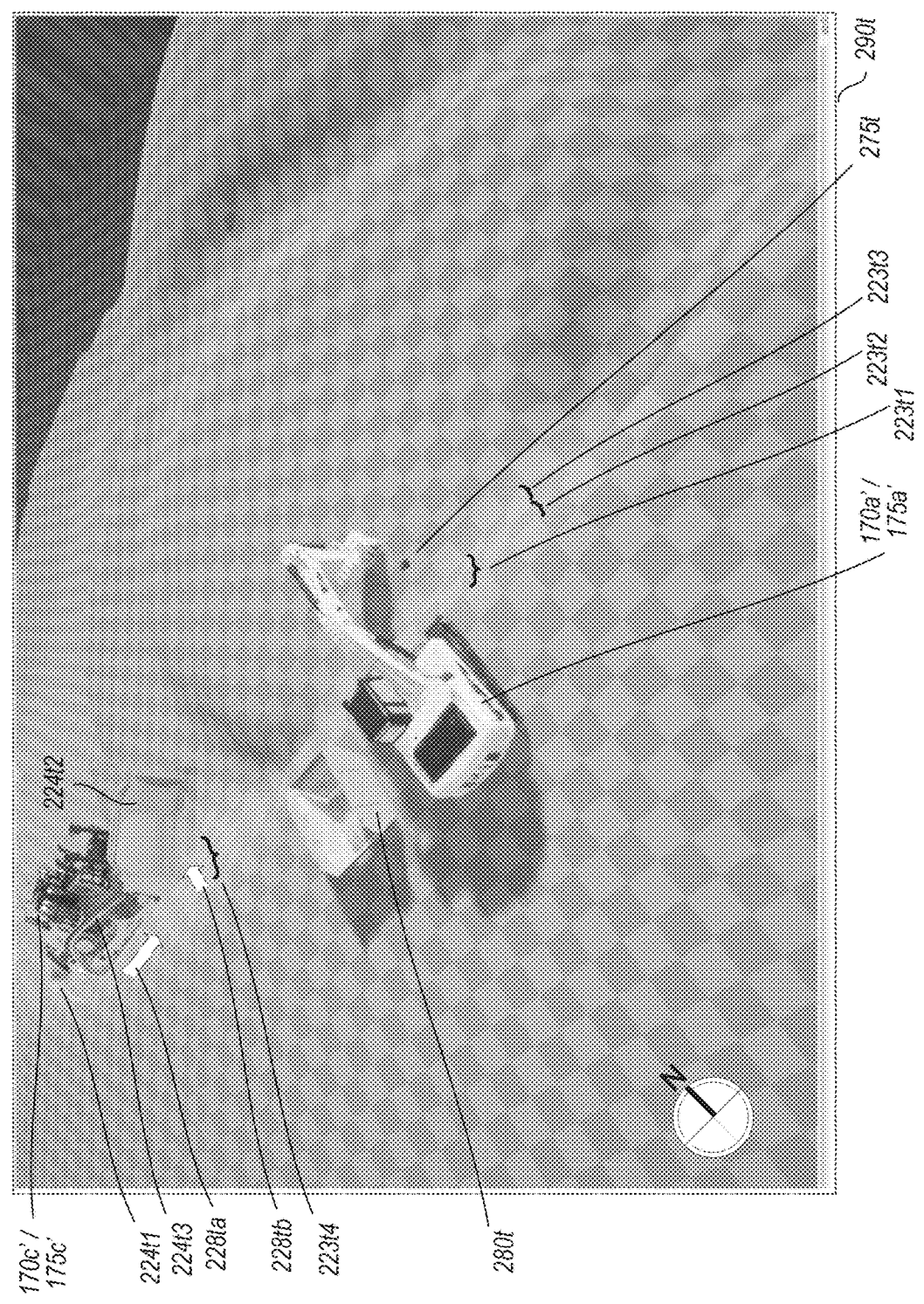
Figure 2U:
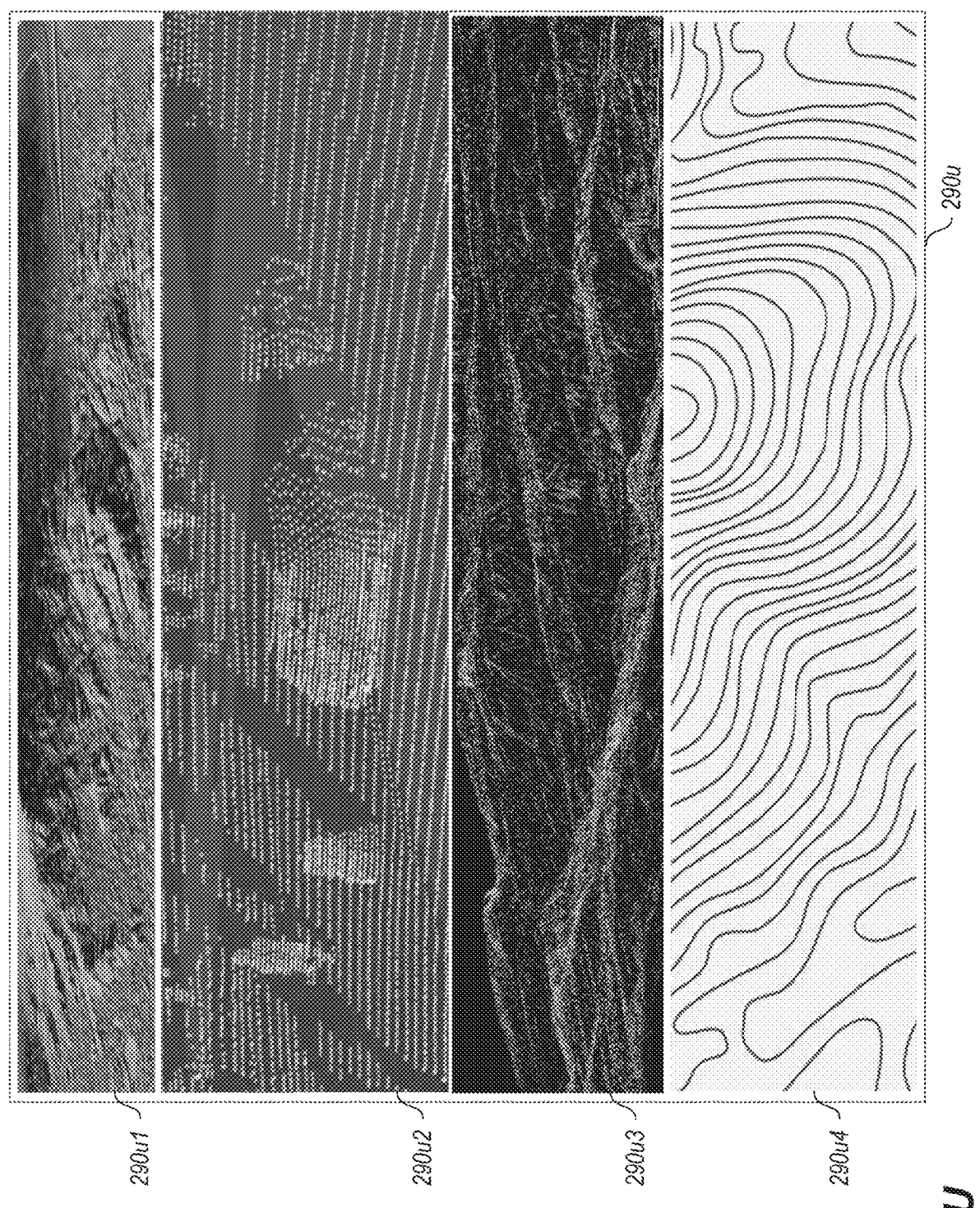

FIG. 2U illustrates further example information related to the gathering and generation of environment data, such as by perception system 141, and illustrates information 290u to provide non-exclusive examples of environment data that may be gathered and generated by an embodiment of the EMVAOC system 140. In this example, information 290u1 illustrates an example of an image of surrounding terrain that may be captured around a powered earth-moving vehicle (not shown), such as by one or more RGB cameras located on the vehicle. Information 290*u*2 illustrates an example of information that may be gathered by one or more LiDAR modules on the vehicle regarding part of a surrounding environment, such as to include 3D data points that illustrate shape and depth information for surrounding terrain, as well as objects in the environment (e.g., one or more vehicles, a person, a rock or other object, etc.). Information 290*u*3 illustrates a further example of a 3D point cloud that may be generated from LIDAR data, and shows depth and shape information for a surrounding environment, such as terrain of the environment. Information 290*u*4 illustrates one example of a visual map of a surrounding environment (e.g., a DigMap) that may be generated from such LiDAR data, which in this example is a terrain contour visual map. In at least some embodiments, such a visual map may include a set of 3D data points, such as to each have a corresponding XYZ coordinate in relation to an origin point (e.g., a location of a LIDAR component that is used to generate the 3D data points).

FIG. 2T illustrates an example of planning and/or performing automated operations of an earth-moving vehicle on a site in response to instructions from an EMVAOC system (not shown), shown, including to perform operations related to halting or otherwise inhibiting unplanned slippage of a vehicle on a sloped and/or slick surface, shown in part using rendered visualizations in this example (e.g., as part of a simulation determined by a planning module for an actual powered earth-moving vehicle on an actual job site, before initiating autonomous operations of that actual powered earth-moving vehicle to implement a selected movement plan on that actual job site, including to potentially move and/or avoid certain obstacles and/or to take other types of actions). In particular, FIG. 2T illustrates information 290*t* showing a first powered earth-moving vehicle (in this example, an excavator vehicle 170*a*' and/or 175*a*') and a second powered earth-moving vehicle (in this example, a bulldozer vehicle 170*c*' and/or 175*c*' with a forward blade tool attachment 224*t*2 and rearward ripper tool attachment 224*t*1) in an environment that includes a non-level surface 223*t*1 immediately in front of the excavator vehicle and a rock 275*t* farther in front of the excavator vehicle on a lower surface level at the bottom of the slope, and the bulldozer vehicle being situated on a non-level surface 223*t*4, such as with a slope that is sufficiently high to induce bulldozer slippage in at least some environmental conditions (e.g., a 5% slope, 10% slope, 15% slope, 20% slope, 25% slope, 30% slope, 35% slope, 40% slope, etc.) and optionally below a defined maximum threshold amount at which traversal is prohibited (e.g., a slope over 90%, a 90% slope, an 85% slope, an 80% slope, a 75% slope, a 70% slope, a 65% slope, a 60% slope, etc.). In other locations, an incline or decline area may have multiple non-level surfaces having different slopes, such as for surfaces 223*t*2 and 223*t*3, including in situations in which the operations related to slippage may occur for only one of the surfaces (e.g., for surface 223*t*2 but not for surface 223*t*3 due to a higher degree of slope for surface 223*t*2). The vehicles may, for example, perform operations corresponding to moving around the environment (e.g., for the excavator vehicle to move down the slope 223*t*1 to the lower-level surface on which the rock 275*t* is located, back up the slope 223*t*1 from the lower-level surface to the upper-level surface, to move elsewhere in the illustrated environment etc., and for the bulldozer vehicle to move up and/or down the sloped surface 223*t*4 and elsewhere in the illustrated environment) and/or performing other tasks (e.g., moving the rock from its current position to a destination location 280*t*, which in this example is inside a storage receptacle; pushing dirt or other materials; digging; etc.).

If the bulldozer vehicle begins to slip on the surface 223*t*4 while stationary or in motion, such as in a forward direction 228*ta* (in line with straight-line forward travel) and/or in a sideways or lateral direction 228*tb* (relative to the vehicle's forward or rearward controlled straight-line motion), an EMVAOC system on the vehicle may initiate emergency braking operations for the vehicle, such as to automatically move its rear ripper attachment into the ground or other underlying surface to inhibit vehicle slippage (e.g., at the maximum speed and/or force), and optionally to further automatically move its front blade attachment into the ground or other underlying surface, whether after the ripper attachment movement (e.g., if the slippage continues above a defined threshold velocity after the ripper attachment movement, such as after a defined amount of time) or simultaneously with the ripper attachment movement—more generally, a vehicle having two or more tool attachments may automatically control some or all such tool attachments in a determined sequence, such as at different times based at least in part on continuing slippage being detected from corresponding monitoring. As discussed elsewhere herein, if the vehicle instead experiences slippage in the backward direction (e.g., if the vehicle was rotated 180 degrees), the emergency braking operations initiated by the EMVAOC system may operate differently, such as to automatically move its front blade attachment into the ground or other underlying surface to inhibit vehicle slippage (e.g., at the maximum speed and/or force), and optionally to further automatically move its rear ripper attachment into the ground or other underlying surface, whether after the blade attachment movement (e.g., if the slippage continues above a defined threshold velocity after the blade attachment movement, such as after a defined amount of time) or simultaneously with the blade attachment movement. Similarly, if the vehicle instead experiences slippage in a sideways direction, the emergency braking operations initiated by the EMVAOC system may operate differently, such as to automatically move both the front blade attachment and rear ripper attachment into the ground or other underlying surface to inhibit vehicle slippage (e.g., at the maximum speed and/or force).

In addition, the determination that the vehicle is slipping may be performed in various manners in various embodiments, such as by determining changing locations of the vehicle's chassis over a period of time based at least in part on determined GPS coordinates of at least some of the chassis for the period of time, determining that the tracks are slipping on an underlying surface based at least in part on the changing locations of the chassis over the period of time differing by at least a threshold amount from expected locations of the chassis over the period of time (e.g., with the expected locations of the chassis over the period of time corresponding to zero or more manipulations of vehicle controls for track movement, such as via intervening piston displacement mechanisms), and initiating, in response to the determining that the tracks are slipping on the underlying surface, autonomous operations of the powered earth-moving vehicle to, if the determined changing locations of the chassis over the period of time include forward motion of the chassis, use at least one vehicle control (e.g., via intervening piston displacement mechanisms) to move a rear tool attachment (e.g., a ripper tool attachment) into the underlying surface, and to, if the determined changing locations of the chassis over the period of time include backward motion of the chassis, use at least one vehicle control (e.g., via the intervening piston displacement mechanisms) to move a front tool attachment (e.g., a blade tool attachment into the underlying surface). The movement of the front and/or rear tool attachments may in some embodiments and situations be performed to a fullest extent possible, such as by moving some or all such tool attachments into the underlying surface to a lowest possible depth and/or at a highest possible speed and/or with a highest possible force. The determination of the vehicle's changing locations and that corresponding slippage is occurring may, in at least some embodiments, include measuring location differences between two or more RTK-corrected GPS coordinates over a period of time and optionally determining at least one that the measured location differences exceed a defined distance threshold, or that the measured location differences correspond to a speed of motion of the chassis over a defined speed threshold, or that changes in the locations of the chassis continue after a defined time threshold, and determining the expected locations of the chassis over the period of time based at least in part on calculated effects of zero or more manipulations of one or more track movement controls. In at least some embodiments, the EMVAOC system may include a machine learning model that is trained to detect vehicle slippage and that provides a corresponding output indication of vehicle slippage in response to inputs that include RTK-corrected GPS coordinates and/or a vehicle speed measurement relative to the underlying surface (e.g., for a period of time), and optionally further include vehicle tilting measurements with respect to one or more of pitch, yaw and roll (e.g., from one or more INS-DU units, or other gyroscopes and/or accelerometers). In other embodiments, a vehicle's location and/or movement may be determined at least in part in other manners, such as using LiDAR and/or visual data to determine changes of the vehicle's position relative to fixed features surrounding the vehicle, whether in addition to or instead of using GPS coordinates. In at least some embodiments, such vehicle emergency braking operations may be performed by automated operations of an earth-moving vehicle autonomous operations control system (e.g., by executing software instructions of the earth-moving vehicle autonomous operations control system), with the operations (e.g., determining changing locations of the chassis, determining that the tracks are slipping, initiating of resulting corrective autonomous operations, etc.) performed autonomously without receiving human input and without receiving external signals other than GPS signals and real-time kinematic (RTK) correction signals. In addition, the determination that the vehicle is slipping include at least the following: determining, by one or more configured hardware processors, locations of a powered earth-moving vehicle on a job site at multiple times based at least in part on data from one or more sensors mounted on the powered earth-moving vehicle, wherein the powered earth-moving vehicle includes a chassis and tracks and a front tool attachment and a rear tool attachment and one or more first controls for movement of the tracks and one or more second controls to manipulate the rear tool attachment and one or more third controls to manipulate the front tool attachment; determining, by the one or more configured hardware processors and based at least in part on the determined locations, that the powered earth-moving vehicle is in unplanned motion on an underlying surface that does not match any inputs provided to the one or more first controls for movement of the tracks; and initiating, by the one or more configured hardware processors and in response to the determining that the powered earth-moving vehicle is in unplanned motion, autonomous operations of the powered earth-moving vehicle to, if the unplanned motion includes forward motion of the chassis, use at least one of the second controls to move the rear tool attachment into the underlying surface, and to, if the unplanned motion includes backward motion of the chassis, use at least one of the third controls to move the front tool attachment into the underlying surface. The determining of locations of the powered earth-moving vehicle on the job site at multiple times may include determining GPS coordinates of at least some of the chassis for the multiple times that are corrected by a real-time kinematic (RTK) positioning unit based at least in part on one or more received RTK correction signals, with the determining that the powered earth-moving vehicle is in unplanned motion including determining that the tracks are slipping on the underlying surface based at least in part on receiving an indication of the slipping from a machine learning model that is trained to detect slipping and that receives inputs including at least one of the corrected GPS coordinates, or a vehicle speed measurement relative to the underlying surface. For example, the powered earth-moving vehicle may be positioned facing downward on a slope of the underlying surface or was engaged in forward motion before the multiple times on a portion of the underlying surface with a coefficient of friction below a defined threshold, with the operations further including identifying, by the one or more configured hardware processors, forward movement of the chassis over the multiple times, and with initiating of the autonomous operations of the powered earth-moving vehicle including at least one of moving the rear tool attachment into the underlying surface to a lowest possible depth, or moving the rear tool attachment into the underlying surface at a highest possible speed, or moving the rear tool attachment into the underlying surface with a highest possible force. Alternatively, the powered earth-moving vehicle may be positioned facing upward on a slope of the underlying surface or was engaged in rearward motion before the multiple times on a portion of the underlying surface with a coefficient of friction below a defined threshold, with identifying, by the one or more configured hardware processors, of backward movement of the chassis over the multiple times, and with initiating of the autonomous operations of the powered earth-moving vehicle including at least one of moving the front tool attachment into the underlying surface to a lowest possible depth, or moving the front tool attachment into the underlying surface at a highest possible speed, or moving the front tool attachment into the underlying surface with a highest possible force. In addition, determining of locations of the powered earth-moving vehicle many include at least one of analyzing a plurality of three-dimensional ("3D") points on surfaces of at least some of the job site from one or more LiDAR components that are mounted on the powered earth-moving vehicle, or of analyzing visual data of one or more images from one or more cameras that are mounted on the powered earth-moving vehicle. At least one of the one or more hardware processors may be a low-voltage microcontroller that is located on the powered earth-moving vehicle and is configured to implement at least some automated operations of an earth-moving vehicle autonomous operations control system (e.g., by executing software instructions of the earth-moving vehicle autonomous operations control system), with determining of the locations and the determining that the powered earth-moving vehicle is in unplanned motion and the initiating of the autonomous operations being performed autonomously without receiving human input and without receiving external signals other than GPS signals and real-time kinematic (RTK) correction signals. The powered earth-moving vehicle may be, for example, one of a bulldozer vehicle or a wheel loader vehicle or a track loader vehicle or a skid steer loader vehicle or a motorized grader vehicle or a farm tractor vehicle.

It will be appreciated that the details of FIG. 2T are provided for exemplary purposes, and that the invention is not limited to these details. As one non-exclusive example, while excavator and bulldozer vehicles are illustrated in these examples, other powered earth-moving vehicles (e.g., construction and/or mining and/or military and/or police and/or farming vehicles) may similarly employ such operations. It will also be appreciated that various other types of operations, obstacles, safety configuration data, and powered earth-moving vehicles may be used in other embodiments and situations. In addition, as discussed elsewhere herein, prohibited 3D positions and vehicle movement/motion plan positions and adaptive plan positions may be represented in various manners in various embodiments, including using angle-based representations, XYZ representations, etc., as well as using different types of representations for different types of vehicles (e.g., for a vehicle with only one or more initial hydraulic arms extending from the chassis but not having additional hydraulic arms connected to those initial hydraulic arms, to use only one angle to represent the initial hydraulic arm(s), and one or more additional angles to represent a tool attachment connected to the initial hydraulic arm(s)). For example, when using angle-based representations, a space may be defined around a current position of a point on a powered earth-moving vehicle based on the angles (e.g., for an excavator vehicle, based on cabin_rotation (a), boom_angle (b), stick_angle (c) and optionally attachment_angle (d)), and all attachment/arm positions may be precalculated and hashed for optimization purposes, such as using a grid search in the range of those angles, and optionally doing conversions from Euclidian space if needed (e.g., to convert 3D points for the surrounding environment to the angle-based representations).

The EMVAOC system may further perform additional automated operations in at least some embodiments as part of determining a motion/movement plan that includes a powered earth-moving vehicle moving from a current location to one or more target destination locations, with non-exclusive examples including the following: having the powered earth-moving vehicle create a road (e.g., by flattening or otherwise smoothing dirt or other materials of the terrain between the locations) along a selected path as part of the motion/movement plan, including to optionally select that path from multiple alternative paths based at least in part on a goal involving creating such a road at such a location; considering environmental conditions (e.g., terrain that is muddy or otherwise slick/slippery due to water and/or other conditions), including in some embodiments and situations to adjust classifications of some or all obstacles in an area between the current and target destination locations to reflect those environmental conditions (e.g., temporarily, such as until the environmental conditions change); considering operating capabilities of that particular vehicle and/or of a type of that particular vehicle (e.g., tool attachments, size, load weight and/or material type limits or other restrictions, etc.), including in some embodiments and situations to adjust classifications of some or all obstacles in an area between the current and target destination locations to reflect those operating capabilities (e.g., temporarily, such as for planning involving that particular vehicle and/or vehicle type); using motion/movement of some or all of the vehicle to gather additional data about the vehicle's environment (e.g., about one or more possible or actual obstacles in the environment), including in some embodiments and situations to adjust position of a moveable part of the vehicle (e.g., hydraulic arm, tool attachment, etc.) on which one or more sensors are mounted to enable gathering of the additional data, and/or to move a location of the vehicle to enable one or more sensors that are mounted at fixed and/or moveable positions to gather the additional data; performing obstacle removal activities for an obstacle that include a series of actions by one or more powered earth-moving vehicles, such as involving moving a large pile of dirt (e.g., requiring numerous scoops, pushes or other actions), flattening or otherwise leveling some or all of a path (e.g., digging through a hill or other projection of material, filling a hole or ravine or other cavity, etc.); etc.

In addition, the EMVAOC system may perform other automated operations in at least some embodiments, with non-exclusive examples including the following: tracking motion and/or movement of one or more obstacles (e.g., people, animals, vehicles, falling or sliding objects, etc.), including in response to instructions issued by the EMVAOC system for those obstacles to move themselves and/or to be moved; tracking objects on some or all of a job site as part of generating analytics information, such as using data from a single powered earth-moving vehicle on the site or by aggregating information from multiple such earth-moving vehicles, including information of a variety of types (e.g., about a number of vehicles of one or more types that are currently on the site or have passed through it during a designated period of time; about a number of people of one or more types, such as workers and/or visitors, that are currently on the site or have passed through it during a designated period of time; about activities of a particular vehicle and/or a particular person at a current time and/or during a designated period of time, such as vehicles and/or people that are early or late with respect to a defined time or schedule, identifying information about vehicles and/or people such as license plates or RFID transponder IDs or faces or gaits; about other types of site activities, such as material deliveries and/or pick-ups, tasks being performed, etc.); etc.

Various details have been provided with respect to FIGS. 2A-2U, but it will be appreciated that the provided details are non-exclusive examples included for illustrative purposes, and other embodiments may be performed in other manners without some or all such details. For example, multiple types of sensors may be used to provide multiple types of data and the multiple data types may be combined and used in various ways in various embodiments, including non-exclusive examples of magnetic sensors and/or IMUs (inertial measurement units) to measure position data and whether in addition to or instead of the use of GPS and inclinometer data.

Figure 3:
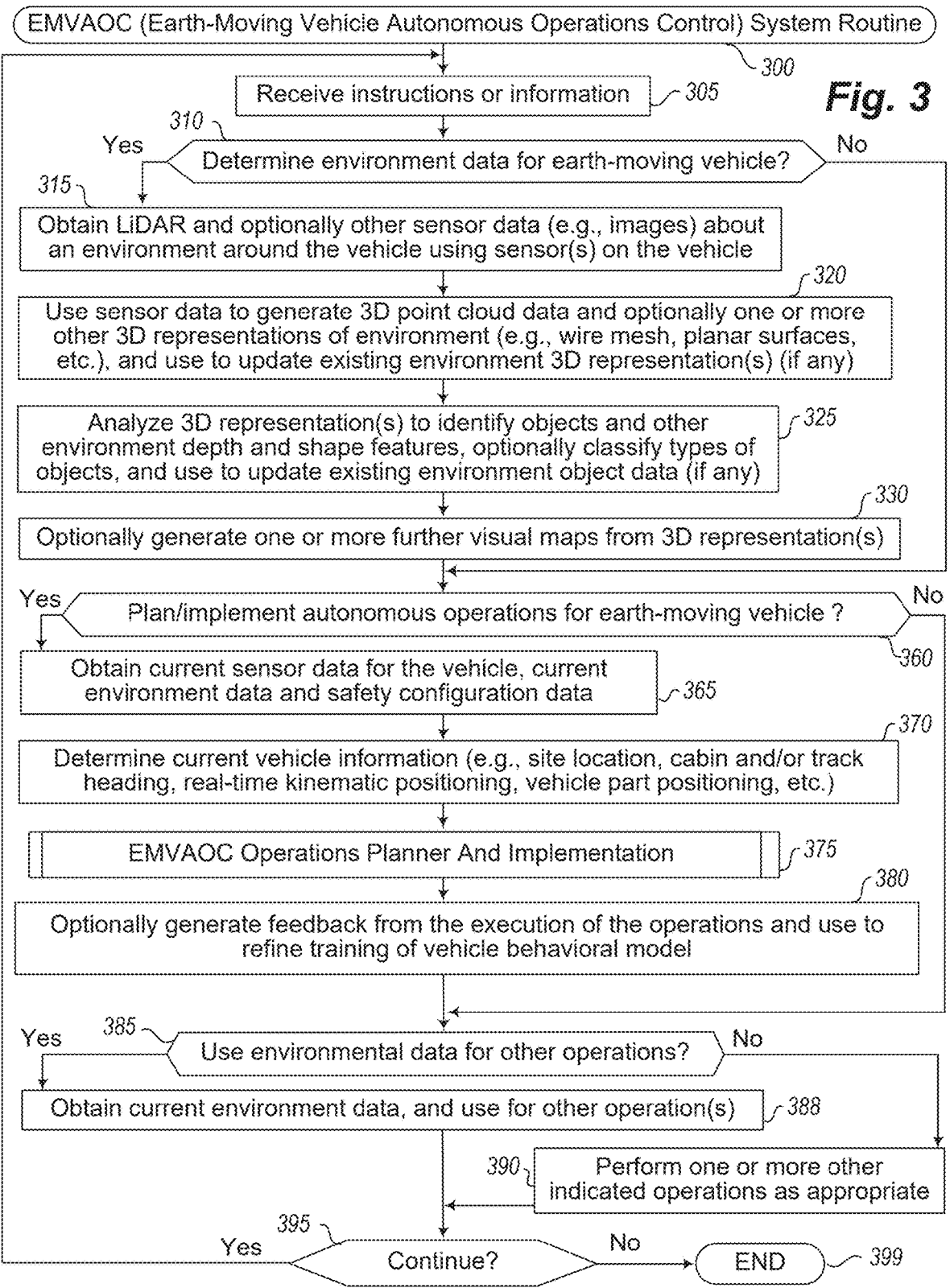
FIG. 3 is an example flow diagram of an illustrated embodiment of an Earth-Moving Vehicle Autonomous Operations Control (EMVAOC) System routine.

FIG. 3 is an example flow diagram of an illustrated embodiment of an EMVAOC (Earth-Moving Vehicle Autonomous Operations Control) System routine 300. The routine may be provided as a computer-implemented method by, for example, execution of an embodiment of the EMVAOC system 140 of FIGS. 1A-1B and/or the EMVAOC system discussed with respect to FIGS. 2A-2U and elsewhere herein, such as to perform automated operations for implementing autonomous control of powered earth-moving vehicles, including to automatically control movement of some or all of one or more powered earth-moving vehicles on a job site to conform with specified safety rules or other specified safety configuration data, such as performing vehicle attachment movement to implement operations to halt or otherwise inhibit unplanned slippage on a sloped and/or slick surface. While routine 300 is discussed with respect to controlling operations of a single powered earth-moving vehicle at a time, it will be appreciated that the routine 300 may be performed in other manners in other embodiments, including to control operations of multiple powered earth-moving vehicles of one or more types on a job site, to be implemented by one or more configured devices or systems (optionally in multiple locations and/or operating in a distributed or otherwise coordinated manner, such as with a computing device local to a powered earth-moving vehicle performing some of the automated operations while one or more remote server systems in communication with that computing device perform additional portions of the routine), etc.

The routine 300 begins in block 305, where instructions or other information are received (e.g., waiting at block 305 until such instructions or other information is received). The routine continues to block 310 to determine whether the instructions or information received in block 305 indicate to currently determine environment data for an earth-moving vehicle (e.g., using LiDAR sensors and/or image sensors and optionally other sensors located on the vehicle) and if so continues to perform blocks 315-330—in at least some embodiments, sensor data may be gathered repeatedly (e.g., continuously), and if so at least block 315 may be performed for each loop of the routine and/or repeatedly while the routine is performing other activities or otherwise waiting (e.g., at block 305) to perform other activities. In block 315, the routine in this example embodiment obtains LiDAR data and optionally other sensor data (e.g., one or more images) for an environment around the powered earth-moving vehicle using sensors positioned on the vehicle and optionally additional other sensors on or near the vehicle (e.g., for multiple powered earth-moving vehicles on a job site to share their respective environment data, whether in a peer-to-peer manner directly between two or more such vehicles, and/or by aggregating some or all such environment data in a common storage location accessible to some or all such vehicles). In block 320, the routine then uses the sensor data to generate 3D point cloud data and optionally one or more other 3D representations of the environment (e.g., using wire mesh, planar services, voxels, etc.), and uses the generated 3D representation(s) to update other existing environment data (if any). As discussed in greater detail elsewhere herein, such sensor data may be gathered repeatedly (e.g., continuously), such as in a passive manner for whatever direction the sensor(s) on the vehicle are currently facing and/or in an active manner by directing the sensors to cover a particular area of the environment that is of interest (including moving parts of the vehicle on which the sensors are mounted or otherwise attached to move the sensors to new positions from which additional data may be obtained), and environment information from different scans of the surrounding environment may be aggregated as data from new areas becomes available and/or to update previous data for an area that was previously scanned. In block 325, the routine then continues to analyze the 3D representation(s) to identify objects and other environment depth and shape features, to classify types of the objects as obstacles with respect to operations of the vehicle, and to update other existing information about such objects (if any). As discussed in greater detail elsewhere herein, such obstacle data and other object data may be used in a variety of manners, including by a planner module to determine autonomous operations for the vehicle to perform.

After block 330, or if it is instead determined in block 310 that the instructions or information received in block 305 do not indicate to currently determine environment data for an earth-moving vehicle, the routine 300 continues to block 360 to determine whether the instructions or information received in block 305 indicate to plan and implement autonomous operations of one or more earth-moving vehicles involving vehicle motion and/or tool attachment movement of some or all of one or more powered earth-moving vehicles on a job site to conform with specified safety rules or other specified safety configuration data, such as while performing one or more tasks and/or multi-task jobs (e.g., to identify one or more target destination locations and optionally tasks to be performed as part of vehicle motion to reach the target destination location(s), such as to create roads along particular paths and/or to remove particular obstacles), and including using environment data for the vehicle (e.g., data just determined in blocks 315-330), and if so continues to perform blocks 365-380 to perform the autonomous operations control. In block 365, the routine obtains current status information for the earth-moving vehicle(s) (e.g., sensor data for the earth-moving vehicle(s)), current environment data for the vehicle(s), and safety configuration data to use (e.g., as received in block 305, as retrieved from storage, etc.). After block 365, the routine continues to block 370, where it determines information about the earth-moving vehicle (e.g., one or more of the earth-moving vehicle's on-site location, real-time kinematic positioning, cabin and/or track heading, positioning of parts of the earth-moving vehicle such as the arm(s)/bucket, particular tool attachments and/or other operational capabilities of the vehicle, etc.). In block 375, the routine then submits input information to an EMVAOC Operations Planner And Implementation subroutine to determine one or more movement/motion plans to be implemented in light of the safety configuration data (e.g., avoiding prohibited 3D positions, etc.) and optionally one or more tasks and/or jobs to perform, including to monitor for and implement operations as needed to halt or otherwise inhibit unplanned slippage on a sloped and/or slick surface, and to implement the movement/motion plan operations by the earth-moving vehicle(s) to perform the one or more tasks—one example of such a subroutine is discussed in greater detail with respect to FIGS. 4A-4C. After block 375, the routine in block 380 optionally generates feedback from the execution of the operations for use in subsequent refinement of the earth-moving vehicle behavioral model's training.

If it is instead determined in block 360 that the information or instructions received in block 305 are not to plan and implement automated operations of earth-moving vehicle(s), the routine continues instead to block 385 to determine if the information or instructions received in block 305 are to use environment data for other purposes (e.g., for environment data just generated in blocks 315-330), and if so the routine continues to block 388. In block 388, the routine then obtains current environment data, and uses the environment data to perform one or more additional types of automated operations. Non-exclusive examples of such additional types of automated operations include the following: tracking movement of one or more obstacles (e.g., people, animals, vehicles, falling or sliding objects, etc.), including in response to instructions issued by the EMVAOC system for those obstacles to move themselves and/or to be moved; generating analytics information, such as tracking objects on some or all of a job site using data only from the earth-moving vehicle or by aggregating information from data from the earth-moving vehicle with data from one or more other earth-moving vehicles (e.g., about locations and/or activities of one or more other vehicles and/or people); etc.

If it is instead determined in block 385 that the information or instructions received in block 305 are not to use environment data for other purposes, the routine continues instead to block 390 to perform one or more other indicated operations as appropriate, such as if so indicated in the instructions or other information received in block 305. For example, the operations performed with respect to block 390 may include receiving and storing data and other information for subsequent use (e.g., safety configuration data, including thresholds and other settings to use for balancing-related operations and/or for slippage-related operations on a sloped and/or slick surface; actual and/or simulated operational data; sensor data; an overview workplan and/or other goals to be accomplished, such as for the entire project, for a day or other period of time, and optionally including one or more tasks to be performed; etc.), receiving and storing information about earth-moving vehicles on the job site (which vehicles are present and operational, status information for the vehicles, etc.), receiving and responding to requests for information available to the EMVAOC system (e.g., for use in a displayed GUI to an operator user that is assisting in activities at the job site and/or to an end user who is monitoring activities), receiving and storing instructions or other information provided by one or more users and optionally initiating corresponding activities, etc. While not illustrated here, in some embodiments the routine may perform further interactions with a client or other end user, such as before, during or after receiving or providing information in block 390, as discussed in greater detail elsewhere herein. In addition, it will be appreciated that the routine may perform operations in a synchronous and/or asynchronous manner.

After blocks 388 or 390, the routine continues to block 395 to determine whether to continue, such as until an explicit indication to terminate is received, or instead only if an explicit indication to continue is received. If it is determined to continue, the routine returns to block 305 to wait for additional information and/or instructions, and otherwise continues to block 399 and ends.

FIGS. 4A-4C are an example flow diagram of an illustrated embodiment of an EMVAOC (Earth-Moving Vehicle Autonomous Operations Control) Operations Planner And Implementation routine 400. The routine may be provided as a computer-implemented method by, for example, execution of an embodiment of modules 147 and/or 145 and/or 146 of the EMVAOC system 140 of FIGS. 1A-1B and/or the EMVAOC system discussed with respect to FIGS. 2A-2U and elsewhere herein, such as to perform automated operations related to determining tasks to perform and determining additional operations to implement as part of such task performance if specified criteria occur (e.g., related to vehicle slippage, etc.), including analyzing information about an environment of a powered earth-moving vehicle and determining corresponding information (e.g., slopes and other non-level surfaces, potential obstacles, classifications of the types of the obstacles, etc.), and determining how to accomplish a goal that includes controlling vehicle motion and/or attachment movement of one or more powered earth-moving vehicles on a job site (e.g., optionally including moving a powered earth-moving vehicle from its current location to a determined target destination location, and handling any possible obstacles between the current and destination locations) in accordance with specified safety rules or other specified safety configuration data (e.g., to avoid prohibited 3D positions, to reduce or eliminate vehicle slippage, etc.). The routine 400 may be invoked in various manners, including by the EMVAOC System routine 300 as discussed in FIG. 3 with respect to block 375, and if so may return to that invocation location after the routine returns. While routine 400 is discussed with respect to controlling operations of a single powered earth-moving vehicle at a time, it will be appreciated that the routine 400 may be performed in other manners in other embodiments, including to control operations of multiple powered earth-moving vehicles of the same type and/or multiple types on a job site, to be implemented by one or more configured devices or systems (optionally in multiple locations and/or operating in a distributed or otherwise coordinated manner, such as with a computing device local to a powered earth-moving vehicle performing some of the automated operations while one or more remote server systems in communication with that computing device perform additional portions of the routine), to separate the operations related to object determination and classification from those related to motion and movement planning (e.g., to be executed at different times), etc.

The routine begins in block 405, where it obtains information that includes current information about a powered earth-moving vehicle (e.g., vehicle location and positioning for various parts of the vehicle, operating capabilities for the vehicle, etc.), current environment data for an area around the vehicle, and safety configuration data to be used, including information about slippage-related operations, etc. After block 405, the routine continues to block 407, where it uses the environment data to identify obstacles around the vehicle, and in block 410, classifies each obstacle as to its type, including to optionally track movement and/or other changes for previously identified obstacles and to reclassify them if needed—such operations for each object may include, for example, classifying the obstacle (if new or changed) based on obstacle information (e.g., size, shape, distance to vehicle, material type, surface conditions, etc.), and classifying whether it can be ignored, removed, avoided and/or causes vehicle movement inhibitions, such as to inhibit vehicle movement if it cannot be removed or avoided within specified safety parameters (e.g., if a heat signature and/or movement indicates a person, animal or vehicle), can be moveable if it fits within a tool attachment or otherwise satisfies defined limits for vehicle's operating capabilities, can be avoidable if it is not moveable but does not inhibit movement or otherwise exceed defined size or other safety criteria (e.g., is a structure, vehicle, etc.), and can be ignored if it satisfies criteria with respect to material type and size and surface conditions (e.g., slope and stickiness/slipperiness of non-level surfaces). In other embodiments and situations, the routine 400 may instead use obstacle-related information generated in block 325 of FIG. 3 to supplement or replace some or all of the operations of blocks 407 and/or 410. In block 412, the routine then optionally uses the specified safety configuration data to determine prohibited 3D positions corresponding to the obstacles around the vehicle and to the vehicle parts through which other parts of the vehicle are not allowed to move, including slopes or other areas that the vehicle is not allowed to transit (e.g., slopes steeper than a defined threshold). In other embodiments, rather than identifying and using prohibited 3D positions based on obstacles and/or parts of the vehicle, some or all such positions may instead be restricted in one or more manners rather than prohibited, such as to include a buffer area around some or all obstacles that is to be used only if alternative movement/motion plans without such restrictive positions are not available, and/or to be used only in certain manners (e.g. at a reduced speed or in other manners to prevent damage to the vehicle and/or the obstacle).

After block 412, the routine continues to block 414, where it determines whether to implement safety monitoring operations during fully autonomous operations, or to instead implement safety monitoring operations in a semi-autonomous manner that is based in part on input from at least one human operator—in other embodiments and situations, only one of the two types of safety monitoring operations may be performed. If it is determined to implement safety monitoring for fully autonomous operations, the routine continues to block 416, where it obtains information about one or more tasks to be performed, optionally along with one or more target destination locations and/or orientations/directions different from a current location and orientation/direction of the vehicle, and with the task(s) to be performed at the current originating location and/or at the target destination location(s) and/or at one or more intermediate locations between the originating and destination locations. In block 418, the routine then identifies additional obstacles (if any) at the destination location(s) and at one or more additional locations (if any) between the vehicle's current location and the target destination location(s), and in block 420, classifies each additional obstacle along that movement path in a manner similar to that of block 410, and optionally determines additional prohibited 3D positions for the vehicle (e.g., for one or more hydraulic arms, one or more tool attachments, the chassis, wheels and/or tracks, and other parts of the vehicle body) in accordance with the specified safety configuration data. After block 420, the routine continues to block 422 to determine one or more alternative movement/motion plans for the vehicle's tool attachment(s) movements and optionally vehicle motion to complete the task(s) while avoiding any prohibited 3D positions, including with vehicle motion along one or more alternative paths from the current location to the target destination location (if different from the current location), and optionally including associated obstacle removal activities in order to complete the task(s). In block 426, the routine then scores or otherwise evaluates some or all of the alternative movement/motion plans with respect to one or more evaluation criteria (e.g., distance traveled; time involved; a safety score or other degree of safe operation, such as based at least in part on the obstacles and obstacle classifications; amount of tread wear and/or other measure of vehicle usage; fuel level and/or battery charge; etc.), and selects one of the movement/motion plans (e.g., a 'best' plan with respect to the evaluation criteria, such as having the highest or lowest score or other evaluation) to implement in order to perform the task(s) (along a selected vehicle motion path to the destination location if different from the originating location). In block 428, the routine then determines if there are prohibited 3D positions that cause vehicle operations to be halted or otherwise inhibited for all alternative movement/motion plans (e.g., if a plan could not be selected to avoid the prohibited 3D positions), and if so continues to block 430 to determine to initiate a halt or other inhibition (e.g., slow down) to vehicle operations until the conditions change (while optionally proceeding to perform one or more other tasks if possible), and otherwise continues to block 432.

In block 432, the routine then selects initial vehicle motion(s) and/or attachment movement(s) to implement, and in block 434 initiates an implementation of the selected motion(s) and/or movement(s), including to gather and update data about the vehicle and the environment during the implementation of the selected motion(s) and/or movement(s)—the initial vehicle motion(s) and/or attachment movement(s) that are selected may correspond to an amount of time (e.g., 1 second, 5 seconds, 1 minute, etc.), some or all of a subtask (e.g., a movement of a hydraulic arm, a movement of one or more wheels or tracks, etc.), etc. The routine then proceeds to perform blocks 436-456 as part of further safety monitoring during the implementation of the selected movement/motion plan. In particular, in block 436 the routine determines whether the vehicle and/or environment data gathered in block 434 indicates that the vehicle is slipping due to a sloped and/or slick surface, such as based on monitoring of changes in the vehicle's position as discussed in greater detail elsewhere herein, and if so proceeds to block 439 to initiate corrective slippage-related activities, such as to perform automated emergency braking operations. The emergency braking operations may include determining whether the vehicle is slipping forwards or backwards, and using different vehicle tool attachments accordingly if the vehicle has both one or more front tool attachments (e.g., a bucket or blade) and one or more rear tool attachments (e.g., a ripper with one or more teeth)—if the vehicle has a mid-vehicle tool attachment (e.g., a main blade on a grader), it may be used as a front tool attachment if the vehicle has a back tool attachment but no other front tool attachment, as a back tool attachment if the vehicle has a front tool attachment but no other back tool attachment, or as neither or both if the vehicle has other front and back tool attachments (e.g., a grader vehicle). After block 439, the routine continues to block 499 and returns. If it is instead determined in block 436 that the vehicle is not slipping due to a sloped and/or slick surface, the routine continues to block 454 to determine whether there are more operations to perform for the movement/motion plan, and if not continues to block 499 and returns. Otherwise, the routine continues to block 456 to select next movement(s) and/or motion(s) to perform for the movement/motion plan, and returns to block 434 to implement the selected movement(s) and/or motion(s) along with any determined vehicle balancing activities.

If it is instead determined in block 414 to implement safety monitoring for semi-autonomous operations, the routine continues instead to block 468 to wait for and receive human operator input to one or more controls of the vehicle corresponding to intended vehicle motion and/or attachment movement. In block 470, the routine then determines predicted next positions for the vehicle components/parts based on the input (e.g., in a real-time or near-real-time manner, such as within microseconds or milliseconds or centiseconds or deciseconds or seconds), as well as whether any of the predicted next positions involve any prohibited 3D positions. If it is determined in block 472 that one or more prohibited 3D positions will be included (including any slopes exceeding a defined threshold), the routine continues to block 474 to halt the intended movement/motion corresponding to the input and optionally provide corresponding feedback to the human operator, and then proceeds to block 488—in other embodiments and situations, rather than halting the intended movement/motion, the routine may instead determine an alternative movement/motion to implement that avoids the prohibited 3D positions while reaching the same destination or otherwise achieving the same result as much as possible, and if so may instead change the movement/motion to that alternative movement/motion and proceed to block 476, or instead may alert a human operator that the human operator input to one or more controls of the vehicle will include one or more prohibited 3D positions to enable the human operator to modify the input to the controls accordingly. If it is instead determined in block 472 that the intended movement/motion does not include any prohibited 3D positions (or an alternative movement/motion is determined in block 474), the routine continues instead to block 476 to determine whether the intended movement/motion involves moving a piston for a piston displacement mechanism to its endstop position at full speed or to full-speed changing of direction of one or more arms and/or tool attachments (e.g., abruptly and in a substantially opposite direction, in a direction that differs from the current direction by at least a threshold amount or that otherwise satisfies one or more defined criteria, etc.), and if so continues to block 478 to automatically alter the intended movement/motion to reduce the speed as the endstop position or location of direction change is reached, although in some embodiments such checking may not be performed or may be overridden (e.g., if an operator user wants to shake material out of a bucket or other tool attachment)—in other embodiments and situations, rather than automatically reducing the speed, the routine may instead alert a human operator that the human operator input to one or more controls of the vehicle involves moving a piston for a piston displacement mechanism to its endstop position at full speed or to full-speed changing of direction of one or more arms and/or tool attachments to enable the human operator to modify the input to the controls accordingly. If it is instead determined in block 476 that the intended movement/motion does not involve reaching a piston endstop position or direction change location at full speed, or after block 478, the routine continues instead to block 484, where it implements the movement/motion corresponding to the input (and as optionally modified in blocks 474 and/or 478) using one or more piston displacement mechanisms, monitors for any alarms corresponding to exceeding safety thresholds during the movement (e.g., based on unplanned slippage on a sloped and/or slick surface), and halts further movement (or otherwise takes corrective action) if one or more such alarms are sounded—in at least some embodiments and situations, the performance of block 484 may further include gathering and updating additional environment data that is used during the implementing of the movement (e.g., by concurrently performing some or all of blocks 315-330 one or more times). During and/or after block 484, the routine in block 486 performs further operations to, if vehicle motion causes changes to the vehicle location, further identify additional obstacles (if any) from the environment data for additional locations of the vehicle as it moves and to classify the additional obstacles in a manner similar to that for blocks 410 and 420, and to use specified safety configuration data to determine additional prohibited 3D positions corresponding to the additional obstacles, such as for use during the vehicle motion and/or for additional operations at a final destination of the motion based on next inputs received from a human operator. While not illustrated here, in some embodiments the routine may further take additional fully automated actions after receiving input from a human operator, whether to change the intended movement/motion corresponding to the input and/or to perform additional tasks after the movement/motion, such as in a manner similar to that discussed with respect to the fully autonomous operations in blocks 416-456, including related to vehicle slipping in a manner similar to blocks 436-439. After blocks 474 or 486, the routine continues to block 488 to determine whether to continue with the semi-autonomous monitoring operations (e.g., until the human operator provides input to indicate that the semi-autonomous monitoring operations are done), and if so returns to block 468 to wait for additional human input. Otherwise, the routine continues to block 499 and returns.

Aspects of the present disclosure are described herein with reference to flowchart illustrations and/or block diagrams of methods, apparatus (systems), and computer program products according to embodiments of the present disclosure. It will be appreciated that each block of the flowchart illustrations and/or block diagrams, and combinations of blocks in the flowchart illustrations and/or block diagrams, can be implemented by computer readable program instructions. It will be further appreciated that in some implementations the functionality provided by the routines discussed above may be provided in alternative ways, such as being split among more routines or consolidated into fewer routines. Similarly, in some implementations illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, in other implementations the operations may be performed in other orders and in other manners. Any data structures discussed above may also be structured in different manners, such as by having a single data structure split into multiple data structures and/or by having multiple data structures consolidated into a single data structure. Similarly, in some implementations illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by corresponding claims and the elements recited therein. In addition, while certain aspects of the invention may be presented in certain claim forms at certain times, the inventors contemplate the various aspects of the invention in any available claim form. For example, while only some aspects of the invention may be recited as being embodied in a computer-readable medium at particular times, other aspects may likewise be so embodied.

What is claimed is:

1. An autonomous vehicle emergency braking system, comprising:

a bulldozer vehicle with a chassis, tracks, a blade tool attachment on a front of the chassis, a ripper tool attachment on a rear of the chassis, one or more first hydraulic arms between the chassis and the blade tool attachment, one or more second hydraulic arms between the chassis and the ripper tool attachment, one or more first controls for manipulating movement of the tracks, and one or more second controls for manipulating the blade tool attachment via the first hydraulic arms and the ripper tool attachment via the one or more second hydraulic arms;

a microcontroller unit on the bulldozer vehicle that is capable of effecting movement of the first and second controls via piston displacement mechanisms;

one or more GPS antennas mounted at one or more positions on the chassis and capable of receiving GPS signals for use in determining GPS coordinates of at least some of the chassis; and a control system on the bulldozer vehicle that is configured to be in communication with the microcontroller unit and to perform automated operations including:

determining changing locations of the chassis over a period of time based at least in part on the determined GPS coordinates of the at least some of the chassis for the period of time;

determining that the tracks are slipping on an underlying surface based at least in part on the changing locations of the chassis over the period of time differing by at least a threshold amount from one or more expected locations of the chassis over the period of time, wherein the one or more expected locations of the chassis over the period of time correspond to zero or more manipulations of the first controls via the piston displacement mechanisms; and initiating, in response to the determining that the tracks are slipping on the underlying surface, autonomous operations of the bulldozer vehicle to use at least one of the second controls via the piston displacement mechanisms to move at least one of the ripper tool attachment or the blade tool attachment into the underlying surface, including moving the ripper tool attachment into the underlying surface if the determined changing locations of the chassis over the period of time includes forward motion of the chassis, and including moving the blade tool attachment into the underlying surface if the determined changing locations of the chassis over the period of time include backward motion of the chassis.

2. The autonomous vehicle emergency braking system of claim 1 wherein the bulldozer vehicle is positioned facing downward on a slope of the underlying surface or was engaged in forward motion before the period of time on a portion of the underlying surface with a coefficient of friction below a defined threshold, wherein the determining of the changing locations of the chassis over the period of time includes identifying forward movement of the chassis over the period of time, and wherein the initiating of the autonomous operations of the bulldozer vehicle includes at least one of moving the ripper tool attachment into the underlying surface to a lowest possible depth, or moving the ripper tool attachment into the underlying surface at a highest possible speed, or moving the ripper tool attachment into the underlying surface with a highest possible force.

3. The autonomous vehicle emergency braking system of claim 1 wherein the bulldozer vehicle is positioned facing upward on a slope of the underlying surface or was engaged in rearward motion before the period of time on a portion of the underlying surface with a coefficient of friction below a defined threshold, wherein the determining of the changing locations of the chassis over the period of time includes identifying backward movement of the chassis over the period of time, and wherein the initiating of the autonomous operations of the bulldozer vehicle includes at least one of moving the blade tool attachment into the underlying surface to a lowest possible depth, or moving the blade tool attachment into the underlying surface at a highest possible speed, or moving the blade tool attachment into the underlying surface with a highest possible force.

4. The autonomous vehicle emergency braking system of claim 1 further comprising a real-time kinematic (RTK) positioning unit that is configured to correct the GPS coordinates based at least in part on one or more received RTK correction signals, wherein the determining of the changing locations of the chassis over the period of time include measuring location differences between two or more of the corrected GPS coordinates for the period of time, and wherein the automated operations further include determining the expected locations of the chassis over the period of time based at least in part on predicted effects of the zero or more manipulations of one or more of the first controls.

5. The autonomous vehicle emergency braking system of claim 4 wherein the determining of the changing locations of the chassis over the period of time further includes at least one of determining that the measured location differences exceed a defined distance threshold, or determining that the measured location differences correspond to a speed of motion of the chassis over a defined speed threshold, or determining that changes in the locations of the chassis continue after a defined time threshold.

6. The autonomous vehicle emergency braking system of claim 1 further comprising a real-time kinematic (RTK) positioning unit that is configured to correct the GPS coordinates based at least in part on one or more received RTK correction signals, and wherein the determining that the tracks are slipping on the underlying surface includes receiving an indication of the slipping from a machine learning model that is trained to detect slipping using inputs including at least one of the corrected GPS coordinates, or a vehicle speed measurement relative to the underlying surface.

7. The autonomous vehicle emergency braking system of claim 1 further comprising:

a LIDAR component that is mounted on the bulldozer vehicle and configured to obtain LiDAR data indicating a plurality of three-dimensional ("3D") points on surfaces of at least some of a job site on which the bulldozer vehicle is located; and one or more first position sensors mounted on the one or more first hydraulic arms and configured to detect one or more first angles between the chassis and the one or more first hydraulic arms, one or more second position sensors mounted on the one or more second hydraulic arms and configured to detect one or more second angles between the chassis and the one or more second hydraulic arms, one or more third position sensors mounted on the blade tool attachment and configured to detect one or more third angles between the blade tool attachment and at least one of the first hydraulic arms, and one or more fourth position sensors mounted on the ripper tool attachment and configured to detect one or more fourth angles between the ripper tool attachment and at least one of the second hydraulic arms.

8. The autonomous vehicle emergency braking system of claim 1 wherein the control system is configured to implement at least some automated operations of an earth-moving vehicle autonomous operations control system by executing software instructions of the earth-moving vehicle autonomous operations control system, and wherein the determining of the changing locations and the determining that the tracks are slipping and the initiating of the autonomous operations are performed autonomously without receiving human input and without receiving external signals other than GPS signals and real-time kinematic (RTK) correction signals.

9. The autonomous vehicle emergency braking system of claim 1 wherein the moving of the at least one of the ripper tool attachment or the blade tool attachment into the underlying surface includes moving only one of the ripper tool attachment or the blade tool attachment into the underlying surface at a first time, and further includes moving an other of the ripper tool attachment or the blade tool attachment into the underlying surface at a second time after the first time based at least in part on further monitoring of additional changing locations of the chassis between the first and second times.

10. A computer-implemented method, comprising:

determining, by one or more configured hardware processors, locations of a powered earth-moving vehicle on a job site at multiple times based at least in part on data from one or more sensors mounted on the powered earth-moving vehicle, wherein the powered earth-moving vehicle includes a chassis and tracks and a front tool attachment and a rear tool attachment and one or more first controls for movement of the tracks and one or more second controls to manipulate the rear tool attachment and one or more third controls to manipulate the front tool attachment;

determining, by the one or more configured hardware processors and based at least in part on the determined locations, that the powered earth-moving vehicle is in unplanned motion on an underlying surface that does not match any inputs provided to the one or more first controls for movement of the tracks; and initiating, by the one or more configured hardware processors and in response to the determining that the powered earth-moving vehicle is in unplanned motion, autonomous operations of the powered earth-moving vehicle to move at least one of the front tool attachment or the rear tool attachment into the underlying surface, including moving the rear tool attachment into the underlying surface if the unplanned motion includes forward motion of the chassis, and including moving the front tool attachment into the underlying surface if the unplanned motion includes backward motion of the chassis.

11. The computer-implemented method of claim 10 wherein the powered earth-moving vehicle is a bulldozer, wherein the rear tool attachment is a ripper tool, wherein the front tool attachment is a blade tool, and wherein the initiating of the autonomous operations includes performing emergency braking operations.

12. The computer-implemented method of claim 10 wherein the powered earth-moving vehicle further has one or more GPS antennas mounted at one or more positions on the chassis, wherein the determining of the locations of the powered earth-moving vehicle on the job site at multiple times includes determining GPS coordinates of at least some of the chassis for the multiple times based at least in part on GPS signals received by the one or more GPS antennas, and wherein the determining that the powered earth-moving vehicle is in unplanned motion includes:

determining changing locations of the chassis over the multiple times based at least in part on the determined GPS coordinates; and determining that the tracks are slipping on the underlying surface based at least in part on the changing locations of the chassis differing by at least a threshold amount from expected locations of the chassis over the multiple times, wherein the expected locations of the chassis correspond to zero or more manipulations of the first controls.

13. The computer-implemented method of claim 12 wherein the determining of the changing locations includes measuring location differences between two or more of the determined GPS coordinates for the multiple times, and wherein the method further comprises determining the expected locations of the chassis over the multiple times based at least in part on calculated effects of the zero or more manipulations of at least one of the one or more first controls.

14. The computer-implemented method of claim 13 wherein the determined GPS coordinates are corrected by a real-time kinematic (RTK) positioning unit based at least in part on one or more received RTK correction signals, wherein the determining of the changing locations of the chassis over the multiple times further includes at least one of determining that the measured location differences exceed a defined distance threshold, or determining that the measured location differences correspond to a speed of motion of the chassis over a defined speed threshold, or determining that changes in the locations of the chassis continue after a defined time threshold.

15. The computer-implemented method of claim 10 wherein the determining of the locations of the powered earth-moving vehicle on the job site at multiple times includes determining GPS coordinates of at least some of the chassis for the multiple times that are corrected by a real-time kinematic (RTK) positioning unit based at least in part on one or more received RTK correction signals, and wherein the determining that the powered earth-moving vehicle is in unplanned motion includes determining that the tracks are slipping on the underlying surface based at least in part on receiving an indication of the slipping from a machine learning model that is trained to detect slipping using inputs including at least one of the corrected GPS coordinates, or a vehicle speed measurement relative to the underlying surface.

16. The computer-implemented method of claim 10 wherein the powered earth-moving vehicle is positioned facing downward on a slope of the underlying surface or was engaged in forward motion before the multiple times on a portion of the underlying surface with a coefficient of friction below a defined threshold, wherein the method further comprises identifying, by the one or more configured hardware processors, forward movement of the chassis over the multiple times, and wherein the initiating of the autonomous operations of the powered earth-moving vehicle includes at least one of moving the rear tool attachment into the underlying surface to a lowest possible depth, or moving the rear tool attachment into the underlying surface at a highest possible speed, or moving the rear tool attachment into the underlying surface with a highest possible force.

17. The computer-implemented method of claim 10 wherein the powered earth-moving vehicle is positioned facing upward on a slope of the underlying surface or was engaged in rearward motion before the multiple times on a portion of the underlying surface with a coefficient of friction below a defined threshold, wherein the method further comprises identifying, by the one or more configured hardware processors, backward movement of the chassis over the multiple times, and wherein the initiating of the autonomous operations of the powered earth-moving vehicle includes at least one of moving the front tool attachment into the underlying surface to a lowest possible depth, or moving the front tool attachment into the underlying surface at a highest possible speed, or moving the front tool attachment into the underlying surface with a highest possible force.

18. The computer-implemented method of claim 10 wherein the determining of the locations of the powered earth-moving vehicle includes at least one of analyzing a plurality of three-dimensional ("3D") points on surfaces of at least some of the job site from one or more LiDAR components that are mounted on the powered earth-moving vehicle, or of analyzing visual data of one or more images from one or more cameras that are mounted on the powered earth-moving vehicle.

19. The computer-implemented method of claim 10 wherein at least one of the one or more hardware processors is a low-voltage microcontroller that is located on the powered earth-moving vehicle and is configured to implement at least some automated operations of an earth-moving vehicle autonomous operations control system by executing software instructions of the earth-moving vehicle autonomous operations control system, and wherein the determining of the locations and the determining that the powered earth-moving vehicle is in unplanned motion and the initiating of the autonomous operations are performed autonomously without receiving human input and without receiving external signals other than GPS signals and real-time kinematic (RTK) correction signals.

20. The computer-implemented method of claim 10 wherein the powered earth-moving vehicle is one of a bulldozer vehicle or a wheel loader vehicle or a track loader vehicle or a skid steer loader vehicle or a motorized grader vehicle or a farm tractor vehicle, wherein the moving of the at least one of the front tool attachment or the rear tool attachment into the underlying surface includes moving only one of the front tool attachment or the rear tool attachment into the underlying surface at a first time, and further includes moving an other of the front tool attachment or the rear tool attachment into the underlying surface at a second time after the first time based at least in part on monitoring of further changing locations of the chassis between the first and second times.

\* \* \* \* \*